340-870.11 SR

XR 3,214,734

Oct. 26, 1965 H. G. WHITEHEAD 3,214,734

PROTECTION SIGNALLING SYSTEM HAVING CHANNEL IMPEDANCE ALTERATION MEANS FOR PROVIDING INDICATIONS OF REMOTE STATION CONDITIONS

Filed June 19, 1959 22 Sheets-Sheet 1

3214734
OR IN 340/163

Oct. 26, 1965 H. G. WHITEHEAD 3,214,734

PROTECTION SIGNALLING SYSTEM HAVING CHANNEL IMPEDANCE ALTERATION MEANS FOR PROVIDING INDICATIONS OF REMOTE STATION CONDITIONS

Filed June 19, 1959 22 Sheets-Sheet 2

PROTECTION SIGNALLING SYSTEM HAVING CHANNEL IMPEDANCE ALTERATION MEANS FOR PROVIDING INDICATIONS OF REMOTE STATION CONDITIONS

Filed June 19, 1959 22 Sheets-Sheet 4

PROTECTION SIGNALLING SYSTEM HAVING CHANNEL IMPEDANCE ALTERATION MEANS FOR PROVIDING INDICATIONS OF REMOTE STATION CONDITIONS

Filed June 19, 1959

DELAY CIRCUIT, 130

Line Driver, 105

Oct. 26, 1965 H. G. WHITEHEAD 3,214,734

PROTECTION SIGNALLING SYSTEM HAVING CHANNEL IMPEDANCE ALTERATION MEANS FOR PROVIDING INDICATIONS OF REMOTE STATION CONDITIONS

Filed June 19, 1959 22 Sheets-Sheet 11

Fault Transfer and Conditioning Circuits, 112

Oct. 26, 1965 H. G. WHITEHEAD 3,214,734

PROTECTION SIGNALLING SYSTEM HAVING CHANNEL IMPEDANCE ALTERATION MEANS FOR PROVIDING INDICATIONS OF REMOTE STATION CONDITIONS

Filed June 19, 1959 22 Sheets-Sheet 12

Break (106) and Ground (113) Detectors

Subscriber's Line Detector, 109

Signal Separator, 122

Keying Control, III

Keyer, 110

Oct. 26, 1965 H. G. WHITEHEAD 3,214,734

PROTECTION SIGNALLING SYSTEM HAVING CHANNEL IMPEDANCE
ALTERATION MEANS FOR PROVIDING INDICATIONS
OF REMOTE STATION CONDITIONS

Filed June 19, 1959 22 Sheets-Sheet 22

FLIP-FLOP 123, 125, 126

3,214,734

PROTECTION SIGNALLING SYSTEM HAVING CHANNEL IMPEDANCE ALTERATION MEANS FOR PROVIDING INDICATIONS OF REMOTE STATION CONDITIONS

Harry G. Whitehead, Murray Hill, N.J., assignor, by mesne assignments, to American District Telegraph Company, New York, N.Y., a corporation of New Jersey Filed June 19, 1959, Ser. No. 821,437

22 Claims. (Cl. 340—163)

The present invention relates to signalling systems and more particularly to signalling systems in which items of information are transferred between a group of individual locations and one or more central locations.

The invention finds its principal utility in connection with the protection of property by electric protection systems and especially central station electric protection systems and hence will be described in connection with such systems. It should be understood, however, that the principals of the invention are to some extent applicable to other fields using electrical signalling, such as the telemetering field and the communication field for supervisory control and fault location.

In the protection of property in a central station electric protection system, individual properties or "premises" are provided with equipment which affords suitable switching operations upon the happening of certain events. In fire protection, for example, switching contacts may successively be closed and opened automatically a number of times in response to actuation of a fire detecting element located in or about the premises being protected. Devices and systems which afford operation of switching contacts upon the happening of particular occurrences have been in use for many years, not only for fire protection but for many other classes of protection and indication such as burglary, perimeter protection, holdup, waterflow supervision, watchmen's supervision, telemetering, supervisory control, fault location, and industrial process supervision. Appropriate equipment for providing one or more of these protection services may be provided at each individual protected premises. The occurrence of switching operations at the protected premises results in electrical signal indications at a remote location, preferably a central station where trained personnel are on duty, but sometimes some other location such as a guard station, police headquarters or fire department.

The term "subscriber's premises" as used herein is intended to be synonymous with "individual protected premises" or "property" since the term "subscriber" is generally used in the central station electric protection business to denote an individual user of the protection services. In most instances a subscriber will be unrelated to the central station operators. However, as used herein, "subscriber" is intended to include also that portion of one entity's property which is protected by the entity itself, such as the protection afforded through the use of a guard station in an industrial enterprise or government installation. Since each subscriber may have more than one protection service, e.g., fire and burglary, for certain purposes, each of the protection services of a particular subscriber may be treated as an "individual subscriber."

In general, subscribers' premises have been connected to a remotely located central station over an individual wire or pair of wires or by means of a wire loop interconnecting the central station and a small number of subscribers' premises. The grade of service provided in the latter case has generally not been considered as good as in the former, but this dificiency has been offset to some extent by savings in wire cost. Since in most cases leased telephone wires are used to interconnect subscribers and a central station, it will be appreciated that substantial savings are involved in eliminating an individual connection between each subscriber and the central station.

Other difficulities have been involved in the use of subscribers' loops rather than individual connections, such as lack of continuous supervision and difficulty in the transfer of commands from the central station to the subscribers' premises.

The wire distance between an individual subscriber and the central station or other location where signal indications of occurrences are reported and observed has been limited principally by wire line costs, line resistance, and operating difficulties. To extend the practical distance over which protection signalling may economically be effected, it has been proposed to use an intermediate signal collecting station which collects signals from subscribers' premises over relatively low-cost, low-grade lines and transmits these signals through suitable multiplexing equipment to the central station over a relatively high quality communication channel. Such an intermediate station is herein termed a "district station." The use of a district station is by no means essential to the invention, however, since subscribers' premises may be connected to the central station without the use of a district station. In this case, the district station equipment—less the multiplexing equipment—will be provided at the central station. An electric protection system using an "intermediate" or "district" station between the subscribers and the central station is described in the copending application of Philo S. Bemis, Serial No. 761,564, filed September 17, 1958, now patent No. 2,985,871, granted May 23, 1961.

The principal object of the present invention has been the provision of a novel and improved signalling system.

More particularly, it has been an object of the invention to provide a novel and improved signalling system for use in an electric protection system, a telemetering system, or a communication system for supervisory control and/or fault location.

Another object of the invention has been provision of a novel and improved signalling system of the time division multiplex type for use with a plurality of subscribers and/or subscriber protection services or alarm conditions.

A further object of the invention has been the provision of a signalling system of the above type in which coded pulses are used to monitor continuously the subscriber's equipment and in which switching or other signalling action on the line is an indication of an alarm condition.

Still another object of the invention has been the provision of a novel and improved signalling system of the time division multiplex type for use with a plurality of subscribers, which is equivalent, from a security standpoint, to individual direct wire connections for each of the subscribers.

Another object of the invention has been the provision of a novel and improved high security central station signalling system in which subscribers' premises are connected in a series loop and in which completely positive non-interference of signals is achieved without substantial delay in signal transmission or possibility of loss of signals due to simultaneous signal initiation.

Another object of the invention has been the provision of a signalling system of the above type in which two-way transmission is possible over the series loop.

Still another object of the invention has been the provision of a signalling system of the above type which can be operated with a fault on the loop wire.

Features of the invention have been the provision of various electrical circuits for use in the signalling system of the invention.

Other and further objects, features and advantages of the invention will appear from the following description.

The invention will now be described in greater detail with reference to the appended drawings, in which.

Figure 7:
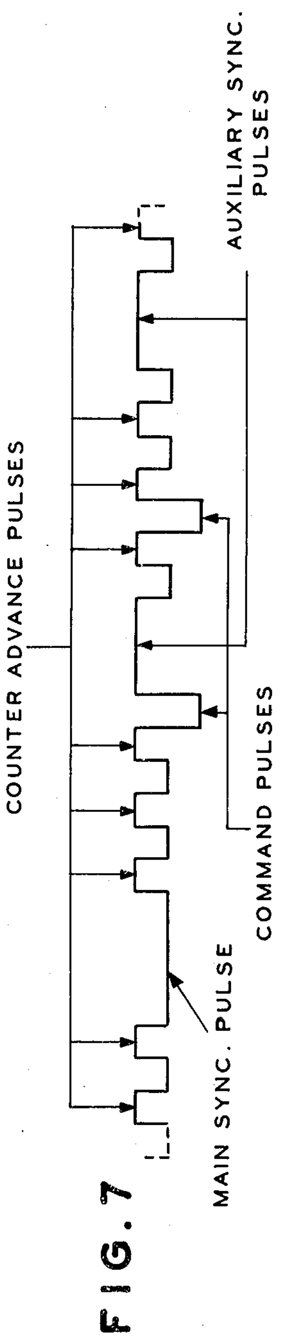
Figure 5:
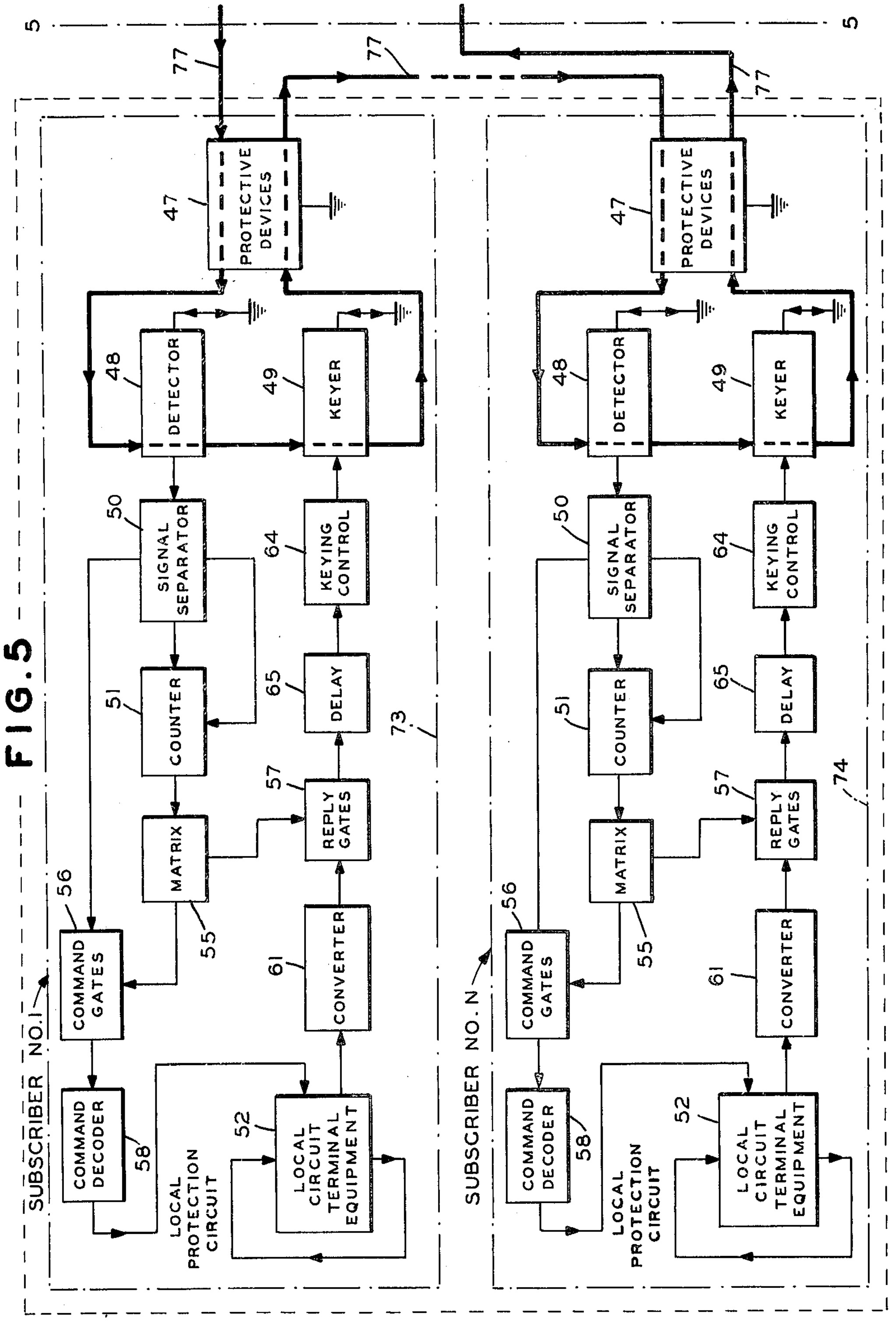
Figure 6:
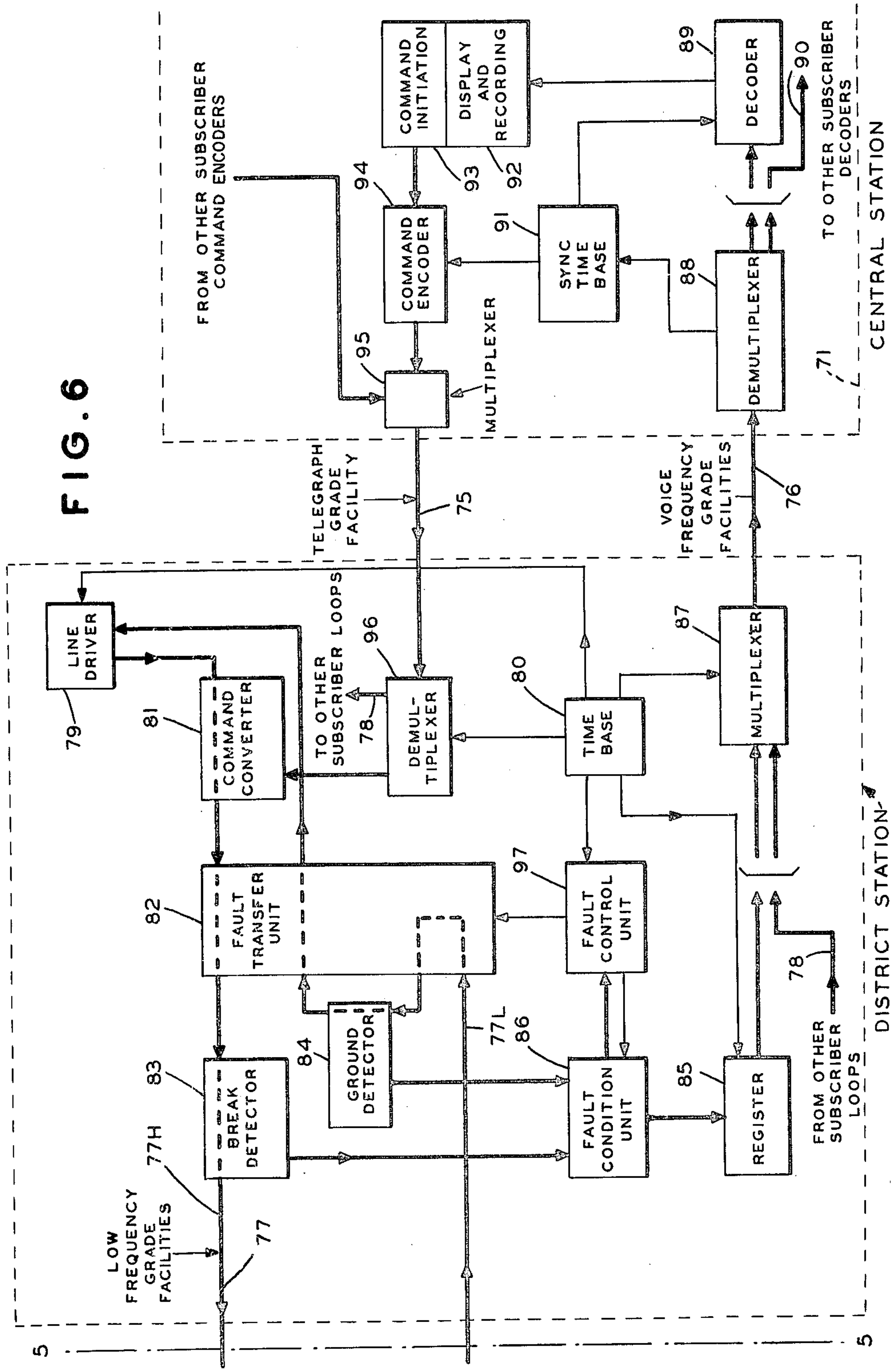
Figure 8:
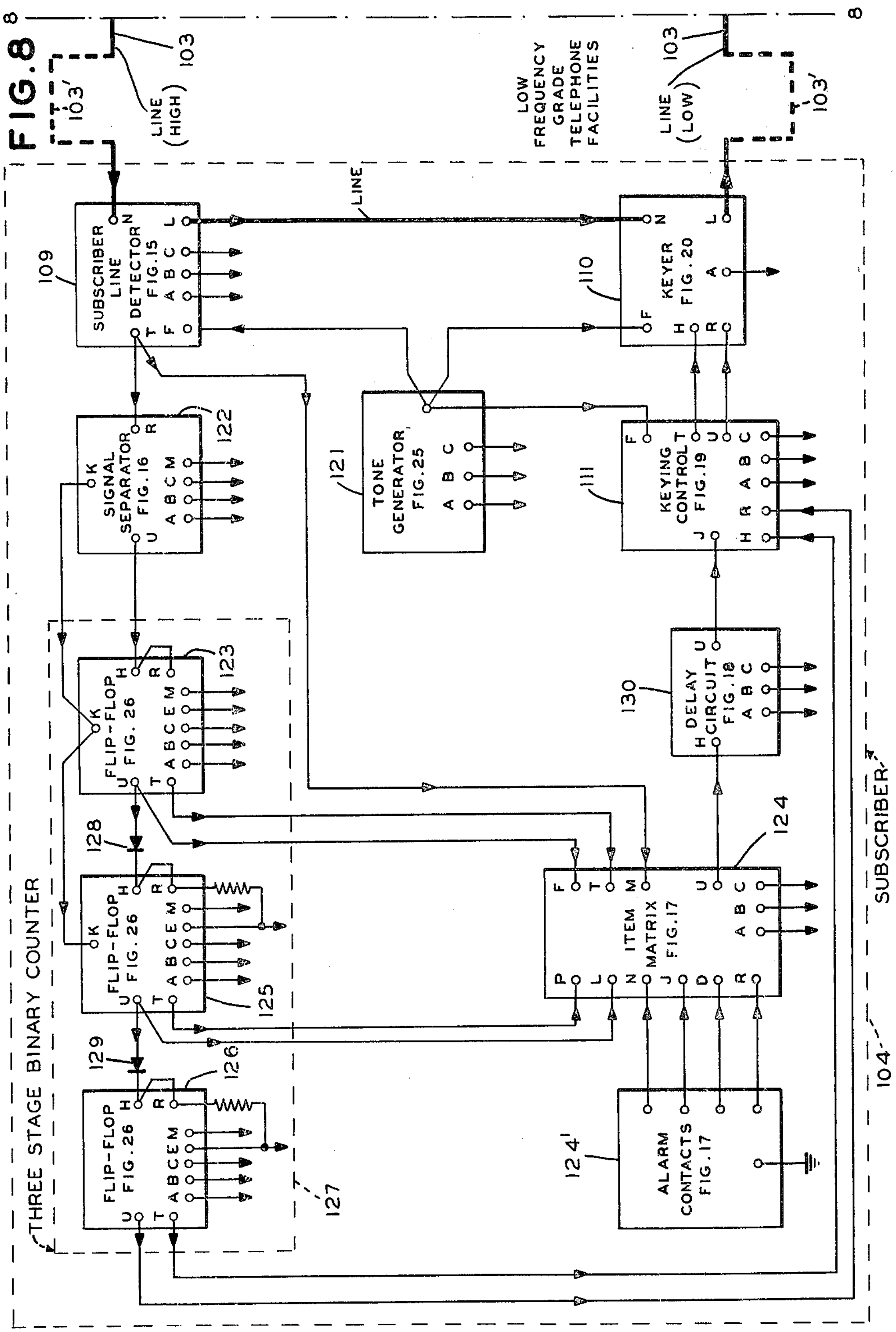
Figure 9:
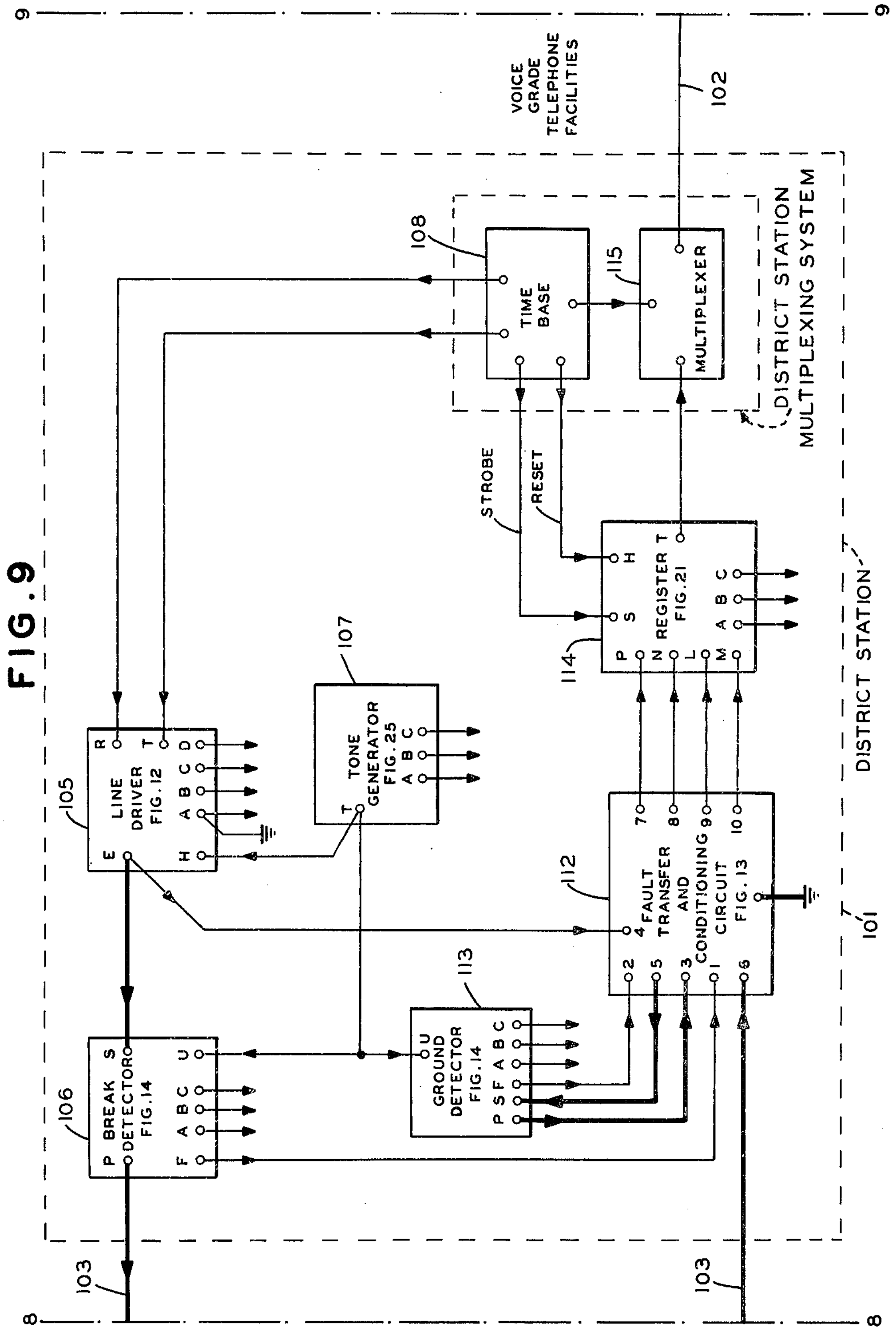
Figure 10:
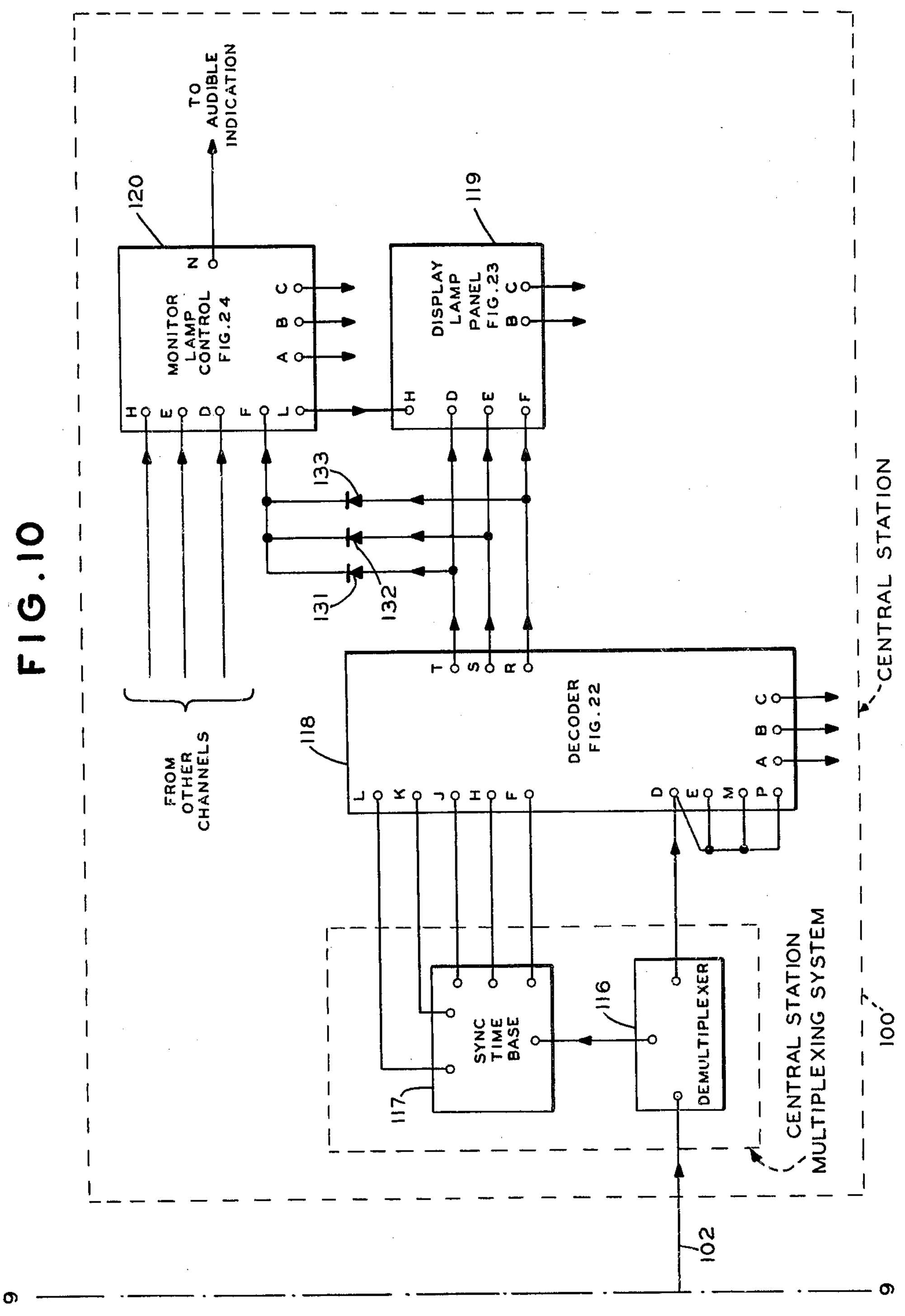
Figure 11:
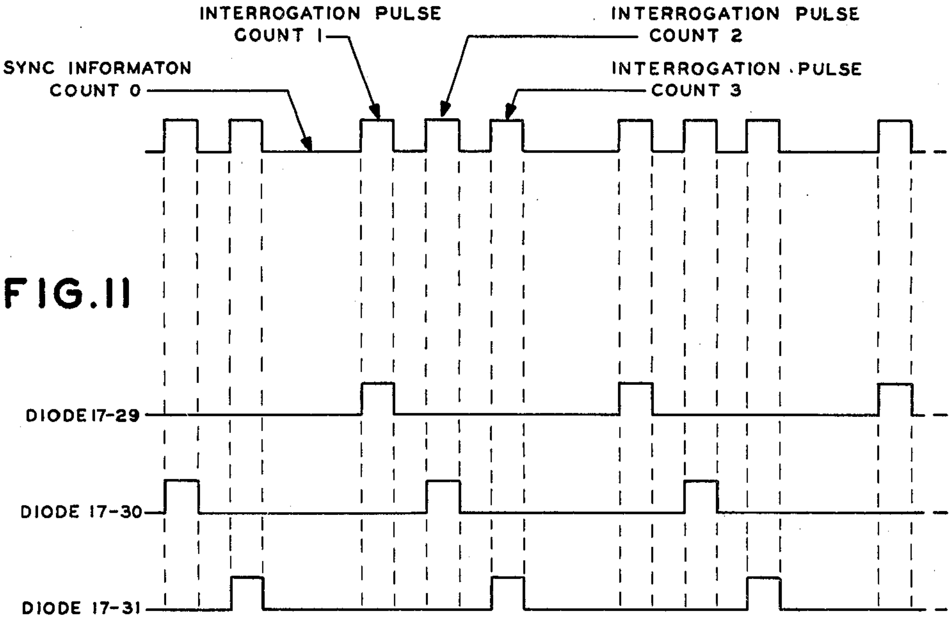
Figure 18:
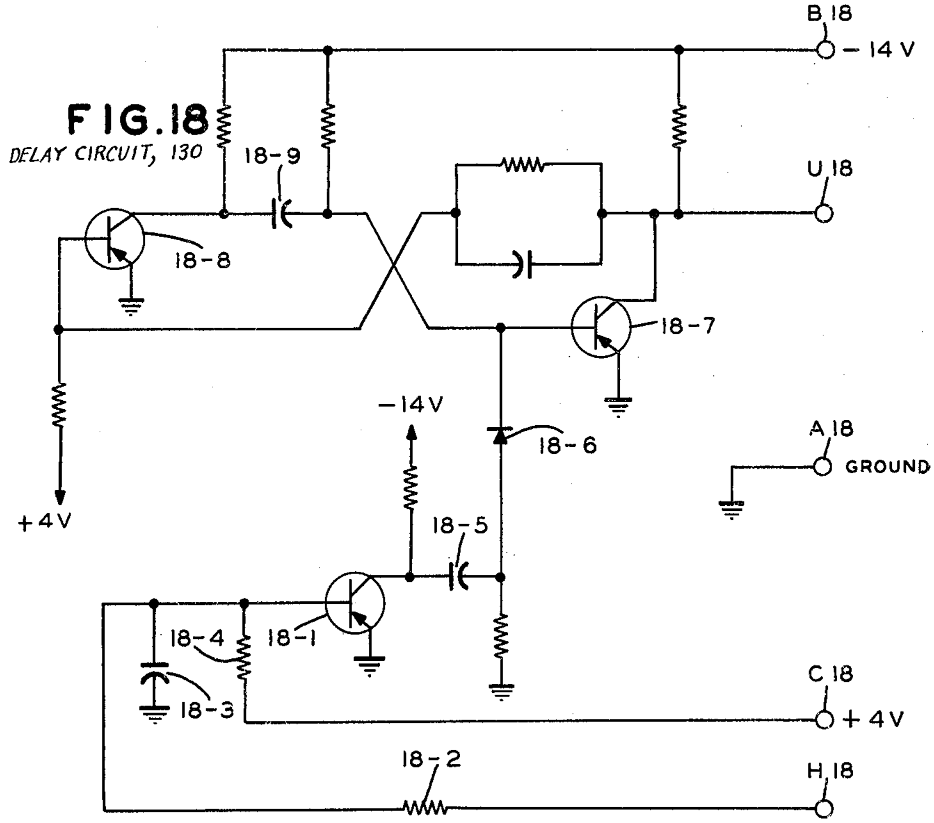
Figure 12:
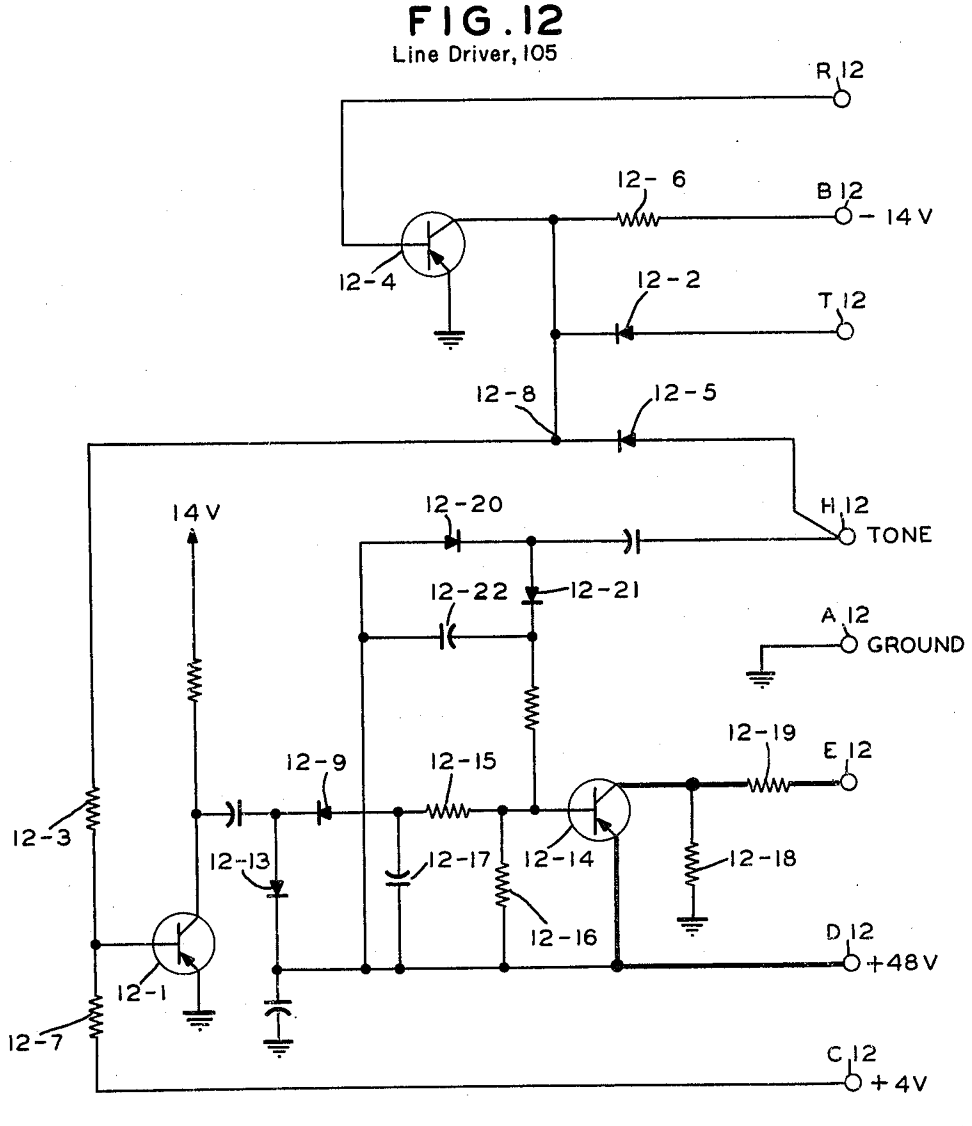
Figure 13:
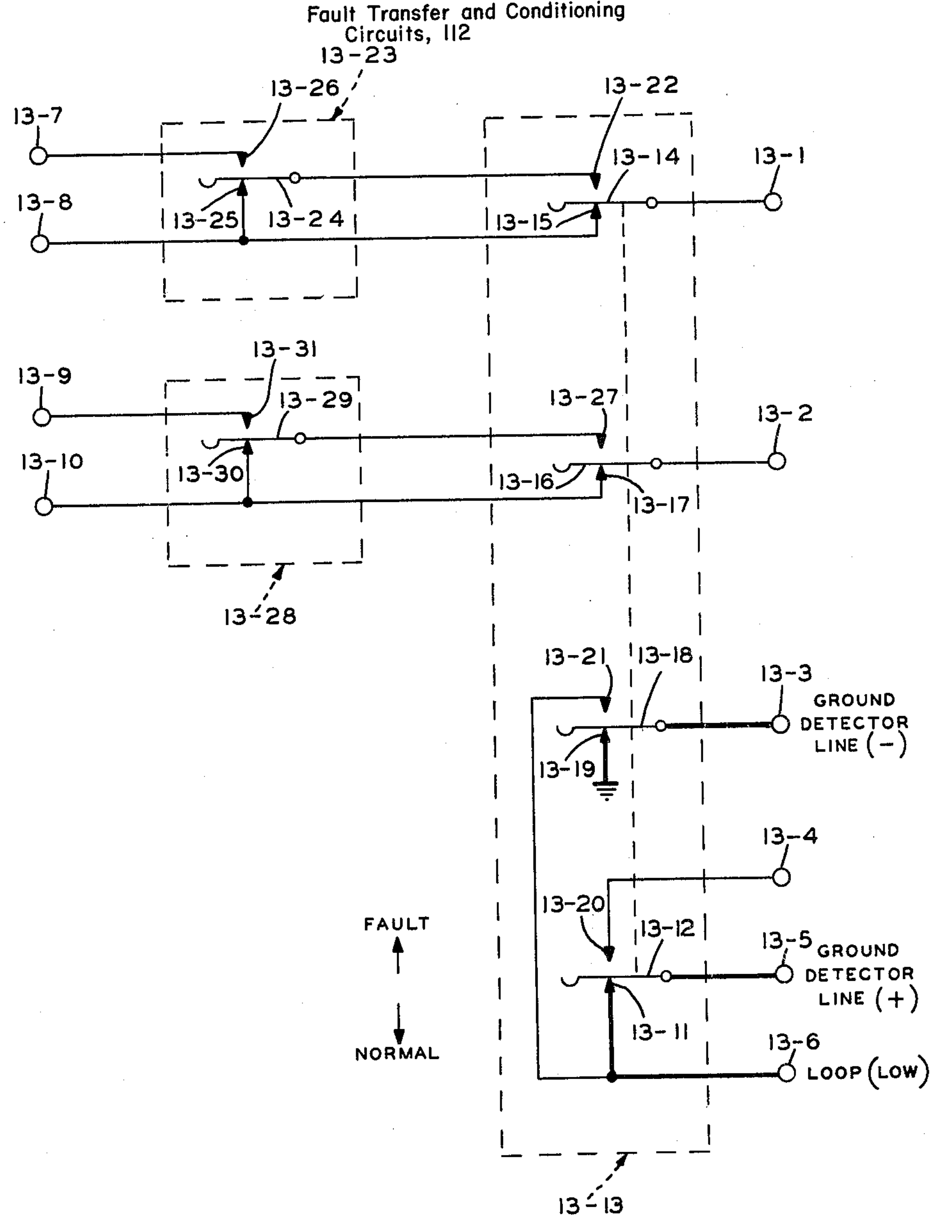
Figure 14:
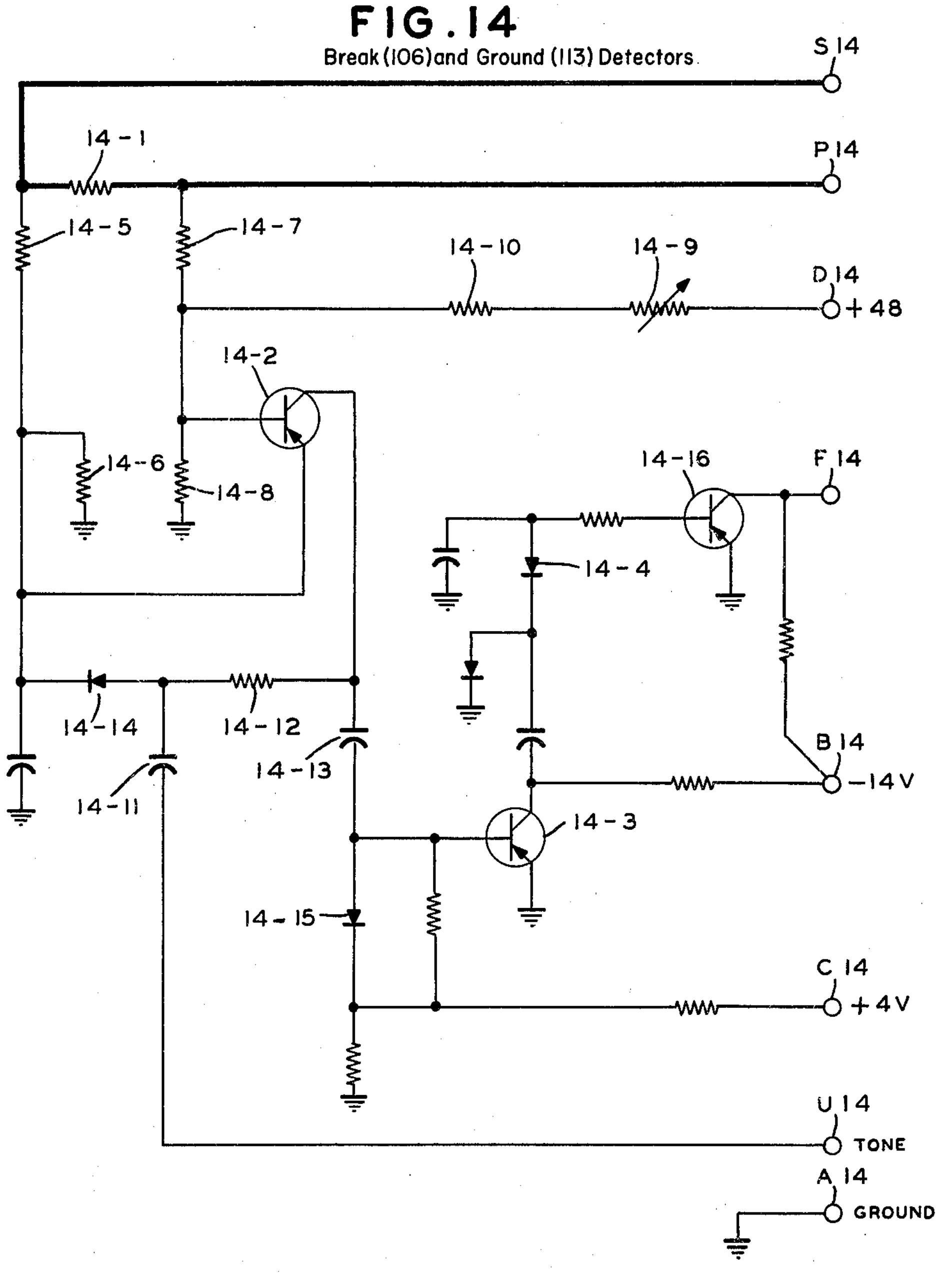
Figure 15:
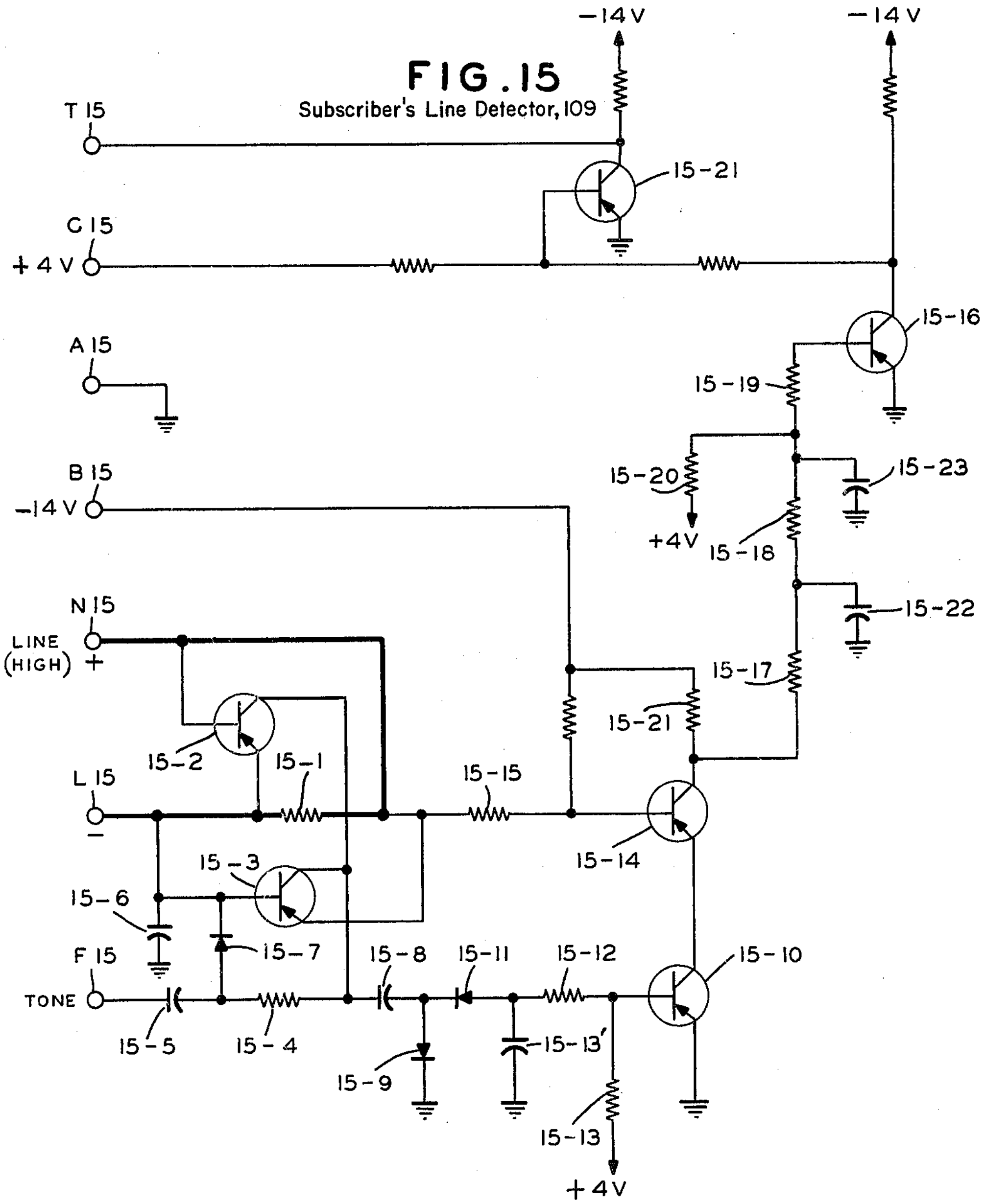
Figure 16:
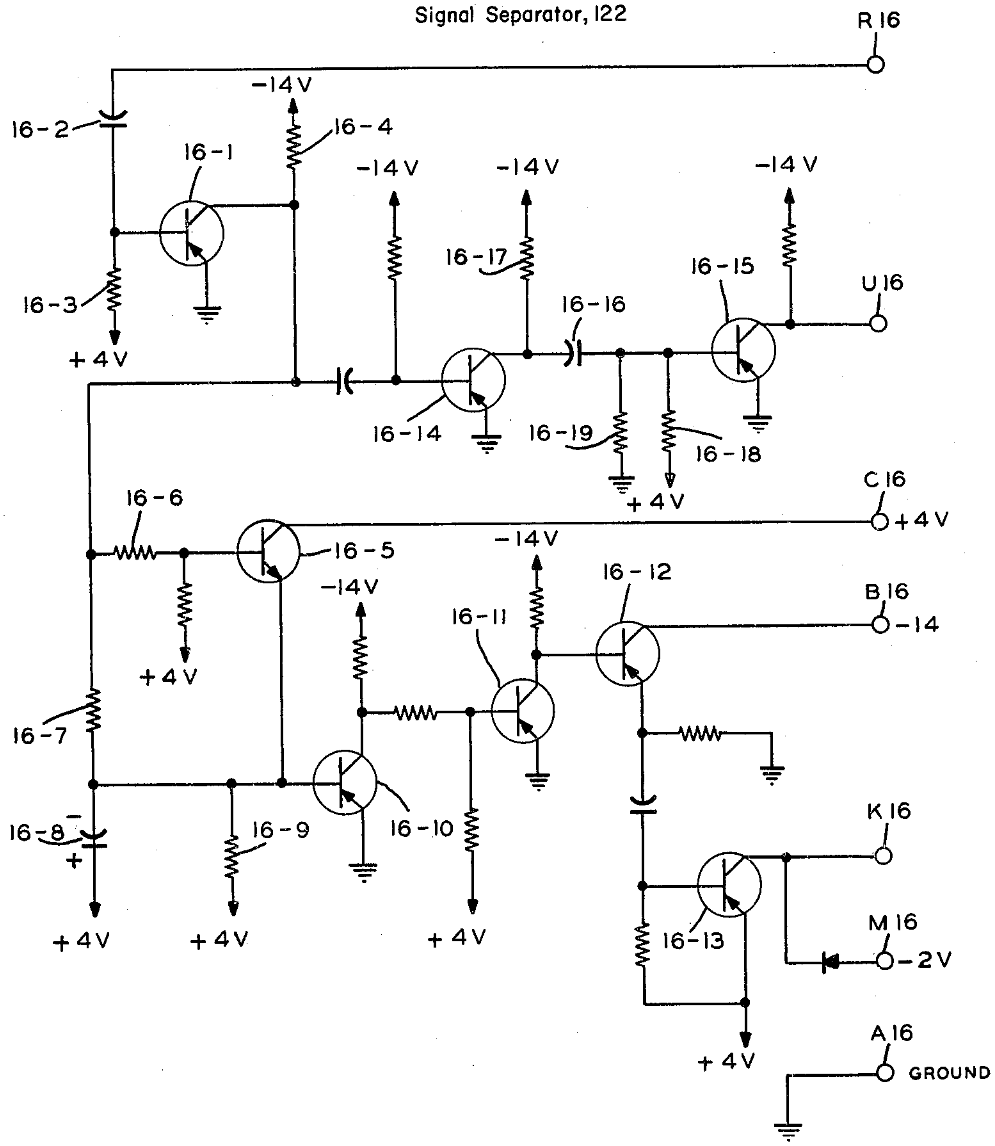
Figure 17:
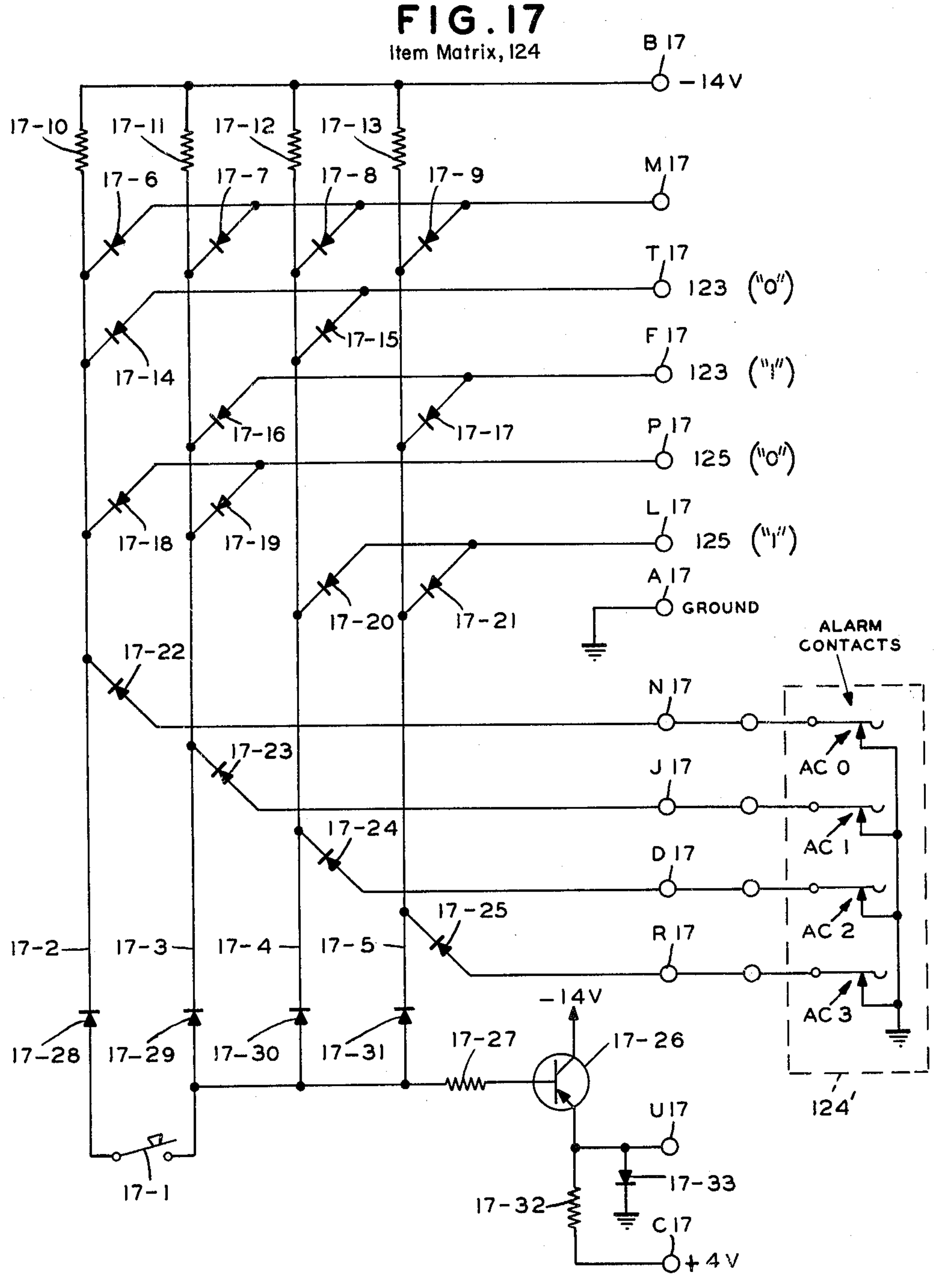
Figure 19:
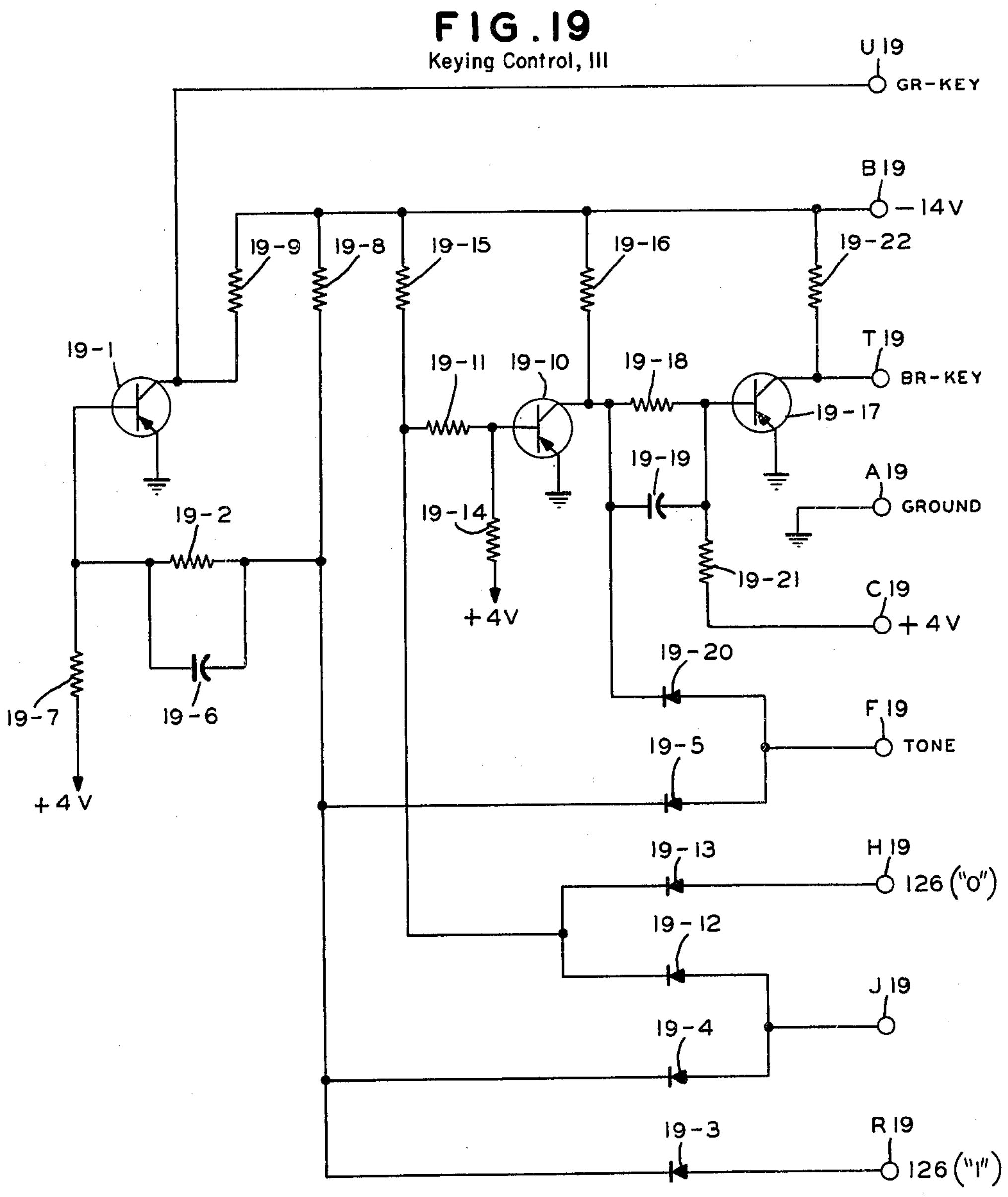
Figure 20:
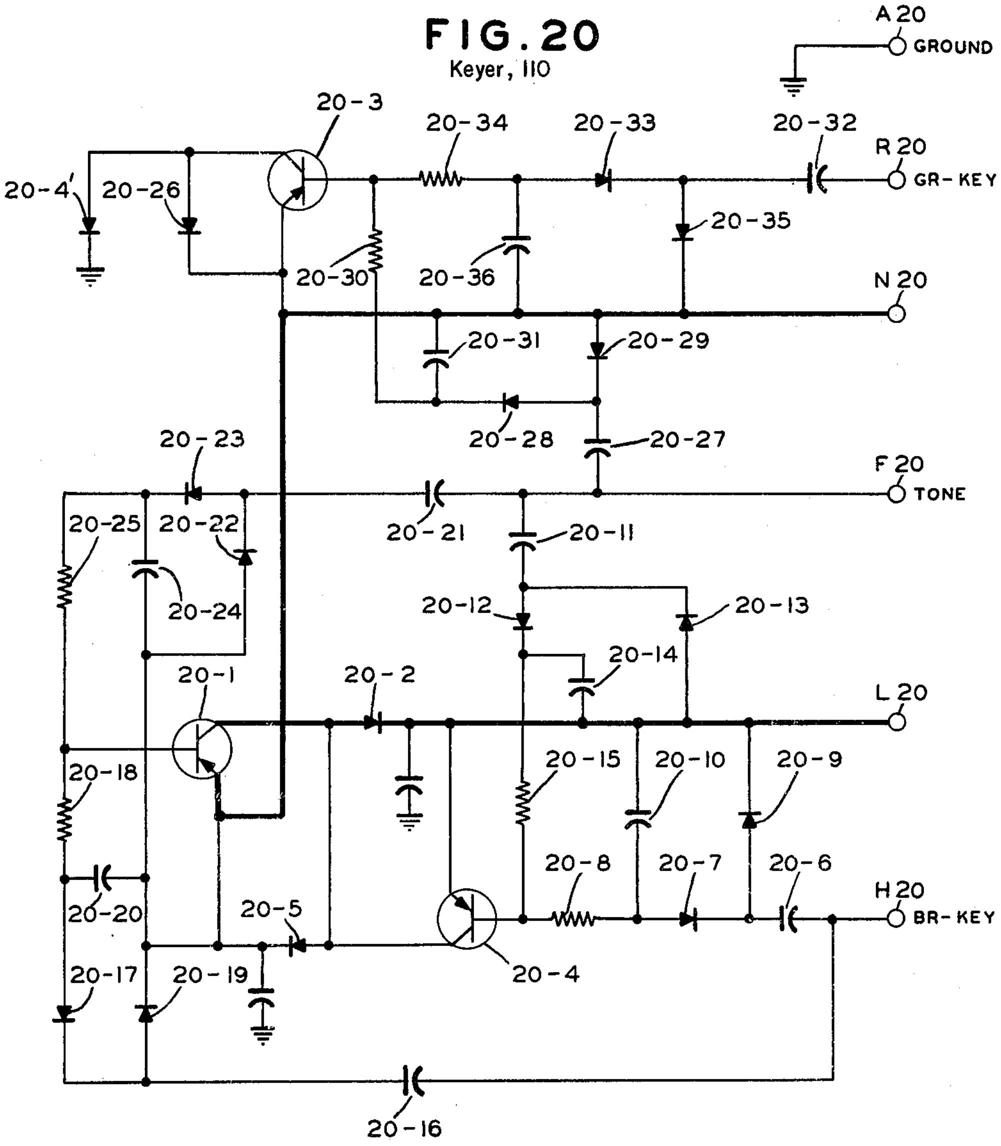
Figure 21:
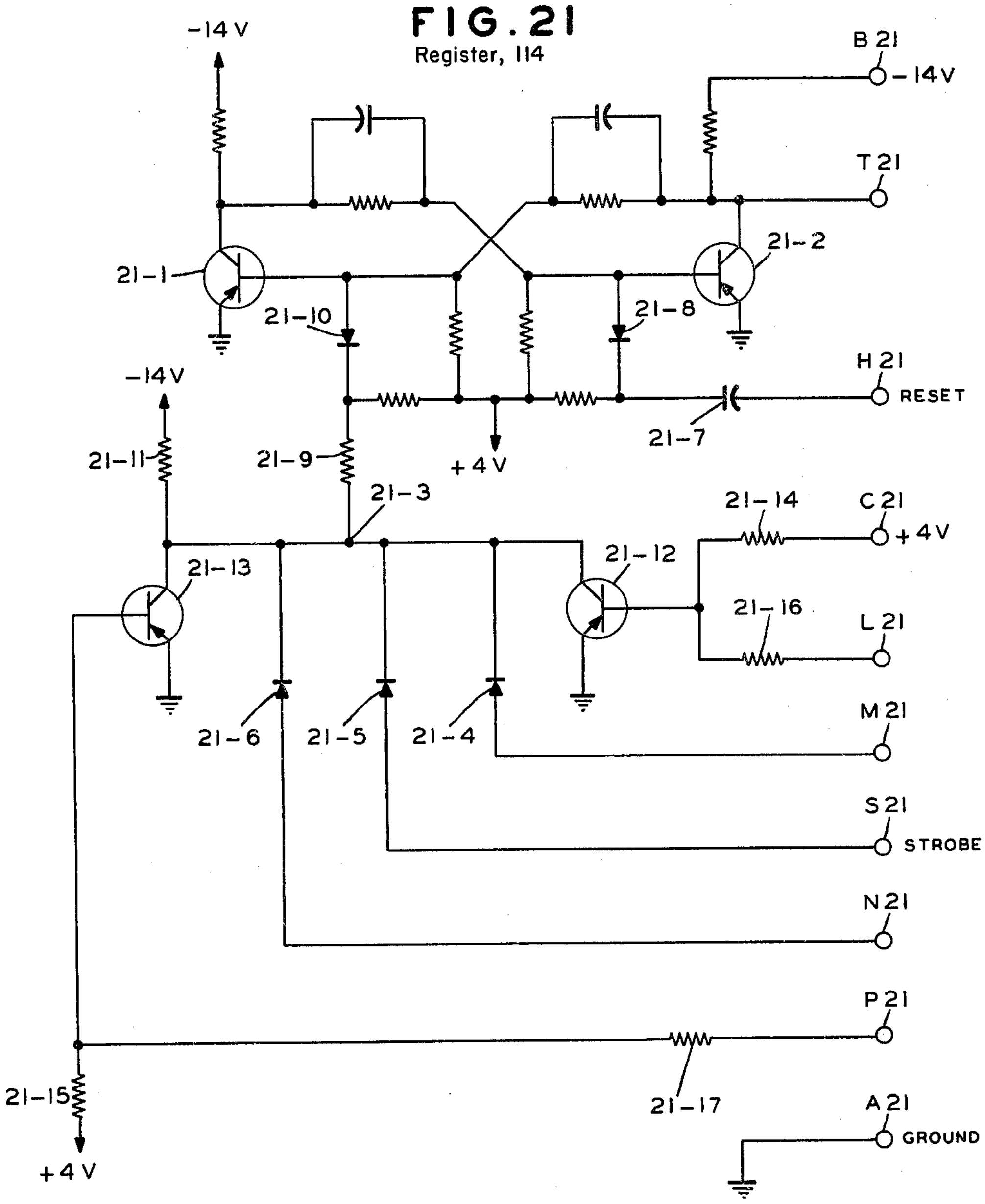
Figure 22:
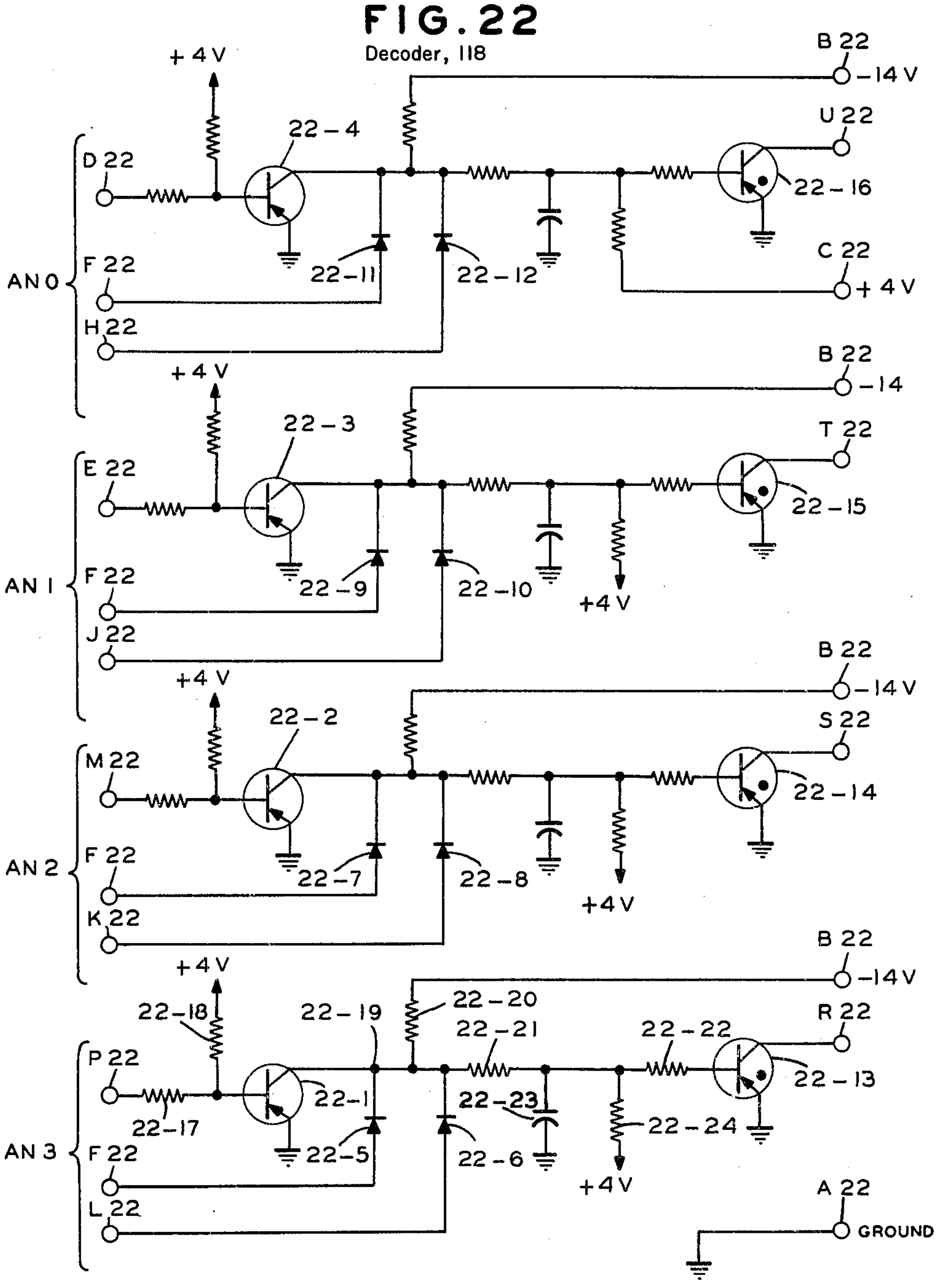
Figure 23:
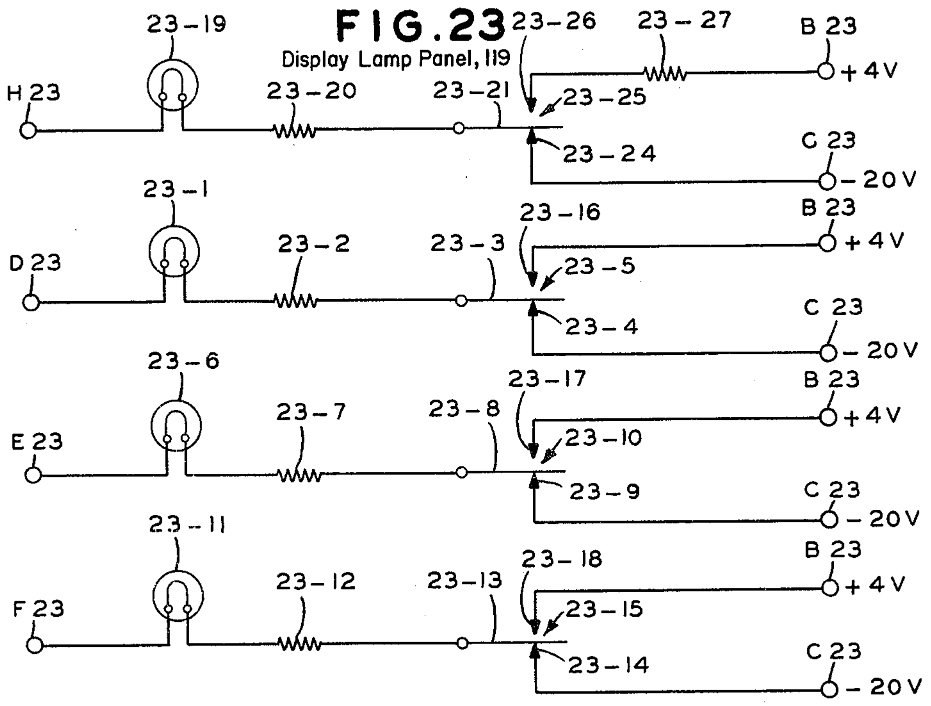
Figure 25:
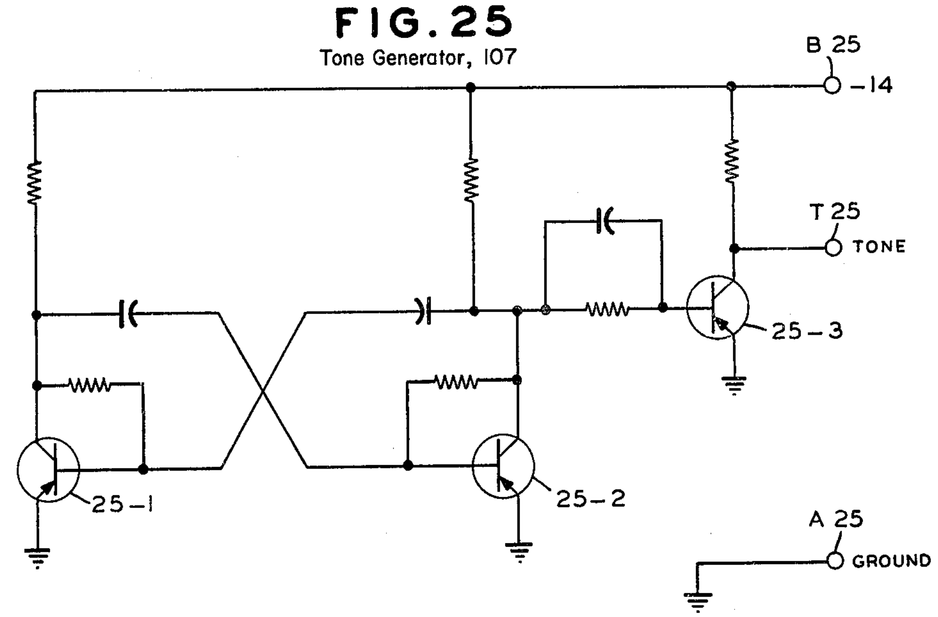
Figure 24:
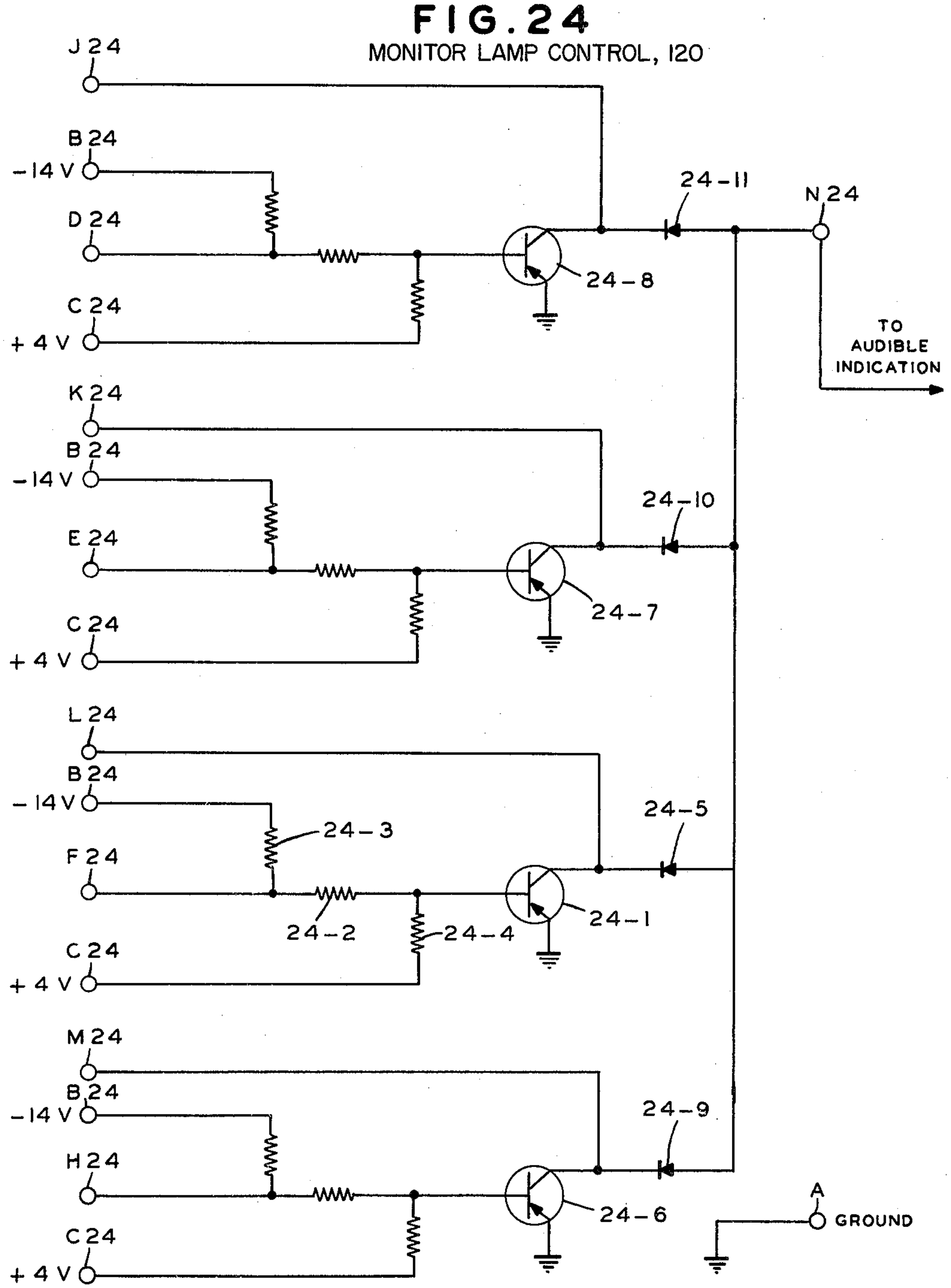
Figure 26:
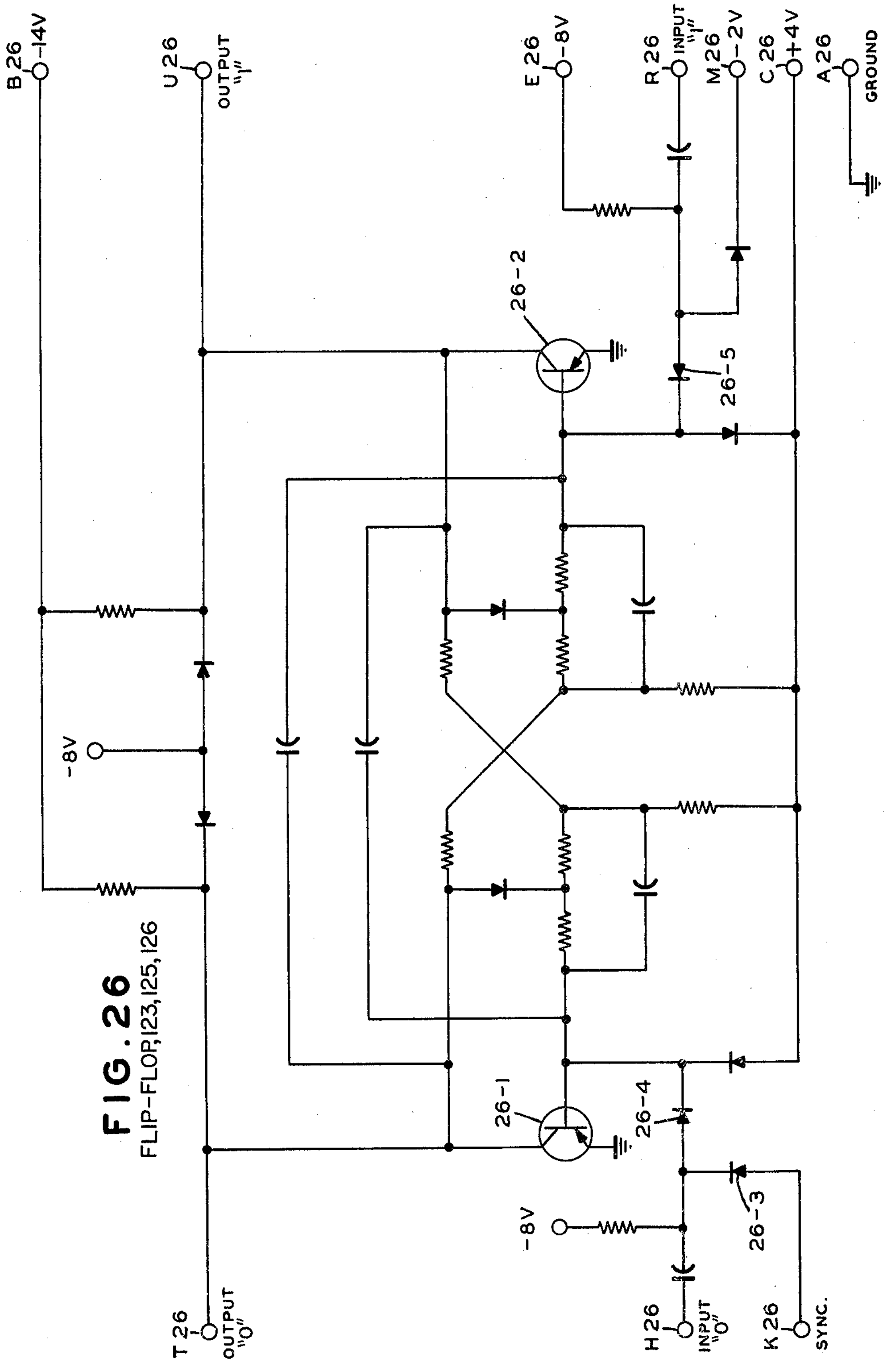

FIGS. 5 and 6, when joined along the line 5—5, form a simplified block diagram illustrating a more complicated system in accordance with the invention;

FIG. 7 is a diagram illustrating a sample code for use in the system of FIGS. 5 and 6;

FIGS. 8, 9 and 10, when joined along lines 8—8 and 9—9, respectively, form a detailed block diagram of a system in accordance with the invention;

FIG. 11 is a timing diagram illustrating the pulse train transmitted over the subscribers' loop and the individual signals at the cathodes of specified diodes of the item matrix of FIG. 8;

FIG. 12 is a circuit diagram illustrating a suitable line driver for use in FIG. 9;

FIG. 13 is a circuit diagram illustrating a suitable fault transfer and conditioning circuit for use in FIG. 9;

FIG. 14 is a circuit diagram illustrating a suitable break or ground detector circuit for use in FIG. 9;

FIG. 15 is a circuit diagram illustrating a suitable subscriber line detector for use in FIG. 8;

FIG. 16 is a circuit diagram illustrating a suitable signal separator for use in FIG. 8;

FIG. 17 is a circuit diagram illustrating a suitable item matrix for use in FIG. 8;

FIG. 18 is a circuit diagram illustrating a suitable delay circuit for use in FIG. 8;

FIG. 19 is a circuit diagram illustrating a suitable keying control for use in FIG. 8;

FIG. 20 is a circuit diagram illustrating a suitable keyer for use in FIG. 8;

FIG. 21 is a circuit diagram illustrating a suitable register circuit for use in FIG. 9;

FIG. 22 is a circuit diagram illustrating a suitable decoder circuit for use in FIG. 10;

FIG. 23 is a circuit diagram illustrating a suitable display lamp panel for use in FIG. 10;

FIG. 24 is a circuit diagram illustrating a suitable monitor lamp control circuit for use in FIG. 10;

FIG. 25 is a circuit diagram illustrating a suitable tone generator circuit for use in FIGS. 8 and 9; and FIG. 26 is a circuit diagram illustrating a suitable counter flip-flop circuit for use in FIG. 8.

SIMPLIFIED SYSTEM, BLOCK DIAGRAM; FIG. 1

Figure 1:
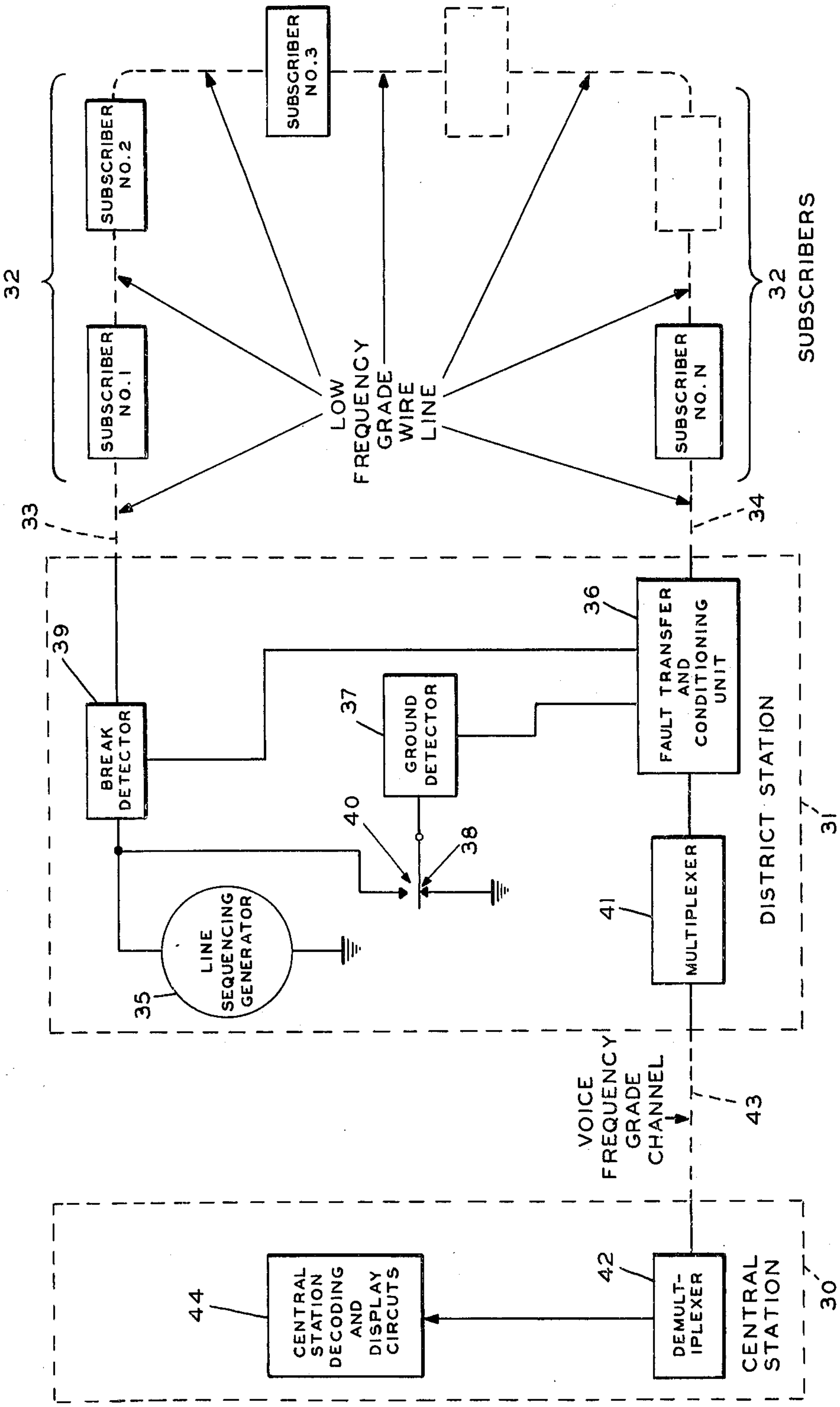
FIG. 1 is a simplified block diagram illustrating the basic aspects of the system of the invention.

Referring now to FIG. 1, the system illustrated comprises a central station 30, a district station 31, and a group of individual subscribers' premises generally designated 32. If the district station is omitted, the district station equipment, other than multiplexing equipment, will be provided at the central station. A typical spatial relationship might involve a central station located within a city, a district station located outside the city, for example, in a nearby city, shopping center or industrial complex, and a group of subscribers located in the area near the district station.

The individual subscribers' premises are designated 1, 2, 3 . . . *n*. These subscribers are interconnected in a series loop formed by a single wire line, the high side of the line leaving the district station 31 being designated 33 and the low side of the line returning to the district station being designated 34. In some cases the wire line may pass directly from subscriber to subscriber around the loop. However, since in most installations leased telephone wires will be used, the wire connection from subscriber to subscriber and from the district station to subscribers 1 and *n* will pass through a local telephone terminal.

The term "item" employed herein refers to a device or circuit whose condition it is desired to ascertain at a remote location or control from a remote location. In the telemetering field an "item" could be a gauge or similar device whose information is desired at a remote location. In the communication field, an "item" could be a device which can be controlled from a remote point and/or give information as to its operating condition. In the example employed herein an "item" can be a protection circuit or device and each subscriber may have one or more such "items" each of which can be considered as switches which will assume one position when normal and another position when abnormal or in alarm condition, and, if desired, still a third position when a trouble condition other than an alarm exists.

Figure 2:
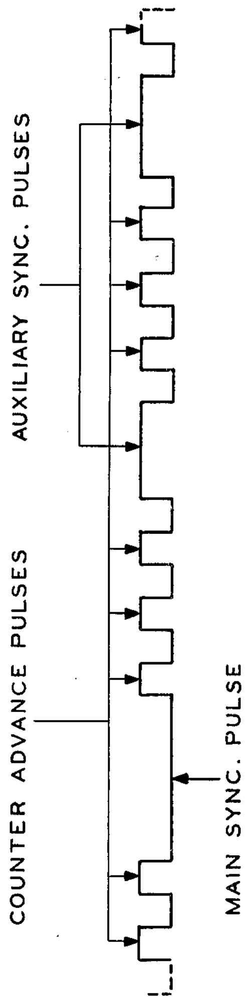
FIG. 2 is a diagram illustrating a sample code for use in the system of FIG. 1.

The district station 31 is provided with a line sequencing generator 35 which generates a train of electrical impulses with suitable synchronizing pulses interspersed. The pulse output of the generator 35 is applied to the high side 33 of the subscriber loop and passes through equipment at each of the subscribers' premises and returns to the district station at the low side 34 of the subscriber loop. A suitable train of pulses is illustrated in FIG. 2 and comprises a main synchronizing pulse, a series of counter advance pulses, and an auxiliary synchronizing pulse after every three counter advance pulses.

Each of the subscribers is provided with an electronic counter which advances one count for each counter advance pulse and which is kept in synchronism by means of the main and auxiliary synchronizing pulses. As illustrated, each counter advance pulse consists of a square wave impulse lasting one unit of time and which might be, for example positive going or negative going. The auxiliary synchronizing pulses are similar but longer impulses, for example, lasting three units of time, while the main synchronizing pulses consist of the absence of a signal for an even longer period, for example, five units of time.

If each subscriber has only a single protection item, then each counter advance pulse corresponds to a particular subscriber. However, if one or more subscribers are provided with more than one such item, then each counter advance pulse corresponds to a particular item of a particular subscriber. In the limiting case, a single subscriber might have an item for each counter advance pulse.

When the electronic counter at a particular subscriber's premises advances to a count corresponding to a particular protection item at that subscriber's premises, equipment at that subscriber's premises associated with that particular item is actuated to put a signal on the line as a report of the condition of that particular item. Such a signal could be in the form of a pulse (or the absence of a pulse) applied to the line by the subscriber's equipment. Preferably, the subscriber's equipment is constructed to break (open) the line, ground the line, or do nothing to the line, depending on the item condition. For example, the absence of a signal applied to the line might represent normal item conditions; breaking, i.e., opening the line might represent a trouble condition of the item; and grounding the line might represent an alarm condition of the item. Such impedance variations in the line could be used to represent any desired items of information.

Application of the subscriber's signal to the line may occur during the interval between successive pulses of the district station train, shown in FIG. 2 as being one unit of time. However, it is much more desirable to break or ground the line during the continuance of the counter advance pulse. In this case sufficient delay is introduced to ensure that all subscribers' counters in the loop are advanced one count by each counter advance pulse before the line is opened or grounded by another subscriber's equipment. By acting on the line during the continuance of the counter advance or "interrogation" pulse, signal handling requirements at the central station are greatly simplified. Acting on the line during an interrogation pulse can be considered as putting a signal on the line even though no separate electrical impulse is supplied.

The district station receives the signals put on the line by the subscriber, notes that the character of the signal, and transmits information as to such character to the central station 30, where the information is made available to the central station operators, if action is required. The district station and central station equipment will preferably be synchronized so that identification of the particular counter advance pulse with which the signal is associated will permit the central station equipment to provide information as to the subscriber and protection item involved or to compare such information with a standard memory.

As shown in FIG. 1, the subscribers' loop is completed to ground through a fault transfer and conditioning unit 36, a ground detector 37 and break contacts 38. A break detector 39 is included in the high side of the subscribers' loop. When the break and ground detectors each detect a normal current flow in the subscribers' loop corresponding to transmitted counter advance pulses, no signal has been put on the line by the subscriber item associated with any particular counter advance pulse, which may be used as a signal indication of normal item condition. If ground is placed on the line at a subscriber's premises, the break detector continues to detect current but the ground detector is shorted out and does not detect current, which may be used as a signal indication of an item alarm condition. If the line is opened at the subscriber's premises, no current is detected at either detector, which may be used as a signal indication of an item trouble condition.

In the event that a fault exists on the subscribers' loop, e.g., an open or ground, continued operation may be afforded by switching ground detector 37 by means of make contacts 40 so that the ground detector is connected between the line sequencing generator 35 and the low side of the line instead of between the low side of the line and ground. Such switching may be automatic or under manual control.

If the district station is omitted, the district station equipment referred to will be provided at the central station. However, where a district station is used, a train of signals corresponding to successive subscriber's item signal conditions will be transmitted from the district station to the central station. If desired, signals corresponding to normal subscriber's item signal conditions may be suppressed at the district station provided proper subscriber item identification is supplied to the central station for alarm or trouble condition signals.

The train of signals corresponding to successive subscriber's items conditions may be supplied to a multiplexer 41 which will also service other signal information such as that derived from other subscriber loops. The multiplexer 41 may be of any suitable type, e.g., time or frequency division, but preferably is of the time division type. Considerable advantage is obtained by deriving the system time base from the multiplexer or by providing a common time base for the mutiplexer and line sequencing generator. The multiplexed signals are supplied to a demultiplexer 42 at the central station over a communication channel 43 which will generally have a higher frequency capacity than the subscribers' loops because of the larger number of signals per unit time to be transmitted thereover. The channel 43 might be, for example, a voice frequency telephone line or radio link.

The demultiplexed signals at the central station are supplied to central station decoding and display circuits 44 where signals corresponding to each subscriber item are separated. The separated signals might be used to illuminate corresponding subscriber item condition lights or be otherwise employed to alert central station operators to the condition of each subscriber item so that appropriate action may be initiated in the case of an alarm or trouble.

The number of subscriber protection items which may be included in a single subscriber's loop is dependent on a number of factors, such as the equipment response time, the frequency capacity of the subscriber's loop wire line, and the permissible time interval between successive samplings of each subscriber item. This time interval is the primary factor determining the maximum time between the occurrence of an alarm and its annunciation. Since in many protection situations a few seconds in reporting time may have a significant effect on the success of the action initiated, only a very short time will generally be permitted between successive samplings of each subscriber item. A typical subscriber's loop might include, for example, 24 protection items and the counter advance or interrogation pulses might typically be 6¼ cycle per second square wave pulses. A larger or smaller number of items can, of course, be accommodated with appropriate design and widely different frequencies may be used.

In order to limit spurious alarms, it will in many cases be desirable to require a subscriber item condition signal to be repeated on two or more successive samplings. In this way the likelihood of signal distortions resulting from line conditions or other causes producing spurious ground or open determinations will be greatly reduced.

SIMPLIFIED SUBSCRIBER BLOCK DIAGRAM; FIG. 3

Figure 3:
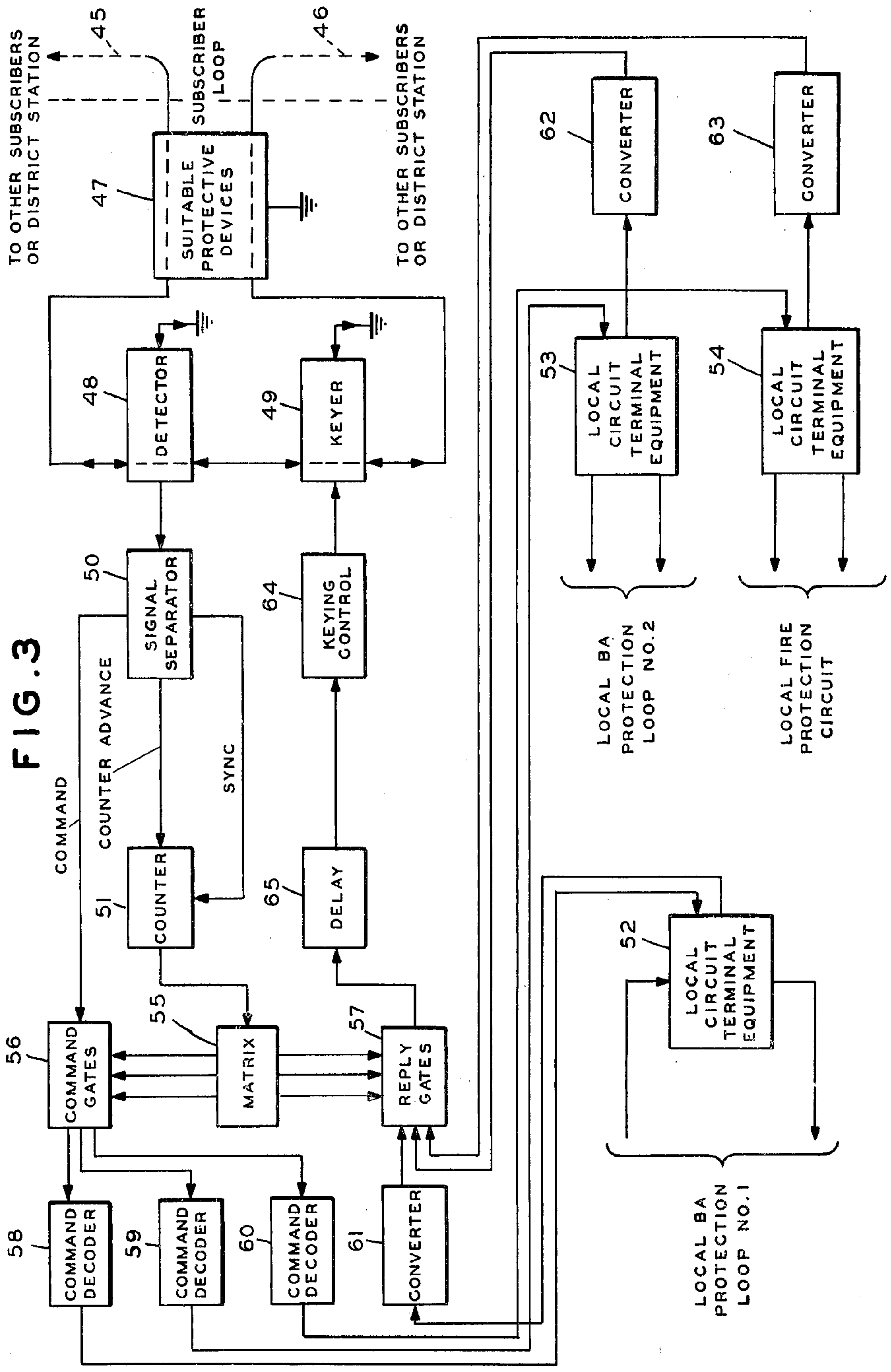
FIG. 3 is a simplified block diagram illustrating typical equipment provided at a subscriber's premises in the system of the invention.

As shown in FIG. 1, the various subscribers are connected in series in the subscribers' loop. The equipment which may be provided at each subscriber's premises is shown in the simplified block diagram of FIG. 3. In FIG. 3, the high side of the subscribers' loop is shown at 45 and the low side at 46. The high side 45 feeds in through suitable protective devices 47, such as are used on certain telephone and telegraph lines to protect against line voltage surges, lightning and other line conditions which could damage the subscribers' equipment. From the devices 47 the high side of the line is connected to a signal detector 48 where a voltage or current on the subscribers' loop is detected. The circuit is completed to the low side 46 of the subscribers' loop through a keyer 49 and the protective devices 47. The keyer 49 may open, ground or leave closed the subscribers' loop in response to directions from other circuitry, as will be described.

Figure 4:
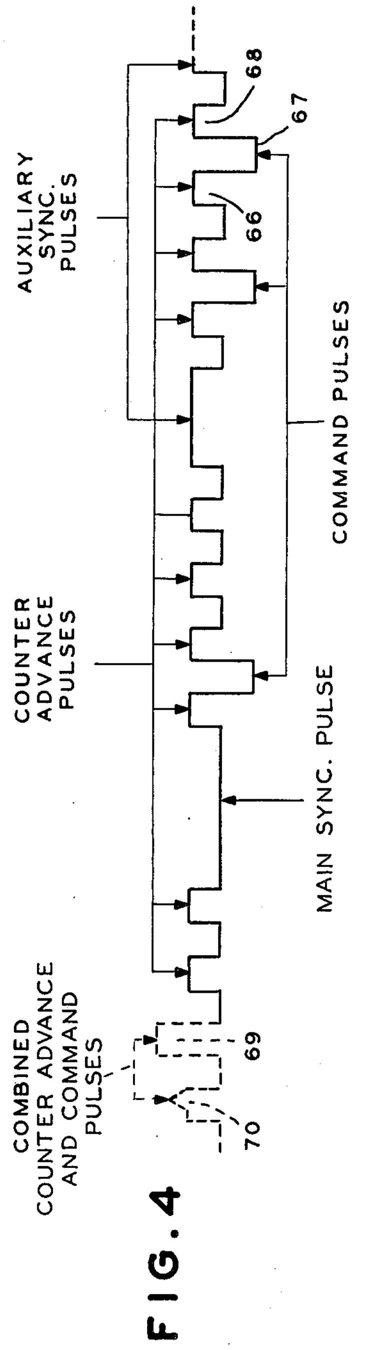
FIG. 4 is a diagram illustrating a sample code for use in a system embodying the equipment of FIG. 3.

A typical sequence of signals which may appear on the subscribers' loop and be applied to detector 48 is shown in FIG. 4. FIG. 4 corresponds to FIG. 2 except that four counter advance pulses are provided between successive auxiliary synchronizing pulses and except that command pulses are provided following selected counter advance pulses. The command pulses are of reverse polarity, although other arrangements could be used. For example, the command pulses could be of the same polarity as the counter advance pulses but of different magnitude. In the latter case the command pulses could occur in the time slots provided for counter advance pulses and could perform the function of the latter as well as the command function. The command pulses are intended to effect circuit operations at particular subscribers' premises, for example, in a burglar alarm system to initiate a test or to signal a subscriber that his premises are properly closed.

The current or voltage pulses detected in the detector 48 are supplied to a signal separator 50 which separates the command, counter advance and synchronizing pulses. The counter advance pulses and the synchronizing pulses, both main and auxiliary, are supplied to an electronic counter 51. The electronic counter 51 is preferably of the plural stage type and the auxiliary synchronizing pulses are used to reset the low counting stage or stages to zero after each train of counter advance pulses, i.e., after every four counter advance pulses in FIG. 4. The main synchronizing pulse serves to reset all the counter stages to zero and hence is used after a complete train of impulses has been transmitted by the district station, i.e., after all of the subscriber protection items in the subscribers' loop have been sampled once. Thus, each main synchronizing pulse serves to initiate a complete new cycle.

Should a counter advance pulse be lost at one or more of the subscribers' premises, the proper count will be restored after each auxiliary synchronizing pulse. Should a series of counter advance pulses and one or more auxiliary synchronizing pulses be lost, as by reason of a transient interference on the subscribers' loop, the proper count will be restored by the main synchronizing pulse. So long as two successive samples showing an alarm or trouble signal are required for the initiation of an alarm or trouble signal indication at the central station, loss of one or more counts between successive auxiliary synchronizing pulses or loss of a series of counts between succesive main synchronizing pulses will not result in a false alarm or trouble registration since the proper count will be restored before the initiation of the next succeeding complete train of pulses.

The subscriber illustrated in FIG. 3 is provided with local circuit terminal equipment for three local protection circuits, i.e., three subscriber protection items. By way of example, these are designated "Local BA Protection Loop No. 1," "Local BA Protection Loop No. 2," and "Local Fire Protection Circuit." The term "local" is used here to designate equipment at the subscribers' premises and not in the sense often used in the protection field to designate a type of system in which the alarm is given locally rather than at a central station. Assuming a subscribers' loop with 24 subscriber protection items, and assuming that there are six subscriber protection items associated with the subscribers' loop between the subscriber of FIG. 3 and the high side of the loop at the district station, the local circuit terminal equipment blocks designated 52, 53 and 54 might correspond to the seventh, eighth and ninth counter advance pulses, respectively, of each complete pulse train. The counter advance pulse assigned to a particular subscriber protection item does not necessarily reflect that particular subscriber's physical position on the loop. A complete pulse train is intended to mean all pulses transmitted by the district station from the beginning of one main synchronizing pulse to the beginning of the succeeding main synchronizing pulse, or, in other words, all of the pulses required for one interrogation of each subscriber item on the loop. Some of the counter advance pulses may be used for supervisory purposes.

Thus the electronic counter 51 would be required to count 24 counter advance pulses before being reset to zero count. For each of the seventh, eighth and ninth counter advance pulses, the counter 51 would be required to supply a count signal to a diode matrix 55.

The matrix 55 is coupled to command gates 56 and reply gates 57. There are three individual command gates in the block 56, each coupled to a respective one of local equipment blocks 52, 53 and 54 through a respective one of command decoders 58, 59 and 60. Similarly, there are three individual reply gates in the block 57, each coupled to a respective one of local equipment blocks 52, 53 and 54 through a respective one of converters 61, 62 and 63.

When the seventh counter advance pulse in each train is detected by the detector 48 and registered as a count in the counter 51, the matrix 55 provides an output signal to both the command gate and the reply gate associated with the local equipment terminal block 52. The matrix output applied to the reply gate opens the latter to permit transmission to a keying control 64 of a signal representative of the condition of the local BA protection loop No. 1, which signal is derived from switching contacts in block 52 and converted into appropriate form by converter 61.

The condition representative signal from converter 61 passes through the reply gate, through a time delay circuit 65, and is supplied to keying control 64. The delay circuit 65 prevents actuation of the keying control for a time interval sufficient to ensure that the counter advance pulse has registered a count in the electronic counters provided at all other subscribers' premises on the subscribers' loop 45–46. The time delay selected will depend upon circuit conditions but will be a fraction, preferably a small fraction, of the time duration of a counter advance pulse.

The condition representative signal applied to the keying control may be any one of three signals each corresponding to a respective local protection circuit condition, i.e., normal, trouble or alarm. The keying control actuates the keyer accordingly. Thus, if a normal condition calls for the subscribers' loop to remain closed, the keying control will cause the keyer to do nothing. If a trouble condition calls for the subscribers' loop to be opened, the keying control causes the keyer to open the subscribers' loop. And if an alarm condition calls for the subscribers' loop to be grounded, the keying control causes the keyer to ground the subscribers' loop. The duration of such an open or ground applied to the subscribers' loop will be short, ranging from the full time interval of the counter advance pulse less the delay time afforded by the delay circuit 65 to a fraction of this period. The subscribers' loop should be complete before the time of possible transmission of a command pulse is reached.

As mentioned above, when a seventh count is registered by the counter 51, the matrix 55 also opens the command gate associated with the terminal block 52. This gate remains open beyond the end of the seventh counter advance pulse so that a command pulse, if any, following the counter advance pulse, will pass from the signal separator 50 through the command gate 56 and be applied to the command decoder 58.

The command decoder 58 ascertains the nature of the command, if any, and provides an appropriate command signal to the terminal block 52. In certain situations, only one type of command will be used, for example, for periodic test of a pneumatic fire alarm system. In other situations, two or more types of command may be needed, for example, in burglar alarm systems. Where the commands can be arranged in a predetermined schedule, the command decoder 58 may be in the nature of a counting circuit which counts the command pulses intended for the corresponding terminal block and, from an established schedule, causes appropriate execution of the individual commands. When a schedule cannot conveniently be used, variations in the command pulses may be used to differentiate between different commands. For example, magnitude, time duration or time of occurrence within a complete command pulse interval may be used to distinguish between commands.

It is preferable that the command decoder be arranged to respond only when command pulses intended for the corresponding protection item appear in two or more successive complete trains of pulses and that the command pulses themselves be transmitted in a still greater number of successive complete trains of pulses so as to ensure against loss of a pulse or response to a spurious transient impulse resembling a command pulse.

In FIG. 4 the seventh counter advance pulse is designated 66 and the corresponding command pulse is designated 67. The eighth counter advance pulse is designated 68. There is no command pulse corresponding to the eighth counter advance pulse. A command pulse for a particular subscriber's protection item will only appear in pulse trains when a command is needed, whereas a counter advance pulse is provided in each complete train for each subscriber's protection item on the subscribers' loop.

When the eighth count is registered by the counter 51, the matrix 55 opens the command and reply gates associated with the terminal block 53 to permit application of a command, if present, to the block 53 and to permit transmission of a condition signal to the keying control 64. Similarly, when the ninth count is registered by the conuter 51, the matrix 55 opens the command and reply gates associated with the terminal block 54 to permit the application of a command, if present, to the block 54 and to permit transmission of a condition signal to the keying control 64. When the tenth count is registered by the counter 51, no action occurs since the tenth count does not correspond to one of the protection items at this subscriber's premises. However, the tenth counter advance pulse causes similar functions to be performed at another subscriber's premises on the subscribers' loop 45–46. The seventh, eighth and ninth counter advance pulses of all successive complete trains will cause corresponding functions to occur at the subscriber's premises of FIG. 3. Thus, each subscriber's protection item is sampled as to condition once in every complete train of pulses and a command may be supplied to any one or more of the subscriber's protection items in any complete train of pulses.

A command pulse may occur during the time interval allotted for a counter advance pulse, in which case the command pulse may perform both functions. Such an arrangement is preferred when the detector 48 and signal separator 50 are designed to respond to current or voltage impulses without regard to their polarity, which is desirable when operation is to be maintained with a fault on the line. A double magnitude counter advance pulse which could simultaneously serve as a command pulse is shown at 69 in FIG. 4. A counter advance pulse with a spike which serves as a command pulse is shown at 70 in FIG. 4. Other pulse differentiations could, of course, be used for this purpose. The signal separator 50 would recognize the pulse 69 or the pulse 70 as a combined pulse and apply the same to both the counter 51 and the command gate 56, assuming that the pulse corresponded to the proper count.

SIMPLIFIED SYSTEM BLOCK DIAGRAM, FIGS. 5 AND 6

FIGS. 5 and 6, when joined along the line 5—5, form a simplified system block diagram, including a central station 71, a district station 72, a subscriber No. 1 in block 73, and a subscriber No. *n* in block 74. The principal signal paths of FIGS. 5 and 6 are indicated by heavy weight lines. The central station and district station are joined by communication channels 75 and 76. The district station is connected to subscribers 1 and *n* and the other subscribers (not shown) included in the same subscribers' loop by a wire line designated 77, the high side of the loop leaving the district station being designated 77H and the low side returning to the district station being designated 77L. One or more additional subscribers' loops are indicated by the reference numeral 78.

The equipment provided at the premises of subscribers Nos. 1 and *n* may be identical with the correspondingly named and numbered equipment shown in FIG. 3, so that the operation of the subscribers' circuits will not be described in detail in connection with FIG. 5.

The subscribers' loop may be considered to begin and end at line driver 79, which continuously generates the train of counter advance and synchronizing pulses shown in FIG. 7. The timing of the pulse train is controlled by a master time base generator 80. The trains of pulses are supplied to a command converter 81 which acts to add command signals to the pulse trains whenever such commands have been initiated at the central station. The command for a particular subscriber's item may be added to a pulse train during the interval between the counter advance pulse for the corresponding subscriber's item and the next succeeding counter advance pulse, as shown in FIG. 7. The pulse trains next pass through a fault transfer unit 82 and a break detector 83 before being applied to the high side of the line at 77H.

The pulse trains continue along the subscribers' loop passing in sequence through the blocks 47, 48 and 49 at each subscriber's premises until after leaving the block 47 at the last subscriber's premises, No. *n*, the pulse trains return to the district station at the low side of the line, designated 77L. In the district station the pulse trains pass through fault transfer unit 82, a ground detector 84, again through fault transfer unit 82, and from thence to the low (ground) side of line driver 79.

Considering a single counter advance pulse of a single pulse train, if the corresponding local protection circuit is in normal condition, both break detector 83 and ground detector 84 detect normal line current and supply corresponding signals to a register circuit 85 through a fault condition unit 86. The fault condition unit 86 senses the presence or absence of current at the break and ground detectors and actually supplies a single corresponding signal to the register 85. If the corresponding local protection circuit is in a trouble condition, the subscribers' loop will be opened during the counter advance pulse duration and no current will be detected by either the break detector 83 or ground detector 84. The absence of current at both the break and ground detectors will be sensed by the fault condition unit 86, which supplies a corresponding signal to the register 85. If the corresponding local protection circuit is in an alarm condition, the subscriber's loop will be grounded during the counter advance pulse duration; the break detector will continue to detect current flow but the ground detector will be effectively shorted out by a direct return path to the line driver 79 through ground. The presence of current in the break detector 83 and the absence of current in the ground detector 84 will be sensed by the fault condition unit 86 and a corresponding signal will be supplied to the register 85.

The fault condition unit 86 will also sense a continuous open or ground on the subscribers' loop. Such a continuous open or ground on the loop represents a true circuit fault, and a corresponding signal will be supplied to the register 85.

The register 85 thus has applied thereto signals representative of the joint current sensing condition of the break and ground detectors. The register produces corresponding individual condition outputs which are strobed under control of the time base 80, the resulting strobed condition outputs being supplied to a multiplexer 87 which may be of any suitable type, e.g., time or frequency division. The multiplexer also receives similar signals from other subscribers' loops and transmits the condition output signals to a demultiplexer 88 at the central station. The multiplexer 87 is preferably of the time division type and is controlled by the master time base 80 which controls pulse generation for all of the subscribers' loops which use the common facility of multiplexer 87.

The demultiplexer 88 supplies the condition output signals derived from the register 85 to a decoder 89 and the condition output signals derived from other subscribers' loops to other decoders, as indicated by the line 90. The decoder 89 thus receives a condition signal for each counter advance pulse transmitted over the subscribers' loop 77. A synchronizing signal from time base 80 is also transmitted over the multiplexer channel 76 from multiplexer 87 to demultiplexer 88 and is supplied to a synchronized time base generator 91 which acts as a slave.

A timing signal from the time base generator 91 is supplied to decoder 89 to assure that the operation of the latter is maintained in exact synchronism with the operation of line driver 79. The decoder 89 determines the nature of each condition output signal received and supplies an appropriate signal indication to a display and recording circuit 92. The display might be in the form of three lights for each subscriber item, one representing normal condition, the second representing trouble, and the third representing an alarm. Since synchronized time bases are used at the district and central stations, exact registration between the display and the subscriber item being sampled will be maintained. Either the display circuit or the decoder may conveniently be arranged to require the presence of a trouble or alarm signal in two or more successive pulse trains to register such a signal. It is also desirable that trouble or alarm signals be recorded, and automatic recording apparatus may be provided for this purpose. The display circuit should also respond to signals representing true line faults on the subscribers' loop.

It should be understood that the terms "normal," "trouble" and "alarm" are given by way of illustration, since these are the most common signals. But in different classes of service the corresponding signals might not have the same meaning. Thus, in watchmen's reporting service the periodic transmission of the watchman's tour completion signal might be handled in exactly the same way as an alarm signal from a burglar alarm system. Less than three subscribers' signals can be used, if desired, and also more than three subscribers' signals. For example, to achieve more than three subscribers' signals different resistance values might be inserted in the subscribers' loop by the subscriber's keyer, or such resistances might be connected between the loop and ground. Such expedients could be used in place of actual opening or grounding of the circuit, although the latter are preferred for more reliable operation over long loops. Plural signals from a single subscriber's item may also advantageously be handled by assigning more than one counter advance pulse to that item or by sampling one set of conditions in one pulse train and a different set of conditions in the succeeding pulse train.

When the central station operator desires to transmit a command to a particular subscriber's item, he may operate a corresponding switch, dial code, or other signal control provided in a command initiation circuit 93. The initiated command is set up in the appropriate time slot in a command encoder 94, the timing being synchronized by a timing signal from the slave time base 91.

Commands from encoder 94 together with commands from corresponding encoders provided for other subscribers' loops are transmitted to the district station over a multiplex channel formed by multiplexer 95, communication channel 75 and demultiplexer 96.

Demultiplexed commands for subscribers' loop 77 are transferred from demultiplexer 96 to command converter 81 which inserts command signals into the pulse train output of line driver 79. The proper timing of the command pulses is ensured by the synchronization of the time base generators 80 and 91.

If desired, the time base 91 may be made the master and time base 80 the slave. The same basic time base should be used for all signals handled by multiplexers 87 and 95.

In the event of a fault on the subscribers' loop, such a fault is detected by the continued abnormal response of the break detector 83 and/or the ground detector 84, as sensed by the fault condition unit 86. The faults may be open line, grounded line, open-ground or ground-open. The fault condition unit senses the character of the fault and supplies a corresponding signal to the register 85 (for transmission to the central station) and to a fault control unit 97. The fault control unit 97 causes switching operations to take place in the fault transfer unit so as to gate the line driver pulse trains to permit continued operation with the fault on the line.

DETAILED SYSTEM BLOCK DIAGRAM, FIGS. 8, 9 AND 10

FIGS. 8, 9 and 10, when joined along the lines 8—8 and 9—9, show in detail a system in accordance with the invention and also show the interconnections within the system for the specific circuits shown in FIGS. 12–26.

The system of FIGS. 8, 9 and 10 comprises a central station 100, a district station 101 connected to the central station over a voice grade telephone type facility 102 and a group of subscribers connected in series on a subscriber's loop 103. The equipment provided for an intermediate subscriber 104 is shown in detail and other subscribers are indicated by the dashed sections 103′ of the loop 103. The subscribers' loop 103 may be a low-frequency grade telephone type facility. When telephone line facilities are used, as will usually be the case, a pair of wires would extend from the telephone exchange to each subscriber with the series connections being made at the exchange.

A line driver 105 supplies the voltage pulses of the pulse train shown at the top of FIG. 11 to the high side of loop 103 through a break detector 106. The output of the line driver is supplied to the loop 103 in part under control of a high frequency tone from a tone generator 107 and in part under control of binary signals derived from time base 108. For the code shown in FIG. 11, the time base 108 would supply square wave impulses at the interrogation pulse frequency and additional square wave impulses at a frequency one fourth that of the interrogation pulses which are used in the line driver to suppress every fourth interrogation pulse, thus forming the synchronizing pulses. The time base pulses are used to gate the tone to the line driver circuit which in turn gates a D.C. potential to the line. The tone is used to isolate the time base from the line and should be at a relatively high frequency as compared to the gating frequencies.

Most of the blocks in FIGS. 8, 9 and 10 represent circuits illustrated in detail in FIGS. 12–26, the corresponding figure number being shown in each block. These blocks also show the interconnecting terminals corresponding to the terminals shown in FIGS. 12–26. In FIGS. 12 and 14–26 these terminals are designated with a letter followed by the figure number, e.g., R12 or F14; in FIGS. 8–10 the figure number is omitted. In FIG. 13 letters are not used.

Each pulse output of line driver 105 appears at line driver terminal E and is applied to break detector terminal S. Within the break detector (FIG. 14) the pulse passes through a resistor 14–1 to output terminal P14, which is connected to the high side of line 103. As will be explained hereinafter, the voltage drop across resistor 14–1 is used as a measure of the instantaneous condition of the subscribers' loop 103.

At each subscriber's premises the pulse passes through a subscriber line detector 109 (FIG. 15), the pulse appearing at terminal N15, passing through a resistor 15–1 and appearing at output terminal L15. The terminal L15 is connected to input terminal N20 of a keyer 110 (FIG. 20), one of which is provided at each subscriber's premises. Input terminal N20 is coupled to output terminal L20 through a circuit including a transistor 20–1 and a diode 20–2. The transistor 20–1 is controlled by a signal applied to terminal H20 from output terminal T19 of a keying control circuit 111 (FIG. 19). This signal causes transistor 20–1 to be either conductive or non-conductive. When conductive, the transistor 20–1 passes the pulse along to line output terminal L20 and from thence to subscriber's loop 103. If transistor 20–1 is biased to a non-conductive condition, the subscriber's loop will be opened at transistor 20–1.

A transistor 20–3 is coupled between line terminal N20 and ground (through a diode 20–4′). The transistor 20–3 is biased to a conductive or non-conductive condition by a signal applied to input terminal R20 from keying control output terminal U19. With transistor 20–3 non-conductive, this transistor will not affect the pulse being transmitted over the subscribers' loop. However, with transistor 20–3 conductive, the terminal N20 and hence the subscribers' loop will be grounded through transistor 20–3 and diode 20–4'.

The pulse apppearing at output terminal L20 returns to the district station over the low side of the subscribers' loop and appears at terminal 13–6 of a fault transfer and conditioning circuit 112 (FIG. 13). Terminal 13–6 is, under normal subscribers' loop conditions, connected to terminal 13–5 through back contact 13–11 and armature 13–12 of a ganged switch 13–13.

Terminal 13–5 is connected to terminal S14 of a ground detector 113 (FIG. 14). The circuit of ground detector 113 may be identical with the circuit of break detector 106, but the external connections differ, as shown in FIG. 9. For example, terminals S14 and P14 are connected to line driver terminal E12 and line 103, respectively, for the break detector, while these same terminals are connected to terminals 13–5 and 13–3 of the fault transfer and conditioning circuit 112 for the ground detector.

In each case the subscribers' loop current passes through low value resistor 14–1, and the voltage across the resistor 14–1 is monitored by a high voltage transistor 14–2. The output of transistor 14–2 controls the passage of a tone to the input of a transistor amplifier 14–3, the tone being derived from output terminal T25 of tone generator 107 which is applied to input terminals U14 of break detector 106 and ground detector 113. The tone is amplified, under control of the ouput of transistor 14–2, by transistor 14–3, is rectified by diode 14–4, and the rectified tone is amplified by a transistor amplifier 14–16 to provide a D.C. output at output terminal F14. This output is controlled by the current in the subscribers' loop, and will be either —14 volts or ground.

The rectified tone output at terminal F14 of break detector 106 is supplied to terminal 13–1 of fault transfer and conditioning circuit 112, and, through armature 13–14 and back contact 13–15 of switch 13–13, to output terminal 13–8 and from thence to input terminal N21 of a register circuit 114 (FIG. 21).

The rectified tone output of a terminal F14 of ground detector 113 is supplied to terminal 13–2 of fault transfer and conditioning circuit 112 and, through armature 13–16 and back contact 13–17 of switch 13–13, to output terminal 13–10 and from thence to input terminal M21 of register circuit 114.

When the subscribers' loop 103 is in normal condition, i.e., not subject to a fault, a normal circuit condition for the subscriber's item corresponding to a particular pulse will be represented by current flow through resistors 14–1 of both break detector 106 and ground detector 113. This will result in an output at both terminals 13–8 and 13–10 and corresponding inputs at register input terminals N21 and M21.

The register circuit 114 may receive four inputs from the fault transfer and conditioning circuit, only two of which (those at terminals N21 and M21) are received during normal subscriber loop conditions. The other two, those applied to terminals P21 and L21, are used during continued operation with a fault on the subscribers' loop.

The register circuit includes transistors 21–1 and 21–2 connected as a bistable multivibrator. The register also receives a strobe pulse and a reset pulse from time base 108. These pulses are of short duration and occur at the same frequency as the interrogation pulses. The subscriber's item information inputs are sampled by the strobe pulse at or near the center of each interrogation pulse and this information is used to set the multivibrator circuit to its "1" condition if no alarm is reported. The multivibrator is reset to its "0" condition by the reset pulse before each strobe pulse so that a positive signal must be received from the subscriber's equipment to indicate a no-alarm or normal condition.

When the register flip-flop is set to its "1" condition, an output pulse appears at register output terminal T21, which output pulse is supplied to the proper channel of a multiplexer 115 which may be of any convenient type. The register 114 will supply an output pulse to multiplexer 115 only when subscribers' loop current is detected by both the break detector 106 and the ground detector 113, indicating a normal condition of the corresponding subscriber's item. Thus fail safe operation is provided since the positive presence of both a ground detector and break detector tone is required for the transmission of a no-alarm or normal condition signal.

Assuming that opening of the subscribers' loop at the keyer 110 during the corresponding pulse of each pulse train is to be used as an alarm signal from the subscriber to the district station, no current will be detected in resistors 14–1 of either the break or ground detectors under such condition. Thus, when an alarm occurs, no tone is applied to either of terminals M21 or N21 so that the corresponding strobe pulse applied to terminal S21 will not set the register flip-flop circuit to its "1" condition, and hence no output will be applied to multiplexer 115 from terminal T21.

As will be described more fully hereinafter, in the arrangement illustrated in FIGS. 8–10, an alarm signal is represented by breaking of the subscribers' loop in one frame and grounding thereof in the succeeding frame, the term "frame" being used to indicate corresponding counter advance or interrogation pulses in different complete pulse trains. However, as explained previously, breaking or grounding of the loop alone could be used to represent an alarm while the other could be used to represent a trouble or other signal. Alternatively, different interrogation pulses could be used to sample alarm and trouble conditions. If the same interrogation pulse is to be used to sample both alarm and trouble conditions, a separate register circuit may be used to respond to the trouble condition signal. In such case two multiplexer time slots may be used for each subscriber's item.

The operation of multiplexer 115 is synchronized with the subscribers' loop pulse trains by a signal from time base 108. Time base 108 will similarly be used to control other subscribers' loops (not shown) the outputs of which are supplied to corresponding channels of multiplexer 115. The subscribers' loop signals are supplied to a demultiplexer 116 over channel 102. A slave or synchronized time base 117 is synchronized with time base 108 by a synchronizing signal transmitted from multiplexer 115 to demultiplexer 116, as is well known in the art.

Demultiplexer 116 separates the signals corresponding to the different subscribers' loops (and also trouble and alarm signals from each loop) and supplies the signals corresponding to each subscribers' loop to a respective decoder 118 (FIG. 22). Decoder 118, under control of synchronized time base 117, separates the signals corresponding to each subscriber's item and provides corresponding signals representing subscriber's item conditions to display lamp panel 119 (FIG. 23). The outputs from decoder 118, together with similar outputs from other decoders, are supplied to a monitor lamp control panel 120 which provides an indication to central station personnel when a condition requiring attention has arisen.

The subscriber's line detector 109 receives interrogation pulses at input terminal N15 (or L15) and uses these input pulses as a gate to key a tone from tone generator 121 (received at terminal F15) to inturn key a D.C. potential to output terminal T15. The current flow through a low value resistor 15–1 (and/or the voltage between terminal N15 and ground) is sensed and used to gate the line detector output potential accordingly. The tone generator 121 may be identical with the tone generator 107 and both may operate at any suitable frequency, provided the frequency is much higher than the interrogation pulse frequency. As an example, the tone might be 30 kc.

The output of line detector 109 appears at terminal

T15 and is supplied to input terminal R16 of a signal separator 122 (FIG. 16). The function of the signal separator is to receive the sequentially coded signals from the line detector 109, separate the interrogation pulses from the synchronizing pulses, and route both types of pulses to the proper places. When the command feature is provided, the signal separator will also separate the command pulses from the interrogation and synchronizing pulses. The interrogation pulses appear at terminal U16 and are transmitted to the first flip-flop counter circuit 123. The synchronizing pulses are transmitted to the first flip-flop circuit 123 and to a second flip-flop circuit 125. The synchronizing pulses insure that the counter always starts counting interrogation pulses from the proper position, i.e., zero count.

A third flip-flop circuit 126 is provided in FIG. 8, the flip-flop circuits 123, 125 and 126 forming a three stage binary counter 127. Only three counting stages have been illustrated although normally a number of additional stages would be provided in order to accommodate a larger number of interrogation pulses in each pulse train, or, in other words, so that a greater number of subscriber items could be accommodated on the subscribers' loop.

Each of the counter flip-flop circuits may be identical with the one shown in FIG. 26, these being Eccles-Jordan type two-state memory devices or bistable multivibrators. The U16 output terminal of signal separator 122 and the U26 output terminals of flip-flop circuits 123 and 125 are connected to the H26 and R26 input terminals of flip-flop circuits 123, 125 and 126, respectively, the latter two being connected through diodes 128 and 129, respectively. The T15 and U26 output terminals of line detector 109 and flip-flop circuits 123 and 125 are also connected to input terminals M17, F17, and L17, respectively, of item matrix 124. The T26 output terminals of flip-flop circuits 123 and 125 are connected to item matrix input terminals T17 and P17, respectively. The U26 and T26 output terminals of the third flip-flop counter stage 126 are connected to input terminals R19 and H19, respectively, of keying control circuit.

The item matrix circuit 124, shown in detail in FIG. 17, is a diode matrix of input "AND" gates that takes the outputs from the flip-flop counters and samples the conditions of alarm contacts AC1, AC2 and AC3, shown in box 124'. Alarm contacts AC1, AC2 and AC3 represents the terminations of local protection circuits. Additional alarm contacts AC0 and a corresponding "AND" gate are shown in FIG. 17 to illustrate the item matrix construction for a more complicated system, but with the code shown in FIG. 11, only three items are sampled in each complete train so that the "AND" gate controlled by contacts AC0 is not used and may be considered opened at switch 17-1. With a four interrogation pulse code, the contacts AC0 would be used.

Contacts AC1, AC 2 and AC3 may each represent two possible conditions of individual local protection circuits, e.g., normal or alarm. Thus if any one or more of contacts AC1, AC2 and AC3 were open, the corresponding protection circuit would be in alarm condition and the corresponding "AND" gate would pass a signal pulse at the flip-flop count corresponding to the appropriate interrogation pulse. Should it be desired to signal more than two types of information with respect to a particular protection item, more than one of the contacts AC1, etc. could be used for that item. Thus contacts AC1 and AC2 closed could represent a normal condition, but contacts AC1 open could represent an alarm while contacts AC2 open could represent trouble, restoration or some other signal condition.

As an alternative, an additional item matrix could be provided to respond to a second abnormal condition for each protection item. In such case, the output of one item matrix could cause the subscribers' loop to be grounded or not grounded, as the case might be, while the other item matrix could cause the subscribers' loop to be opened or not opened, as the case might be. In this way a single interrogation pulse would serve to scan for three possible subscriber's item conditions. Another alternative would be to cause the contacts AC1, AC2, etc. to represent one possible condition for one frame and another possible condition on the succeeding frame. By counting the frames a specific one out of any desired number of frames might be used to scan for a particular condition while the remaining frames would be used to scan for another one or more conditions. Where any particular set of contacts AC1, AC2, etc. is to represent more than one condition for different frames, it is desirable that the contacts actually be in the form of an electronic device so that appropriately rapid switching may be effected.

The output of the item matrix 124 is the presence or absence of a voltage pulse at terminal U17. The presence of a voltage pulse on any particular frame represents an alarm condition, i.e., that the corresponding alarm contact AC1, AC2, etc., is open. The absence of a pulse would mean a normal condition.

The output of item matrix circuit 124 is applied to input terminal H18 of a delay circuit 130 (FIG. 18). delay circuit is provided at each subscriber's location to ensure that each interrogation pulse transmitted on the subscribers' loop has been received and detected in the line detectors 109 of all subscribers on the loop before any subscriber's keyer 110 operates. The delay circuit 130 provides a constant width, delayed output pulse at terminal U18 which is applied to input terminal J19 of keying control circuit 111.

The keying control circuit 111 gates the pulse output of delay circuit 130 with the two outputs from counter stage 126 to provide a tone signal to terminal U19 if there is an input pulse at terminals J19 and R19 and to provide a tone signal to terminal T19 if there is no input pulse at terminal J19. For one train of counter advance pulses the output of counter stage 126 will cause an alarm to be signalled by grounding the subscribers' loop and for the succeeding train by opening the subscribers' loop.

Terminal T19 is connected to input terminal H20 of keyer 110, while terminal U19 is connected to input terminal R20. Thus, when an alarm is to be transmitted, the tone at terminal F19 will not be applied to the break transistor of keyer 110 during one frame, but will be applied to the ground transistor of keyer 110 during the next frame. Absence of a tone applied to the break transistor acts to open the subscribers' loop. The break and ground detectors at the district station sense the condition of the subscribers' loop and transmit this information to the central station.

The alternate breaking and grounding of the subscribers' loop in successive frames permits continued operation with a fault on the line, as will be described hereinafter.

As mentioned above, an additional diode matrix may be used to transmit an additional subscriber's item condition signal. In such case the keying control circuit would not gate the alarm signal against the condition output of counter stage 126 but would act as a gate to pass the trouble or other additional condition signal to either the break or ground transistor of keyer 110 in the absence of an alarm signal. An alarm signal, where present, would operate the other one of the break and ground transistors since in this type of operation an alarm would be shown by one action on the loop while a trouble or other signal would be shown by the other action on the loop.

If a double fault exists on the subscribers' loop, it is possible that a subscriber located between the faults will not be connected to the district station and that the central station will not be aware of this condition. Where it is desired to protect against this possibility, a normal subscriber's item condition may be reported as a break, open or both (in successive frames). In such case an alarm might be reported by not acting upon the loop. In any event, with the subscriber's item condition normal, the central station would fail to receive a normal condition signal if a double fault should disconnect that subscriber, and such failure would be investigated.

TIME BASE

The time base 108 is the main timing control for the entire system, including the illustrated subscribers' loop and all other subscribers' loops which share the facilities afforded by the multiplexer 115. Ideally, the timing is derived from the multiplexer master timing oscillator, and hence the time base 108 is shown in FIG. 9 as forming part of the district station multiplexing system. As an example, the master oscillator might be a free running multivibrator arranged to provide a 1600 cycle per second square wave output. The various additional frequencies required by the system might be derived from submultiples of the master oscillator frequency, for example, through the use of a train of flip-flop stages, each affording a frequency one-half that of the preceding stage.

In the arrangement shown in FIG. 9, the time base is required to provide, in addition to the pulses required by the multiplexer 115, four outputs. One of these is a square wave signal at the desired interrogation pulse frequency, this signal being applied to the line driver terminal T12. The second is a square wave signal at the synchronizing pulse frequency which is applied to the line driver terminal R12. The third and fourth outputs are the strobe and reset pulses applied to terminals S21 and H21, respectively, of register 114. The strobe and reset pulses are short duration square wave pulses which occur at the interrogation pulse frequency but are phased relative to the interrogation pulses in a manner to be described hereinafter in connection with the register circuit.

If the master time base oscillator frequency is 1600 cycles per second, eight 2:1 frequency divisions would yield a frequency of 6.25 cycles, which is suitable for use as the interrogation pulse frequency. With the code shown in FIG. 11, every group of three interrogation pulses is followed by a synchronizing pulse which can be considered as the absence or cancellation of an interrogation pulse. Hence the synchronizing pulse of FIG. 11 appears at a frequency one quarter that of the interrogation pulses, or at a frequency of 1.5625 cycles per second. For simplicity, the code of FIG. 11 has been shown as providing a complete pulse train formed by three interrogation pulses followed by a synchronizing pulse. This would provide scanning of only three subscriber items or even less if more than one interrogation pulse is used for a subscriber's item.

In general, a complete pulse train will be substantially longer. For example, a pulse train might be formed from eight of the interrogation-sync groups of FIG. 11, which would afford 24 interrogation pulses and 8 synchronizing pulses for a complete pulse train. It is desirable in such a case that each complete pulse train be separated from the succeeding and preceding pulse trains by a distinctive main synchronizing pulse. For example, with a train of 24 interrogation pulses and eight synchronizing pulses, the main synchronizing pulse might be formed from a pulse whose duration was equal to four interrogation pulse periods and whose frequency was one thirty-sixth that of the interrogation pulses. The system is, of, course, not limited to one auxiliary sychronizing pulse and one main synchronizing pulse, since additional distinctive synchonizing pulses may be used for various purposes.

It should be understood that the particular interrogation and synchronizing pulse frequencies and the code arrangement thereof can be varied widely, as desired, and that those specifically described herein have been given only by way of example.

LINE DRIVER; FIG. 12

Basically, the line driver acts as a "but not" gate to apply 48 volts from input terminal D12 to output terminal E12 in accordance with the code of FIG. 11. Input terminal T12 is connected to that flip-flop circuit of time base 108 which provides the interrogation pulse frequency, in this case, 6.25 cycles. Input terminal R12 is connected to that flip-flop circuit of time base 108 which provides the synchronizing pulse frequency, in this case, 6.25/4 cycles. These flip-flops may be of the type shown in FIG. 26, in which case the terminals R12 and T12 would be connected to the terminals T26 of the corresponding flip-flops.

Terminal T12 is coupled to the base of transistor 12–1 through a diode 12–2 and a resistor 12–3. All diodes referred to herein are preferably solid state devices and diode 12–2 might be, for example, of the 1N38 type. All transistors, unless otherwise specified, are of the PNP type. Terminal R12 is coupled to the base of transistor 12–1 through a transistor 12–4, which acts as an inverter, and through resistor 12–3. Terminal H12 is coupled to the base of transistor 12–1 through a diode 12–5 and resistor 12–3, terminal H12 being supplied with the relatively high frequency tone signal from tone generator 121. Bias for the base-emitter circuit of transistor 12–1 is provided through a circuit extending from the −14 volt supply at terminal B12 through a resistor 12–6, resistor 12–3 and a resistor 12–7 to the +4 volt supply at terminal C12.

When terminal T12 is connected to ground potential through transistor 26–1 (FIG. 26), point 12–8 will be clamped to ground and transistor 12–1 will not conduct. However, ignoring for a moment the voltage at terminal R12, when a negative voltage pulse appears at terminal T12 point 12–8 will not be clamped to ground and the −14 volts at terminal B12 will cause transistor 12–1 to conduct and amplify the tone signal from terminal H12. Now considering terminal R12, if this terminal is connected to ground through transistor 26–1 of the synchronizing frequency flip-flop circuit, transistor 12–4 will not conduct and point 12–8 will not be clamped to ground potential so that transistor 12–1 will conduct if the potential at terminal T12 is such as would allow transistor 12–1 to conduct. But if transistor 26–1 is not conducting so that terminal R12 is negative, transistor 12–4 will conduct thereby clamping point 12–8 to ground potential and preventing conduction of transistor 12–1 even though terminal T12 is negative.

In other words, transistor 12–1 will conduct every time a negative pulse appears at terminal T12 except when terminal R12 is not clamped to ground. Since the synchronizing frequency is one-fourth the interrogation frequency, the effect is to cause transistor 12–1 to conduct for three successive interrogation frequency pulses but not to conduct for the fourth such pulse. Hence transistor 12–1 becomes conductive in accordance with the code of FIG. 11.

Whenever point 12–8 is not clamped to ground, which condition will prevail when a negative voltage is supplied to terminal T12 but not to terminal R12, the tone signal will be amplified by transistor 12–1. The amplified tone signal is rectified by diodes 12–9 and 12–13 and the resultant negative voltage is applied to the base of transistor 12–14 to cause the latter to conduct. When transistor 12–14 conducts the +48 volts at terminal D12 is supplied to output terminal E12 through the emitter-collector circuit of transistor 12–14. Thus the +48 volts is applied to output terminal E12 in accordance with the code of FIG. 11, the positive voltage pulses constituting the interrogation pulses for the subscribers' loop. The absence of a positive voltage pulse after every three such pulses constitutes the synchronizing pulse.

Resistors 12–15 and 12–16 form a voltage divider adjusting the potential on the base of transistor 12–14, while capacitor 12–17 acts to smooth out the rectified tone. Resistors 12–18 and 12–19 serve to limit the collector current of transistor 12–14 and protect the latter against line surges.

A positive, i.e., reverse, bias is applied to the base of transistor 12–14 to insure that this transistor ceases conduction as soon as the negative voltage is removed from terminal T12. This positive bias is derived by rectifying the tone signal appearing at terminal H12 by means of a circuit including diodes 12–20 and 12–21 and capacitor 12–22.

SUBSCRIBER'S LINE DETECTOR; FIG. 15

Input terminal N15 of the line detector is connected to the high side of the subscriber's loop while output terminal L15 is connected to the low side of the loop (through keyer 110). A resistor 15–1 is connected between terminals L15 and N15. The emitter of a transistor 15–2 and the base of a transistor 15–3 are conected to the low side of resistor 15–1. The base of transistor 15–2 and the emitter of transistor 15–3 are connected to the high side of resistor 15–1. The collectors of transistors 15–2 and 15–3 are connected together and to one end of a resistor 15–4, the other end of resistor 15–4 being coupled to tone signal input terminal F15 through a capacitor 15–5.

With the foregoing circuit arrangement, transistor 15–3 will be caused to conduct when a positive current pulse flows through resistor 15–1, while transistor 15–2 will be caused to conduct when a negative current pulse flows through resistor 15–1. With either of transistors 15–2 or 15–3 conductive, the tone signal at resistor 15–4 will be effectively shorted to ground through the conductive transistor and a capacitor 15–6. Diode 15–7 acts as a D.C. restorer. Positive half cycles of the tone will be shorted out through capacitor 15–8 and diode 15–9, diode 15–9 acting as a D.C. restorer.

Tone input terminal F15 is coupled to the base of a transistor 15–10 through a series circuit including capacitor 15–5, resistor 15–4, capacitor 15–8, diode 15–11 and resistor 15–12. A positive bias potential is supplied to the base of transistor 15–10 through a resistor 15–13 so that this transistor is normally non-conductive. A capacitor 15–13′ is provided between ground and the junction of diode 15–11 and resistor 15–12 to smooth out the negative tone signal rectified by diodes 15–9 and 15–11.

When the rectified tone signal is applied to the base of transistor 15–10, the latter conducts. In the absence of a rectified tone signal, the transistor will not conduct, a condition which will prevail whenever either of transistors 15–2 or 15–3 is conductive.

The emitter of transistor 15–10 is connected to ground while the collector is connected to the emitter of a transistor 15–14. Transistor 15–14 is normally biased to a conductive condition by means of the —14 volts applied to its base from terminal B15. However, in the event that a high positive voltage appears at either terminal N15 or L15, this voltage will be applied to the base of transistor 15–14 through a resistor 15–15 and will cut transistor 15–14 off.

Such a high voltage will appear at either of the terminals N15 or L15 if continued operation of the loop is maintained with an open fault. With such a fault current will not flow on the loop so that the interrogation pulse will appear on the loop as a high positive voltage. To operate on both sides of the fault, the interrogation pulses will be applied to both ends of the loop, so that the voltage pulse will appear at either terminal N15 or terminal L15 depending upon the fault location. A high positive voltage may also appear at terminal N when the corresponding subscriber is located near the high end of the loop. During normal operation, the interrogation pulses are positive current pulses. But, if operation is continued with a ground fault on the loop, and a particular subscriber is located between the fault and the low end of the loop, the interrogation pulses applied to the low side of the loop will flow through resistor 15–1 in a sense to be negative relative to the normal flow. Transistor 15–2 is provided to respond to such negative current pulses.

The collector of transistor 15–14 is coupled to the base of a grounded emitter-transistor 15–16 through series connected resistors 15–17, 15–18 and 15–19. With both transistors 15–14 and 15–10 conductive, the base of transistor 15–16 will be a slight positive potential relative to ground because of the +4 volts supplied through a resistor 15–20 and the low resistance path to ground afforded by the series connected collector-emitter circuits of transistors 15–10 and 15–14, which prevents application of the —14 volts at terminal B15 to the base-emitter circuit of transistor 15–16. The collector of transistor 15–14, which is coupled to terminal B15 through a resistor 15–21, is effectively at ground potential so that the entire —14 volts appears across resistor 15–21 and none is available for the base of transistor 15–16.

In other words, with both transistors 15–10 and 15–14 conducting, transistor 15–16 will not conduct. But if either or both of transistors 15–10 and 15–14 are not conducting, the —14 volts at terminal B15 is available for transistor 15–16 and will render the latter conductive. As explained above, transistor 15–10 will be non-conductive in the presence of a current pulse on the subscribers' loop while transistor 15–14 will be non-conductive in the presence of a positive voltage pulse on the subscribers' loop. Hence transistor 15–16 will conduct in the presence of an interrogation pulse but not otherwise, unless a similar but different duration pulse is used as a synchronizing pulse.

The negative voltage pulse applied to the base of transistor 15–16 in the presence of an interrogation pulse on the subscribers' loop is amplified by transistor 15–16 and the amplified pulse appearing at the collector is inverted and further amplified in a transistor 15–21, appearing at output terminal T15 as a negative voltage pulse.

Resistors 15–17, 15–18 and 15–19, together with capacitors 15–22 and 15–23, form a filter circuit to smooth out the negative voltage pulses applied to the base of transistor 15–16. This filter is provided so that, if the subscribers' loop is to be opened by other equipment during a pulse, the uneven signal which might result from successive conduction and non-conduction of transistors 15–10 and/or 15–14 will be avoided.

SIGNAL SEPARATOR; FIG. 16

The signal separator is intended to separate the interrogation and synchronizing pulses. In the illustrated circuit, a synchronizing pulse is represented by the absence of an interrogation pulse. The interrogation pulses appear at input terminal R16 as negative voltage pulses and are applied to the base of a transistor 16–1 through a capactitor 16–2. In the the absence of a negative pulse at the base, transistor 16–1 will be cut off by the +4 volts applied to the base through a resistor 16–3. The negative voltage pulses wiill make transistor 16–1 conduct.

The collector of transistor 16–1 is connected to a source of —14 volts through a resistor 16–4 and to the base of a transistor 16–5 (of the NPN type) through a resistor 16–6. Resistor 16–4 is connected in series with a resistor 16–7 and a capacitor 16–8, the latter being connected to a source of +4 volts. A resistor 16–9 is connected in parallel with capacitor 16–8. The junction of resistors 16–7 and 16–9 and capacitor 16–8 is connected to the base of a transistor 16–10 and the emitter of transistor 16–5.

Resistors 16–4, 16–7 and 16–9 and capacitor 16–8 form a time constant circuit such that, when transistor 16–1 is not conducting, capacitor 16–8 starts charging toward a small negative voltage, about 4 or 5 volts negative. Except in the presence of a synchronizing pulse, before the base of transistor 16–10 reaches ground potential an interrogation pulse applied to transistor 16–1 will make the latter conductive. With transistor 16–1 conductive, the base of transistor 16–5 will go positive and transistor 16–5 will conduct, thereby discharging capacitor 16–8 to a small positive voltage, approximately 2 or 3 volts plus. When transistor 16–1 is cut off, capacitor 16–8 again starts to charge toward a negative voltage sufficient to make transistor 16–10 conduct. But so long as interrogation pulses are applied to transistor 16–1, the charge on capacitor 16–8 will not become sufficient to cause transistor 16–10 to conduct.

During the synchronizing pulses, transistor 16–1 will not become conductive over an extended interval of time. The charging time constant for capacitor 16–8 is adjusted so that during this long interval, but after the time represented by the period of the interrogation pulses, the charge on capacitor 16–8 will become sufficient that the resulting negative voltage at the base of transistor 16–10 will cause the latter to conduct. Thus transistor 16–10 will conduct when, but only when, a synchronizing pulse is detected. And this detection is effected by sensing the time duration of the synchronizing pulse.

The negative voltage pulse at the base of transistor 16–10 resulting from the charging of capacitor 16–8 is amplified in transistor 16–10 and in a transistor 16–11. A transistor 16–12 is connected as an emitter follower between transistors 16–11 and 16–13 to render the latter conductive when a synchronizing pulse is detected. In the absence of a synchronizing pulse, output terminal K16 will be at −2 volts, which is derived from terminal M16. But when a synchronizing pulse is detected, transistor 16–13 will conduct and drive terminal K16 to +4 volts, which is the synchronizing pulse output of the signal separator.

Each interrogation pulse applied to terminal R16 causes transistor 16–1 to conduct, applying a positive voltage pulse to the base of a transistor amplifier 16–14. The negative voltage pulse output of transistor 16–14 is amplified and inverted by a further transistor amplifier 16–15. Hence a positive going voltage pulse is applied to output terminal U16 each time an interrogation pulse appears at input terminal R16. However, this positive voltage pulse is of short duration because transistor 16–15 will be cut off when a capacitor 16—16 charges up sufficiently so that the −14 volts applied through resistor 16–17 will be blocked, allowing the +4 volts applied through resistor 16–18 to the base of transistor 16–15 to cut off the latter. The time constant of the capacitor 16–16 charging circuit, including resistor 16–17 and a resistor 16–19, should be selected so that transistor 16–15 will conduct for only a short time interval, giving a short duration positive pulse at terminal U16. In effect, the pulse is differentiated. A suitable time will be a short portion of an interrogation pulse and might be of the order of 50 microseconds. This pulse is used only to trigger the first counter stage 123.

BINARY COUNTER STAGES; FIG. 26

Three binary counter stages connected in tandem are shown in FIG. 8. These stages may each be of the type shown in FIG. 26, this being a so-called flip-flop or bistable multivibrator circuit. The flip-flop circuit uses transistors 26–1 and 26–2, which conduct alternately in the well-known manner.

The synchronizing pulse output of the signal separator 122 is applied to terminals K26 of the first two counter stages 123 and 125. This output is a positive pulse which is applied to the base of transistor 26–1 in each circuit through diodes 26–3 and 26–4 and renders transistor 26–1 non-conductive and hence transistor 26–2 conductive. This condition of the transistors may be termed the "0" condition, and when all of the counter stages are in "0" condition the total count is zero.

The differentiated positive interrogation pulse output of the signal separator is applied to input terminals H26 and R26 of the first counter stage 123. It will be recalled that there is no interrogation pulse during the synchronizing pulse so that no pulse is applied to terminals H26 and R26 at zero count.

The first interrogation pulse after the synchronizing pulse may be considered the one count. This pulse appearing at terminal H26 of stage 123 does nothing since transistor 26–1 is already cut off. However, the same pulse appearing at terminal R26 cuts off transistor 26–2, in turn rendering transistor 26–1 conductive. The first counter stage is now in its "1" condition and the total count is one. With transistor 26–2 cut off, the −14 volts from terminal B26 will appear at output terminal U26, designated the "1" output. This negative pulse is not used in the second counter stage 125 because of diodes 26–4 and 26–5 which render transistors 26–1 and 26–2, respectively, insensitive to negative pulse inputs. When transistor 26–1 conducts, its collector is effectively placed at ground potential. The "0" output terminal T26 can thus be considered as having a positive voltage pulse or ground, ground potential being positive relative to the negative supply.

The second interrogation pulse (count 2) renders transistors 26–1 and 26–2 of stage 123 non-conductive and conductive, respectively, i.e., it returns stage 123 to its "0" condition. The resultant positive voltage pulse at output terminal U26 causes second counter stage 125 to shift from its "0" to its "1" condition. The third interrogation pulse (count 3) does not affect the second counter stage but it does shift the first counter stage to its "1" condition.

There is no fourth interrogation pulse but the synchronizing pulse output of the signal separator appearing at terminals K26 of the first and second counter stages has the same effect as would a fourth interrogation pulse, i.e., returning both the first counter stage 123 and the second counter stage 125 to their respective "0" conditions. The resulting positive voltage pulse at the "0" output terminal U26 of the second counter stage 125 causes the third counter stage 126 to shift from its "0" condition to its "1" condition. The next synchronizing pulse will return the third counter stage to its "0" condition.

The counter stages operation may be summarized by the following table showing counter stage conditions at different counts:

*Table I*

| Count | Stage 1 (123) | Stage 2 (125) | Stage 3 (126) |
|---|---|---|---|
| 0 (Sync) | "0" | "0" | "0" |
| 1 | "1" | "0" | "0" |
| 2 | "0" | "1" | "0" |
| 3 | "1" | "1" | "0" |
| 0 (Sync) | "0" | "0" | "1" |
| 1 (4) | "1" | "0" | "1" |
| 2 (5) | "0" | "1" | "1" |
| 3 (6) | "1" | "1" | "1" |
| 0 (Sync) | "0" | "0" | "0" |

The corresponding potentials (ground or negative) for output terminals T26 ("0") and U26 ("1") are shown in the following table:

*Table II*

| Count | Stage 1 (123) | | Stage 2 (125) | | Stage 3 (126) | |
|---|---|---|---|---|---|---|
| | T ("0") | U ("1") | T ("0") | U ("1") | T ("0") | U ("1") |
| 0 (Sync) | — | g | — | g | — | g |
| 1 | g | — | — | g | — | g |
| 2 | — | g | g | — | — | g |
| 3 | g | — | g | — | — | g |
| 0 (Sync) | — | g | — | g | g | — |
| 1 (4) | g | — | — | g | g | — |
| 2 (5) | — | g | g | — | g | — |
| 3 (6) | g | — | g | — | g | — |
| 0 (Sync) | — | g | — | g | — | g |

In the system illustrated there are only three subscriber items to interrogate so each pulse train is made up of one synchronizing pulse and three interrogation pulses. However, successive frames report alarms in a different manner, under control of the third counter stage 126. Where more items are to report, a complete pulse train would be made up of additional interrogation and preferably also synchronizing pulses, and a binary count would be provided for each interrogation pulse and also preferably for each synchronizing pulse. In the arrangement illustrated, the third counter stage could be used for interrogation pulses, which would increase the loop capacity to six interrogation and two synchronizing pulses per complete pulse train. In such case the second synchronizing pulse would preferably be distinctive, e.g., a long duration positive pulse which would be separated out in the signal separator 122 and used to return the total count to zero at the end of a pulse train.

A single binary count will be required at each subscriber's premises for each item reporting on the loop, and also preferably for each synchronizing pulse. However, only those counts for which a particular subscriber is to report will result in a count output to the item matrix 124.

An extra two binary counts and a corresponding two additional interrogation pulses may be used to facilitate loop operation under fault conditions, as will be described in detail hereinafter.

ITEM MATRIX; FIG. 17

The item matrix 124 comprises a series of four input AND gates, one gate being provided for each item to be reported by a particular subscriber. With the arrangement illustrated, only three such AND gates are needed, but four are shown for illustrative purposes. Thus the AND gate corresponding to zero count would not be used where, as here, the zero count is for synchronizing information only.

Each input AND gate receives four inputs, one being the interrogation pulses appearing at output terminal T15 of line detector 109, the second and third being respective counter outputs, and the fourth being a respective alarm contact output. Referring to Table II, for count 1 terminals T26 (123) and U26 (125) will be high and terminals U26 (123) and T26 (125) will be low, while for count 2 terminals U26 (123) and U26 (125) will be high and terminals T26 (123) and U26 (125) will be low. A unique combination of counter outputs will exist for each count.

In FIG. 17 the four individual AND gates for counts 0–3 are each associated with a respective one of the conductors 17–2, 17–3, 17–4 and 17–5. The interrogation pulse output of the line detector 109 is applied to terminal M17 and through respective diodes 17–6, 17–7, 17–8 and 17–9 to respective conductors 17–2, 3, 4 and 5. The conductors 17–2, 3, 4 and 5 are each supplied with −14 volts from terminal B17 through a respective one of resistors 17–10, 17–11, 17–12 and 17–13.

Terminal T17, to which is supplied the "0" output of the first counter stage 123, is coupled to conductors 17–2 and 17–4 through diodes 17–14 and 17–15, respectively. Terminal F17, to which is supplied the "1" output of the first counter stage 123, is coupled to conductors 17–3 and 17–5 through diodes 17–16 and 17–17, respectively. Terminal P17, to which is supplied the "0" output of the second counter stage 125, is coupled to conductors 17–2 and 17–3 through diodes 17–18 and 17–19, respectively. Terminal L17, to which is supplied the "1" output of the second counter stage 125, is coupled to conductors 17–4 and 17–5 through diodes 17–20 and 17–21, respectively.

Conductor 17–2 is normally coupled to ground through a diode 17–22, terminal N17, and alarm contact AC0. Conductor 17–3 is normally coupled to ground through a diode 17–23, terminal J17 and alarm contact AC1. Conductor 17–4 is normally coupled to ground through a diode 17–24, terminal D17 and alarm contact AC2. Conductor 17–5 is normally coupled to ground through a diode 17–25, terminal R17 and alarm contact AC3.

Conductors 17–2, 3, 4 and 5 are coupled to the base of a transistor 17–26 through a resistor 17–27 and a respective one of diodes 17–28, 17–29, 17–30 and 17–31. The collector of transistor 17–26 is supplied with −14 volts while the emitter is supplied with +4 volts through a resistor 17–32.

Referring to Table II, it will be seen that at 0 count the "0" and "1" outputs of the first counter are negative and ground, respectively, while the "0" and "1" outputs of the second counter are likewise negative and ground, respectively. Therefore, terminals F17 and L17 will be at ground potential and conductors 17–3, 17–4 and 17–5 will be at ground potential through diodes 17–16, 17–17, 17–20 and 17–21. But conductor 17–2 will not be grounded through diodes 17–14 and 17–18 since terminals T17 and P17 are negative. If alarm contact AC0 is open, representing an alarm or other signal condition of the associated protection item, diode 17–22 will not conduct. But with contact AC0 closed, conductor 17–2 would be placed at ground potential through diode 17–22, which would represent another signalling condition, e.g., a normal condition of the associated protection item.

With the code shown, no interrogation pulse output of the signal separator is provided for the 0 count, so that resistor 17–10, diodes 17–6, 17–14, 17–18 and 17–28 and conductor 17–2 would be omitted. Switch 17–1 is shown as an indication of omission of these elements. But, assuming that such an output were present at the start of the interrogation pulse period terminal M17 would be at a negative potential because of the negative pulse output at terminal T15 of the line detector 109. Assuming contact AC0 to be open, conductor 17–2 would then be maintained at a negative potential through resistor 17–10 (there being no ground connections to conductor 17–2). This negative potential would be applied to the base of transistor 17–26 through diode 17–28 and resistor 17–27.

Thereupon transistor 17–26 would conduct and its emitter would be at the −14 volt collector potential, applying a negative pulse to output terminal U17. The ground potential applied to terminal M17 at the end of each interrogation pulse would remove the negative potential from the base of transistor 17–26 so that the +4 volts applied to its emitter through resistor 17–32 would cut transistor 17–26 off. Terminal U17 is kept from going above ground potential by diode 17–33.

Had contact AC0 been closed, conductor 17–2 would have remained at ground, transistor 17–26 would not have conducted, and terminal U17 would have remained at ground potential.

The counter circuits are reset by the 1 count interrogation pulse so that terminals T17 and L17 will be at ground while terminals F17 and P17 will be at a negative potential. Ground at terminals T17 and L17 results in conductors 17–2 and 17–4 being at ground; conductor 17–5 will be at ground also through diode 17–21 and terminal L17. Hence only conductor 17–3 will be in condition to go negative when terminal M17 becomes negative, but conductor 17–3 will actually go negative only if contact AC1 is open. If contact AC1 is open, a negative voltage pulse will appear at terminal U17, as described above.

Similarly, for the 2 count and 3 count interrogation pulses, conductors 17–4 and 17–5 will be conditioned to go negative and produce negative output pulses if contacts AC2 and AC3, respectively, are open. The fourth count is again a synchronizing pulse so that actually there is no interrogation pulse. But it there were an interrogation pulse, the operation would be identical to that described above on the assumption that there was an interrogation pulse.

No output of the item matrix is provided for the synchronizing pulse in the arrangement described, but the circuit, with switch 17–1 closed, is capable of a corresponding count. Hence the item matrix circuit with the four AND gates instead of the three that are necessary would be suitable for use with a code as shown in FIG. 2 when the auxiliary synchronizing pulses could be used not only for synchronizing but also for advancing the counter. In such an arrangement the auxiliary synchronizing pulse would produce a count output of the signal separator and also could be used to apply a synchronizing output to the lower order counter stages. The mere presence of the auxiliary synchronizing pulse would produce a count output, while the charging of an RC circuit could sense the length of the pulse to produce the auxiliary synchronizing output. In this way the lower order counter stages would be reset to zero even if an interrogation pulse had been lost. The main synchronizing pulse of FIG. 2 could be detected in the same way as shown for the synchronizing pulses of FIG. 11 and applied to all counter stages (except the last stage, where fault operation is desired) positively to return the count to zero after a complete pulse train.

The signals at the cathodes of diodes 17–29, 17–30 and 17–31 are shown in FIG. 11 in addition to the subscribers' loop code.

DELAY CIRCUIT; FIG. 18

The delay circuit 130 is provided at each subscriber's location to ensure that each interrogation pulse on the subscribers' loop advances the counter circuits of each subscriber one count before the keyer of any particular subscriber operates. The delay circuit 130 is of conventional design and could easily be replaced with other well-known delay circuits, as for example, a magnetostrictive delay line. The delay circuit receives at its input terminal H18 the negative output pulses at terminal U17 of item matrix 124. Such a negative pulse will occur only when the appropriate one of the alarm contacts is open. This will, as described, correspond to an alarm, but it might just as well correspond to a normal condition if that were desired. In the latter case the subscribers' loop would be acted upon positively for a normal report but could be maintained closed for an alarm or abnormal report. One advantage of such an arrangement would be that a disconnected subscriber in the case of a double open fault would be detected by the absence of a normal report at the central station.

Terminal H18 is connected to the base of a transistor 18–1 through a resistor 18–2. The base of transistor 18–1 is also coupled to ground through a capacitor 18–3 and to +4 volts at terminal C18 through a resistor 18–4, this latter connection normally maintaining transistor 18–1 nonconductive.

A negative voltage pulse applied to terminal H18 renders transistor 18–1 conductive after a time interval determined by the charging time constant of the RC circuit formed by capacitor 18–3 and resistor 18–2. This delay will normally be made a short portion of the interrogation pulse duration. The delay duration depends upon loop characteristics, but might be, for example, about one-quarter of the interrogation pulse length.

The negative voltage pulse applied to the base of transistor 18–1 is amplified and inverted, the resulting positive going pulse at the collector of transistor 18–1 being supplied through a capacitor 18–5 and a diode 18–6 to the base of a transistor 18–7.

Transistor 18–7 and a transistor 18–8 are connected as a one-shot or monostable multivibrator. In the stable condition, transistor 18–7 is conductive. But the positive going pulse applied to the base of transistor 18–7 cuts transistor 18–7 off and renders transistor 18–8 conductive. Cutting off of transistor 18–7 provides a negative going pulse at output terminal U18. At the end of the positive going pulse at the base of transistor 18–7, the transistors 18–7 and 18–8 will revert to their stable condition as soon as capacitor 18–9 has discharged. The discharge time constant of capacitor 18–9 should be selected so that the negative pulse at output terminal U18 will persist at least until the end of the interrogation pulse, but will be terminated prior to the beginning of the next interrogation pulse.

KEYING CONTROL; FIG. 19

The keying control circuit 111 gates the output from the delay circuit with the outputs from the third counter stage 126, the output of the gates being used to control the transmission of a tone to the keyer 110.

The keying control circuit 111 receives three inputs in addition to the delay circuit negative pulses applied to the input terminal J19. These other inputs are a tone applied to input terminal F19, the "0" output of third counter stage 126 applied to input terminal H19 and the "1" output of third counter stage 126 applied to input terminal R19.

Terminals R19, J19 and F19 are coupled to the base of a transistor 19–1 through a resistor 19–2 and respective ones of diodes 19–3, 19–4 and 19–5. The resistor 19–2 is shunted by a capacitor 19–6. The base of transistor 19–1 is coupled to a source of +4 volts through a resistor 19–7 and to a source of −14 volts at terminal B19 through resistor 19–2 and a resistor 19–8. The collector of transistor 19–1 is coupled to the source of −14 volts through a resistor 19–9. The collector of transistor 19–1 is connected directly to output terminal U19.

Terminals J19 and H19 are coupled to the base of a transistor 19–10 through a resistor 19–11 and through respective ones of diodes 19–12 and 19–13. The base of transistor 19–10 is coupled to a source of +4 volts through a resistor 19–14 and to −14 volt terminal B19 through resistor 19–11 and a resistor 19–15. The collector of transistor 19–10 is coupled to the −14 volt terminal through a resistor 19–16 and to the base of a transistor 19–17 through parallel connected resistor 19–18 and capacitor 19–19.

Input terminal F19 is coupled to the base of transistor 19–17 through resistor 19–18 and a diode 19–20. The base of transistor 19–17 is coupled to a source of +4 volts through a resistor 19–21. The collector of transistor 19–17 is connected to output terminal T19 and is coupled to −14 volt terminal B19 through a resistor 19–22.

With counter stage 126 in its "0" condition, ground will be applied to terminal R19 from terminal U26 (126) and a negative potential will be applied to terminal H19 from terminal T26 (126). With counter stage 126 in its "1" condition, these potentials will be reversed, i.e., terminal R19 will be negative and terminal H19 will be at ground.

Depending upon circuit conditions, as will be described, a tone signal from terminal F19 will be applied or not applied to output terminals T19 and U19. Terminal U19 is connected to the ground keyer so that presence of a tone at terminal U19 will ground the subscriber's loop while absence of a tone at terminal U19 will leave the loop ungrounded, i.e., normal. On the other hand, terminal T19 is connected to the break keyer so that presence of a tone on terminal T19 will leave the subscriber's loop unbroken while absence of a tone on terminal T19 will open the loop.

Three circuit conditions can prevail in FIG. 19. The first of these is a normal, i.e., absence of alarm, condition with ground on terminal J19. In this condition tone is to be applied to break keyer terminal T19 to keep the loop intact, and tone is not to be applied to ground keyer terminal U19 in order not to ground the loop. These tone applications are to prevail irrespective of the inputs to terminals H19 and R19.

Tone from terminal F19 will pass through diode 19–20, will be amplified by transistor 19–17, and will appear at terminal T19 unless transistor 19–10 is conducting, since such conduction would ground the tone at the collector of transistor 19–10. But transistor 19–10 cannot conduct if terminal J19 is at ground since the junction of resistors 19–15 and 19–11 would be at ground through diode 19–12 and therefore the +4 volts applied to the base of transistor 19–10 through resistor 19–14 would be effective to cut off transistor 19–10. Terminal J19 will be at ground in the absence of an alarm report.

Tone can be applied to terminal U19 only through transistor 19–1 which is interposed as an amplifier between diode 19–5 and terminal U19. But transistor 19–1 will be cut off through diode 19–4 when terminal J19 is at ground.

Hence when no alarm is to be reported, the ground potential at terminal J19 will cause tone to appear at terminal T19 but will prevent its appearance at terminal U19.

The second circuit condition which can prevail in FIG. 19 is for an alarm to exist with counter stage 126 in its "0" condition. Under this condition tone should not be applied to either of the terminals U19 and T19, so that the subscribers' loop will be opened. Terminals J19 and H19 will be negative and terminal R19 will be at ground. Ground at terminal R19 will prevent tone application to terminal U19 as described above by cutting off transistor 19–1.

Diodes 19–13 and 19–12 essentially form an AND gate that will allow transistor 19–10 to conduct when both terminals H19 and J19 are negative, since with this situation the negative potential from terminal B19 will be effective to render transistor 19–10 conductive. With transistor 19–10 conductive, the tone will not appear at the base of transistor 19–17 but instead will go to ground through the collector-emitter circuit of transistor 19–10.

The third condition which can prevail in FIG. 19 is for an alarm to exist with counter stage 126 in its "1" condition. Under this condition tone should be applied to both output terminals U19 and T19 so that the subscribers' loop will be grounded. In the counter stage 126's "1" condition, terminal H19 will be at ground and terminal R19 will be negative.

Diodes 19–3 and 19–4 act as an AND gate to allow transistor 19–1 to conduct when both terminals R19 and J19 are negative. Hence the tone applied to the base of transistor 19–1 through diode 19–5 will be amplified and will appear at terminal U19. With terminal H19 at ground transistor 19–10 will be cut off and tone applied to transistor 19–17 through diode 19–20 will be amplified and will appear at output terminal T19.

The following table summarizes the three conditions described above:

*Table III*

| Keying Control Condition | U19 (R20) | T19 (H20) | Subscribers' Loop |
|---|---|---|---|
| Normal (no alarm) | No tone | Tone | Normal. |
| Alarm 126—"0" | No tone | No tone | Open. |
| Alarm 126—"1" | Tone | Tone | Grounded. |

The keying control circuit thus provides either of two alarm outputs, depending upon the condition of counter stage 126. If desired, a single output for alarm and a different output for trouble could be provided by having the contacts AC1, AC2, etc., open for any abnormal condition and having the H19 and R19 terminals negative-positive or positive-negative, depending upon which abnormal condition is to be reported. This gating could conveniently be effected with a flip-flop circuit of the type shown in FIG. 26, but it would not be a counter stage.

KEYER; FIG. 20

The keyer circuit 110 is provided to enable the subscribers' loop to be either opened or grounded where required by the keying control circuit outputs. The keyer receives the ground keying tone at terminal R20, the break keying tone at terminal H20, and a tone signal from tone generator 121 at terminal F20. Terminal N20 is connected to the high side of the subscribers' loop (low side of resistor 15–1). Terminal L20 is connected to the low side of the subscribers' loop which runs to terminal 6 of the fault transfer and conditioning circuit 112 at the district station, either directly or through the line detectors and keyers of other subscribers.

The keyer circuit comprises transistors 20–1, 20–3 and 20–4. The subscribers' loop (for normal loop condition) comes in at terminal N20, extends through the emitter-collector circuit of transistor 20–1, power diode 20–2, and goes out at terminal L20. With reverse polarity on the loop, the loop would come in at terminal L20, extend through the emitter-collector circuit of transistor 20–4, power diode 20–5, and pass out through terminal N20. In either case, the appropriate one of transistors 20–1 and 20–4 needs to be conductive for the subscribers' loop to be completed. Actually, both of these transistors will be conductive so long as a tone is present on terminal H20.

Conduction of transistor 20–4 is effected by passing the tone signal at terminal H20 through a capacitor 20–6, a diode 20–7 and a resistor 20–8 to the base of transistor 20–4. The diode rectifies the tone to provide a forward bias for transistor 20–4, rendering the latter conductive. Diode 20–9 acts as a D.C. restorer and capacitor 20–10 smooths the rectified tone. A positive or reverse bias is also provided at the base of transistor 20–4 in order to ensure that this transistor will be nonconductive in the absence of a tone at terminal H20. This positive bias is provided by rectifying the tone derived from tone generator 121 and applied to terminal F20, the circuit including a capacitor 20–11, diodes 20–12 and 20–13, a capacitor 20–14, and a resistor 20–15.

The forward bias for transistor 20–1 is derived from terminal H20, the tone signal being passed through a capacitor 20–16, a diode 20–17 and a resistor 20–18. Diode 20–19 acts as a D.C. restorer and capacitor 20–20 smooths the tone rectified by diode 20–17. Again, a reverse bias is provided at the base of transistor 20–1 to ensure that this transistor cuts off in the absence of a tone at terminal H20. The reverse bias is derived from terminal F20, the circuit including capacitor 20–21, diodes 20–22 and 20–23, a capacitor 20–24, and a resistor 20–25.

Thus, so long as a tone signal is present at terminal H20, the subscribers' loop will be complete, but, in the absence of a tone, the loop will be open. Of course, any such open lasts only until the end of the corresponding interrogation pulse.

Transistor 20–3, when conductive, provides a shunt path between terminal N20 and ground, the path extending through the emitter-collector circuit of transistor 20–3 and a diode 20–4'. Diode 20–4' and a diode 20–26 between the collector and emitter of transistor 20–3 are provided to protect transistor 20–3 against excessive back voltage should the loop be driven negative.

Normally, transistor 20–3 will be nonconductive because of a reverse (positive) bias applied to the base. This bias is derived from terminal F20 by rectifying the tone present on that terminal. The circuit includes a capacitor 20–27, diodes 20–28 and 20–29, a resistor 20–30 and a capacitor 20–31. In the three positive bias circuits referred to, capacitors 20–14, 20–24 and 20–31 are for smoothing purposes, while diodes 20–13, 20–22 and 20–29 are D.C. restorers.

In the presence of a tone signal at terminal R20, transistor 20–3 will be rendered conductive and accordingly will ground the subscribers' loop. The tone at terminal R20 passes through a capacitor 20–32, is rectified by a diode 20–33, and is applied to the base of transistor 20–3 through a resistor 20–34. Diode 20–35 acts as a D.C. restorer, while a capacitor 20–36 is provided to smooth the rectified tone.

Grounding the subscribers' loop at terminal N20 also effectively grounds the loop at terminal L20 through transistor 20–1 and diode 20–2 or transistor 20–4 and diode 20–5, so that ground will be assured even though an open fault exists in the loop between terminal N20 and the district station.

FAULT TRANSFER AND CONDITION CIRCUITS; FIG. 13

The low side of the subscribers' loop returns to the district station and is connected to terminal 13–6 of the fault transfer and conditioning circuit 112. For normal loop operation, i.e., operation without a fault, the low side of the loop is connected to terminal S14 of the ground detector 113 through armature 13–12 and back contact 13–11 of ganged switch 13–13. The loop returns from the ground detector to terminal 13–3 and goes to ground through armature 13–18 and back contact 13–19 of switch 13–13.

For normal operation, terminal F14 of the ground detector is connected to terminal M21 of the register circuit 114 through terminal 13–2, armature 13–16 and back contact 13–17 of switch 13–13, and terminal 13–10. Similarly, terminal F14 of the break detector is connected to terminal N21 of the register through terminal 13–1, armature 13–14 and back contact 13–15 of switch 13–13, and terminal 13–8.

Where the subscribers' loop 103 is subject to a fault, switch 13–13 is operated to its fault position so that operation may be continued despite the fault. The fault may be a ground, open, ground-open or open-ground. Under fault operation, positive battery is still applied to the high side of the subscribers' loop from terminal E12 of the line driver 105, as described previously, in order to transmit the interrogation and synchronizing pulses over the high side of the loop. However, instead of the low side of the loop returning to ground at contact 13–19, as in normal operation, terminal E12 is connected to the low side of the line so that identical pulses will be transmitted over the low side of the line. For this purpose, terminal E12 is connected to terminal 13–4.

The circuit then extends through front contact 13–20, armature 13–12, terminal 13–5, terminal S14 of ground detector 113, resistor 14–1 of the ground detector, terminal P14 of the ground detector, terminal 13–3, armature 13–18, front contact 13–21, and terminal 13–6 to the low side of the subscribers' loop.

With this fault operation, both sides of the subscribers' loop are high and each extends from the district station to the fault. The ground detector and break detector now perform identical functions, the break detector for the high side of the loop and the ground detector for what, under normal conditions, is the low side.

Terminal F14 of the break detector is connected through armature 13–14 and front contact 13–22 to output terminal 13–7 or 13–8, depending upon the setting of a switch 13–23. Switch 13–23 has an armature 13–24 connected to contact 13–22, a back contact 13–25 connected to terminal 13–8 and a front contact 13–26 connected to terminal 13–7.

Terminal F14 of the ground detector is similarly connected through armature 13–16 and a front contact 13–27 to either terminal 13–9 or 13–10, depending upon the setting of a switch 13–28. Switch 13–28 has an armature 13–29 connected to contact 13–27, a back contact 13–30 connected to terminal 13–10 and a front contact 13–31 connected to terminal 13–9.

If the loop is subject to a single fault, switches 13–23 and 13–28 will be left in their normal positions, as illustrated, if the fault is a ground, but both will be moved to their front positions if the fault is an open. If there is a double fault, the positions of the switches 13–23 and 13–28 will depend upon the fault encountered on the corresponding side of the line. Thus, if the high side is grounded or open, switch 13–23 will be in the normal or the front position, as the case may be. Similarly, if the low side is grounded or open, switch 13–28 will be in the normal or the front position, as the case may be. The possible terminal connections of the break and ground detector F14 terminals are shown by the following table:

*Table IV*

| High Side Fault | Low Side Fault | Break Detector F14 | Ground Detector F14 |
|---|---|---|---|
| None | None | 13–8 (N21) | 13–10 (M21) |
| Ground | Ground | 13–8 (N21) | 13–10 (M21) |
| Open | Open | 13–7 (P21) | 13–9 (L21) |
| Ground | Open | 13–8 (N21) | 13–9 (L21) |
| Open | Ground | 13–7 (P21) | 13–10 (M21) |

Operation of switches 13–13, 13–23 and 13–29 may be manual, as shown, or it may be automatic. If manual, the switches may be controlled remotely from the central station. The condition of the subscribers' loop can conveniently be ascertained by providing one interrogation pulse which is not associated with any subscriber's item but which would advance the subscribers' counters in the usual way. With the loop in normal condition, a break or ground should never be detected on such a pulse. But if a break or ground were detected, the fault condition of the loop would be known.

The condition of the loop could also be determined by integrating the current response of the break and ground detectors over a large number of interrogation pulses. Since it is very unlikely that any large number of subscribers would report breaks or ground simultaneously, an abnormal condition of the loop would be indicated by such an integrated output.

The switches 13–13, 13–23 and 13–28 could be operated automatically in response to a fault condition detected by a monitoring pulse or by supervising the break and ground detectors.

BREAK AND GROUND DETECTORS; FIG. 14

FIG. 14 shows the circuit used for both the break detector 106 and the ground detector 113. The circuit will first be described in its use as the break detector.

The line driver output signals, which are produced by applying positive battery to the line driver output terminal E12 in accordance with the loop code, appear at terminal S14, flow through resistor 14–1 and are applied to the subscribers' loop proper at terminal P14. A voltage divider formed by resistors 14–5 and 14–6 is provided between the high side of resistor 14–1 and ground while a similar voltage divider formed by resistors 14–7 and 14–8 is provided between the low side of resistor 14–1 and ground.

The junction of resistors 14–5 and 14–6 is connected to the emitter of transistor 14–2, while the junction of resistors 14–7 and 14–8 is connected to the base of transistor 14–2. If there is no current flow through resistor 14–1, these two junctions will be at the same potential (ignoring for a moment the other circuit connections). However, as current flows from terminal S14 to terminal P14, then the 14–5—14–6 junction will be more positive than the 14–7—14–8 junction, so that the base of transistor 14–2 will be more negative than the emitter and the transistor will conduct. However, in order to prevent transistor 14–2 from conducting unless there is some minimum value of current flowing in the resistor 14–1, a reverse bias is applied to the base of transistor 14–2 from +48 volt terminal D14 through resistors 14–9 and 14–10. Hence transistor 14–2 will conduct whenever some preselected minimum current flows in the subscribers' loop. Resistor 14–9 is adjustable to permit adjustment of the reverse bias on transistor 14–2 and hence adjustment of the minimum loop current at which transistor 14–2 will conduct.

A tone signal from tone generator 107 is applied to terminal U14 and from thence through a capacitor 14–11, a resistor 14–12 and a capacitor 14–13 to the base of transistor 14–3. Diodes 14–14 and 14–15 act as D.C. restorers.

The junction of resistor 14–12 and capacitor 14–13 is connected to the collector of transistor 14–2 so that the tone will be shunted to ground if transistor 14–2 is conducting but will appear at the base of transistor 14–3 if transistor 14–2 is not conducting. Hence when current is flowing in the loop, tone will not be applied to transistor 14–3, but if current is not flowing, the tone will be applied to transistor 14–3.

The tone, when not shorted out, is amplified in transistor 14–3 rectified by diode 14–4, and used to render a transistor 14–16 conductive. Hence transistor 15–16 will conduct only when transistor 14–2 is nonconductive, i.e., when there is less than a minimum current flow through resistor 14–1. With transistor 14–16 conductive, ground is applied to output terminal F14, which is an indication of no (or less than a predetermined) current flow in the subscribers' loop. But with transistor 14–16 nonconductive, the −14 volts from terminal B14 will be applied to terminal F14, which is an indication of normal current flow in the loop.

When the circuit of FIG. 14 is used as the ground detector, the operation is identical except that the current flowing through resistor 14–1 will be the current in the low side of the loop.

For normal loop conditions, and with no ground or open, an interrogation pulse will cause normal current flow in both the ground and break detectors, resulting in negative voltages at the terminals F14 of both. If a subscriber's keyer grounds the line, the break detector will still detect current but the ground detector will not, resulting in ground potential at terminal F14 of the ground detector. If a subscriber's keyer opens the line, neither detector will detect current, and ground potential will appear at terminal F14 of both.

With a ground fault operation, both detectors will detect only opens since each of the detectors in such a condition is independent of the other and both are effectively in the high side of the loop. But each detector will only respond to opens in its portion of the loop. With an open fault operation, the detectors will only detect grounds, but again each detector will sense only conditions in its own portion of the loop.

The potential on the F14 terminals for the normal and single fault loop conditions is shown in the following table:

*Table V*

| Loop Condition | Subscriber Action | F14 (Break Detector) Potential | F14 (Ground Detector) Potential |
|---|---|---|---|
| Normal | None | − | − |
| Normal | Ground | − | g |
| Normal | Open | g | g |
| Ground fault | None | − | − |
| Ground fault | Ground | − | − |
| Ground fault | Open [1] | g | − |
| Ground fault | Open [2] | − | g |
| Open fault | None | g | g |
| Open fault | Ground [1] | − | g |
| Open fault | Ground [2] | g | − |
| Open fault | Open | g | g |

[1] Subscriber on break detector side of fault.
[2] Subscriber on ground detector side of fault.

REGISTER; FIG. 21

The register circuit 114 receives the output pulses from terminals 13–7, 13–8, 13–9 and 13–10 of the fault transfer and conditioning circuit 112 at input terminals P21, N21, L21, and M21, respectively. Only two of the fault transfer and conditioning circuit terminals 13–7, 13–8, 13–9 and 13–10 will be connected for any given loop condition, as shown by Table IV, and these two terminals will be either at ground or at a negative potential, depending upon the response of a subscriber to an appropriate interrogation pulse.

A strobe pulse is applied to input terminal S21 at an appropriate time during each interrogation pulse. This time is preferably at about the middle of the interrogation pulse. The strobe pulses are derived from the time base 108, and are very short duration negative pulses which occur at the interrogation pulse frequency. In the absence of a strobe pulse, terminal S21 will be at ground potential.

Terminal M21 is coupled to a point 21–3 through a diode 21–4. Terminal S21 is coupled to point 21–3 through a diode 21–5. Terminal N21 is coupled to point 21–3 through a diode 21–6. Under normal, i.e., nonfault, loop conditions, terminal M21 will be connected to ground detector terminal F14, and terminal N21 will be connected to break detector terminal F14, as shown in Table IV. When a subscriber's item reports a normal condition, the F14 terminals of both the break and ground detector will be at a negative potential, as shown in Table V.

The register 114 also includes transistors 21–1 and 21–2 connected as a bistable multivibrator or flip-flop circuit. In the normal condition, transistor 21–2 will be conductive and transistor 21–1 will be nonconductive. This condition is assured by applying a negative reset pulse to terminal H21 prior to application of each strobe pulse to terminal S21. Terminal H21 is coupled to the base of transistor 21–2 through a capacitor 21–7 and a diode 21–8.

Point 21–3 is coupled to the base of transistor 21–1 through a resistor 21–9 and a diode 21–10, so that negative going pulses at point 21–3 will render transistor 21–1 conductive and in turn cut off transistor 21–2.

Diodes 21–4, 21–5 and 21–6 act as an AND gate which will allow point 21–3 to go negative and turn on transistor 21–1 only when all three of terminals M21, S21 and N21 are negative. If any one of these three terminals is at ground potential, point 21–3 will be clamped to ground and transistor 21–1 will stay cut off. Terminal S21 will only be negative during the short strobe pulse which occurs once during each interrogation pulse. Terminals M21 and N21 will both be negative only when the corresponding subscriber's item report is normal. If the subscriber grounds the loop or opens the loop, one or the other of terminals M21 and N21 will be at ground potential and hence will prevent conduction of transistor 21–1 when the strobe pulse is applied.

Output terminal T21 will be at ground potential so long as transistor 21–2 is conducting. A negative output pulse is applied to terminal T21 from −14 volt terminal B21 when transistor 21–2 is cut off. Hence only when a normal subscriber's item report is to be made will a negative output pulse appear at terminal T21. The negative potential at terminal T21 will persist until transistors 21–1 and 21–2 are reset to their other stable condition, which occurs when a negative pulse is supplied to reset terminal H21. This reset pulse, which is preferably of very short duration, is derived from time base 108. To facilitate the multiplexer operation, as will be described, it is desirable that the reset pulse be applied to terminal H21 after the end of the corresponding interrogation pulse and preferably a very short time before the application of the next strobe pulse to terminal S21. The strobe and reset pulses may be of the order of a few microseconds in duration, the negative voltage being required only to trigger the multivibrator. The strobe pulse itself does not trigger the multivibrator, but it does operate the AND gate to remove ground from point 21–3 and thus allow the negative triggering potential to be applied to the base of transistor 21–1 through a resistor 21–11, resistor 21–9 and diode 21–10.

If an alarm condition of a particular subscriber's item is to be signalled, terminal M21 or both of terminals M21 and N21 will be at ground potential, depending upon the condition of the counter stage 126. The result in either case is that point 21–3 will remain clamped to ground potential despite the application of the strobe pulse to terminal S21. Hence the multivibrator will not be triggered and terminal T21 will remain at ground potential. This condition will be signalled to the central station as an alarm. If the district station and central station are at the same location, the register output may be used to actuate the central station equipment.

In order to maintain operation with a fault on the loop, switch 13–13 will be operated to its fault position. Assuming that the fault is a ground, neither of switches 13–23 and 13–28 will be operated so that the register input is received at terminals N21 and M21 and the register operation will be the same as described for normal loop conditions. However, should a subscriber's keyer ground the loop, no corresponding ground potential would appear at terminal M21. In other words, no signalling would be effective by grounding the line. But should a subscriber on the high side of a fault register an alarm, in alternate frames the loop would be opened between the fault and the break detector 106. As a result, break detector 106 would not detect current and terminal N21 would be at ground, causing an alarm signal to be transmitted to the central station. With normal loop conditions, an alarm, when present, will be transmitted on each frame; under fault conditions an alarm will be transmitted only on alternate frames. Should a subscriber on the low side of the fault register an alarm, the loop between the fault and ground detector 113 would be opened on alternate frames, resulting in application of ground potential to terminal M21 and consequent transmission of an alarm signal.

When the fault is an open, the signalling inputs will be to terminals P21 and L21. As will be seen from Table V, with an open fault a normal condition is registered as ground on both terminals, as is also a subscriber opening of the line. Hence an alarm will be registered only when a subscriber grounds the loop. Thus a negative pulse input to either terminal L21 or P21 will be used to transmit an alarm.

Terminals L21 and P21 are coupled to point 21–3 through transistors 21–12 and 21–13, respectively. These transistors are normally cut off by the +4 volts applied to their bases through resistors 21–14 and 21–15, respectively. But negative pulses at terminal L21 or terminal P21 will be applied to the bases of the transistors through resistors 21–16 and 21–17, respectively, rendering the corresponding transistor conductive and clamping point 21–3 to ground through the collector-emitter circuit of the conductive transistor. Hence transistors 21–12 and 21–13 and diode 21–5 form a three way AND gate which operates to allow triggering of the multivibrator only when an alarm is not to be registered. Use of the transistors 21–12 and 21–13 prevents transmission of an alarm when a subscriber's item is either normal or acting to open the loop.

As shown in Table IV, for a ground-open fault, the register signal input will be to terminals N21 and L21. In this case, the three way AND gate is formed by transistor 21–12 and diodes 21–5 and 21–6. For an open-ground fault, the register signal input will be to terminals P21 and M21. In this case, the three way AND gate is formed by transistor 21–13 and diodes 21–4 and 21–5. In each case, the transistor prevents transmission of a spurious alarm by reason of the open fault, be it on the high or low side of any subscriber.

MULTIPLEXER-DEMULTIPLEXER

The multiplexer 115 is preferably of the time division type. The master time base for the system should control the multiplexer to ensure proper synchronization. If a multiplexer of some other type is used, the time base 108 should similarly either control or be controlled by the multiplexer or the multiplexer should transmit synchronizing information to ensure that the slave time base 117 is maintained in strict synchronism with the master time base 108.

The multiplexer services a number of subscriber loops in order to minimize transmission costs to the central station. The multiplexer is required to scan the potential condition of all of the output terminals T21 (one for each of the subscriber loops) during the interval between each register strobe pulse and the succeeding reset pulse. With a 6.25 cycle per second interrogation pulse frequency, there will be approximately 0.16 second available for a complete scan of all subscriber loop outputs. The number of subscribers' loops which may be serviced by a particular multiplexer depends upon the interrogation pulse frequency and the multiplexer scanning rate. For example, with a 6.25 cycle interrogation pulse frequency and a multiplexer scanning rate of 256 items per second, 40 subscribers' loops could be handled, leaving six time slots for multiplexer-demultiplexer synchronization. With a multiplexer scanning rate of 1600 items per second, 240 subscribers' loops could be handled, leaving 100 time slots for synchronization. The multiplexer in effect strobes the output terminals T21 of the various loops at the multiplexer scanning rate.

SYNCHRONIZED TIME BASE

The synchronized time base 117 is synchronized with the master time base 108 by means of the multiplexer channel. The synchronized time base provides corresponding output pulses to each decoder 118, one such decoder (or one group of decoding circuits) being provided for each subscribers' loop. The output to each decoder consists of a strobe pulse corresponding to the multiplexer strobe pulse for that particular subscribers' loop and a pulse output for each interrogation pulse of a complete pulse train for that subscribers' loop.

DECODER; FIG. 22

The decoder 118 comprises an individual decoding circuit for each subscriber's item on the subscribers' loop. The decoding circuits are designated AN0, AN1, AN2 and AN3, and thus correspond to a four item loop. As in the case of the item matrix circuit, the AN0 decoding circuit would not be used with the code of FIG. 11 since the synchronizing pulses are not used for reporting purposes.

Each of the decoding circuits is provided with a common terminal F22 which is supplied with a negative pulse corresponding in time of occurrence and duration to the multiplexer strobe pulse for the corresponding subscribers' loop. Circuit AN0, if used, is provided with a negative pulse at terminal H22 corresponding to the 0 count interrogation pulse. Circuits AN1, AN2 and AN3 are similarly provided with negative pulses at terminals J22, K22 and L22, respectively, corresponding to the 1, 2 and 3 count interrogation pulses, respectively. Circuits AN0, AN1, AN2 and AN3 are provided at terminals D22, E22, M22 and P22, respectively, with the demultiplexer signal output. The terminals P22, M22, E22 and D22 are connected together, as shown in FIG. 10, and are also connected to the corresponding terminals for all subscribers' loops serviced by demultiplexer 116.

Terminals F22, L22, K22, J22 and H22 will be at ground potential in the absence of a corresponding pulse. Terminals P22, M22, E22 and D22 will be at a negative potential when the scanned T21 terminal is negative, representing a non-alarm subscriber item condition but will be at ground potential when the scanned T21 terminal is at ground, representing an alarm signal from a subscriber's item. While the identical multiplexer system information output is applied to all decoding circuits for all of the associated subscribers' loops, at any instant only one such decoding circuit will be able to respond to such information output, and that decoding circuit will be the one corresponding to the subscriber's item condition being scanned at the corresponding register output.

The decoding circuits are all identical and comprise a transistor, two diodes and a thyristor. The transistors for the AN3, AN2, AN1 and AN0 circuits are designated 22–1, 22–2, 22–3 and 22–4, respectively. The diodes are designated 22–5, 22–6, 22–7, 22–8, 2–9, 22–10, 22–11 and 22–12, respectively. The thyristors are designated 22–13, 22–14, 22–15 and 22–16, respectively.

Considering, for example, circuit AN3, transistor 22–4 will be conductive when the multiplexer system output is negative, since the negative pulse at terminal P22 and applied to the base of transistor 22–1 through a resistor 22–17 will override the reverse (positive) bias applied to the base through resistor 22–18. But with the multiplexer system output at ground, transistor 22–1 will be cut off. With transistor 21–1 conductive, point 22–19 will be clamped to ground through the transistor collector-emitter circuit. With transistor 22–1 cut off, point 22–19 may be at a negative potential derived from −14 volt terminal B22 through a resistor 22–20, depending upon the potential conditions of diodes 22–5 and 22–6.

Common terminal F22 is coupled to point 22–19 through diode 22–5 and will clamp point 22–19 to ground when ground potential is applied to terminal F22. Terminal F22 is supplied with the multiplexer strobe pulses for the corresponding subscribers' loop and hence terminal F22 will be negative whenever the multiplexer system signal output represents any subscriber item for this subscribers' loop.

Terminal L22 is coupled to point 22–19 through diode 22–6 and will clamp point 22–19 to ground when ground potential is applied to terminal L22. Terminal L22 is supplied with negative pulses corresponding in time and duration with the interrogation pulses for the corresponding subscriber's item (the 3 count pulse) and hence terminal L22 will be negative whenever the corresponding subscriber's item is reporting. Transistor 22–1 and diodes 22–5 and 22–6 form a three way AND gate which will allow point 22–19 to go negative only when terminal P22 is positive and terminals F22 and L22 are negative. This situation can only exist when all three of the following conditions prevail: (1) the subscriber's item corresponding to the 3 count interrogation pulse reports an alarm, (2) the multiplexer strobe pulse for the corresponding subscribers' loop is applied to terminal F22, and (3) the negative going pulse corresponding to the interrogation pulse for this subscriber's item is applied to terminal L22.

Point 22–19 is coupled to the −14 volt terminal B22 through resistor 22–20 and to the base of thyristor 22–13 through resistors 22–21 and 22–22. The junction of these resistors is coupled to ground through a capacitor 22–23 and to +4 volts through a resistor 22–24. The +4 volts keeps thyristor 22–13 cut off until point 22–19 is released from ground, allowing the −14 volts from terminal B22 to render thyristor 22–13 conductive. Thyristor 22–13 is thus rendered conductive when the corresponding subscriber's item reports an alarm. Thyristor 22–13 will remain conductive until its collector circuit is opened or rendered positive and hence will continue to conduct even through the alarm signal is discontinued.

Conduction of thyristor 22–13 will put output terminal R22 at ground potential. Similarly, thyristors 22–14, 22–15 and 22–16 will put output terimnals S22, T22 and U22, respectively, at ground potential when conducting.

While circuit AN0 has been illustrated, actually in the subscribers' loop arrangement shown this circuit is not needed, since reports are received only on the 1, 2 and 3 count interrogation pulses. Hence the output at terminal U22 is not used.

As will be described hereinafter, the thyristor collectors are supplied with negative potentials through connections to the monitor lamp control circuit 120.

The thyristors could conveniently be replaced with other memory devices such as flip-flop circuits or magnetic cores which can be triggered to a particular state and will retain that state until reset.

If it were desired to actually register an alarm only when an alarm signal is received on two or more successive frames, the pulse input to the thyristors could be integrated and the bias arranged so that two or more successive pulses were required to render a thyristor conductive.

DISPLAY LAMP PANEL; FIG. 23

Output terminals T22, S22 and R22 of decoder 118 are connected to input terminals D23, E23 and F23, respectively, of display lamp panel 119. Terminal D23 is coupled to −20 volt terminal C23 through a lamp 23–1, a resistor 23–2, and an armature 23–3 and back contact 23–4 of a switch 23–5. Terminal E23 is similarly coupled through a lamp 23–6, a resistor 23–7, an armature 23–8 and back contact 23–9 of a switch 23–10. Terminal F23 is similarly coupled through a lamp 23–11, a resistor 23–12 and an armature 23–13 and back contact 23–14 of switch 23–15. Front contacts 23–16, 23–17 and 23–18 of respective switches 23–5, 23–10 and 23–15 are connected to +4 volts at terminal B23.

When any one or more of thyristors 22–15, 22–14 and 22–13 become conductive, a circuit will be completed to ground from −20 volt terminal C23, the corresponding one of lamps 23–1, 23–6 and 23–11 and the collector-emitter circuit of the conductive thyristor. This will illuminate the lamp and serve as a visual indication of the presence of an alarm condition at the corresponding subscriber's item. One such lamp will be provided for each subscriber's item if only alarm conditions are to be reported. If a trouble or other condition is also to be reported an additional lamp will be provided for such condition. Where trouble and alarm are to be reported on different interrogation pulses, the reporting and registration of alarm and trouble signals may be effected in the same way as for different alarm signals.

When the central station operator has noted the registration of an alarm for a particular subscriber's item, he may reset the corresponding thyristor by applying a positive voltage to the collector. This is done by operating the corresponding one of switches 23–5, 23–10 and 23–15 to the front position in which +4 volt terminal B23 will be coupled to the thyristor collector. When the switch is released to its back position, the thyristor will again fire and the lamp will again be illuminated if the subscriber's item is still in alarm condition.

After appropriate action has been taken by the central station operator to clear up the alarm, the thyristor may be reset and normal protection restored.

The display lamp panel also contains a lamp 23–19 which is included in a circuit extending from terminal H23 through lamp 23–19, a resistor 23–20, and an armature 23–21 and back contact 23–24 of switch 23–25 to −20 volt terminal C23. As will be explained in connection with the monitor lamp control circuit 120, lamp 23–19 will normally be illuminated but will be extinguished whenever any of the subscriber items on a particular subscriber's loop (in this case loop 103) are reporting an alarm. The front contact 23–26 of switch 23–25 is coupled to +4 volt terminal B23 through a resistor 23–27.

MONITOR LAMP CONTROL; FIG. 24

The monitor lamp control circuit 120 is intended to extinguish a lamp whenever a subscriber's item on a particular subscribers' loop reports an alarm and also to operate an audible device, e.g., a bell whenever any of the subscriber's items which report through the multiplexer 115 register an alarm. The monitor lamp control circuit includes a number of identical individual circuits, one for each subscribers' loop.

The individual circuit for the loop 103 comprises a transistor 24–1, the base of which is coupled to input terminal F24 through a resistor 24–2. Input terminal F24 is coupled through respective diodes 131, 132 and 133 to decoder output terminals T22, S22 and R22 (as shown in FIG. 10) so that terminal F24 will be at ground potential whenever any one or more of the thyristor 22–15, 22–14 and 22–13 are conductive. In other words, terminal F24 will be at ground whenever an alarm is registered on the associated subscribers' loop. Otherwise terminal F24 will be at a negative potential applied thereto from −14 volt terminal B24 through a resistor 24–3. This negative potential is supplied to the thyristor collectors through diodes 131, 132 and 133. This negative potential is also supplied to the base of transistor 24–1 through resistor 24–2 to overcome the reverse bias applied to the base for +4 volt terminal C24 through a resistor 24–4 and thus to render transistor 24–1 conductive so long as terminal F24 is not clamped to ground.

The collector of transistor 24–1 is connected to terminal L24 which is coupled to −20 volt terminal C23 (FIG. 23) through lamp 23–19. Hence lamp 23–19 will be illuminated whenever transistor 24–1 is conductive but will be extinguished whenever transistor 24–1 is cut off. This results because the lamp energizing circuit includes the collector-emitter circuit of transistor 24–1. The negative voltage from terminal C23 will appear at the collector of transistor 24–1 and will be applied through a diode 24–5 to output terminal N24. This negative voltage at terminal N24 is used to operate an audible indication such as a bell or buzzer. The operating circuit for the audible indication should have sufficient resistance as not to draw enough current to illuminate lamp 23–19.

Transistors 24–6, 24–7 and 24–8 and corresponding diodes 24–9, 24–10 and 24–11, which are associated with other subscribers' loops, will, when the corresponding transistor is cut off, apply a negative potential to terminal N24 to operate the audible indication. Each of these transistors will cut off an individual lamp corresponding to lamp 23–19. The audible indication will alert the central station operator to the presence of an alarm, the extinguished loop lamp will identify the subscribers' loop in question, and the illuminated subscriber's lamp will identify the particular subscriber's item which is registering an alarm or other signal.

TONE GENERATOR; FIG. 25

A tone generator 107 is provided at the district station and a similar tone generator 121 is provided at each subscriber's premises. These tone generators are used to provide D.C. isolation and may operate at any convenient frequency substantially higher than the interrogation pulse frequency. The tone frequency should be sufficiently higher than any signalling frequency as not to affect the signalling circuits. The tone generators may conveniently provide a 30KC tone and may be formed by a suitable free running multivibrator, as shown in FIG. 25. In FIG. 25, the transistors 25–1 and 25–2 are connected in a free running multivibrator circuit, providing the tone frequency at the base of a transistor 25–3 which amplifies the tone and supplies it to output terminal T25.

While the invention has been described in connection with specific embodiments thereof and in specific uses, various modifications thereof will occur to those skilled in the art without departing from the spirit and scope of the invention as set forth in the appended claims.

What is claimed is:

1. A signalling system for providing at one location electrical signal indications representative of respective conditions of a plurality of items located at other locations and each of which has at least two conditions, comprising a source of a train of electrical impulses, a communication channel, means at said one location to apply said train of electrical impulses to said channel, signalling means at each of said other locations, said signalling means being capable of being rendered responsive to the conditions of corresponding ones of said items for acting upon said channel by selectively substantially decreasing the impedance of said channel, substantially increasing the impedance of said channel and leaving substantially unchanged the impedance of said channel thereby, to convert said impulses into distinctive signal indications of the conditions of said items, conditioning means at each of said other locations for rendering the corresponding ones of said signalling means responsive to the conditions of corresponding individual ones of said items, counting means at each of said other locations and being coupled to said channel for counting the impulses in said train, each of said counting means being coupled to a corresponding one of said conditioning means whereby said conditioning means renders the corresponding signalling means responsive to the condition of a corresponding one of said items for a particular individual impulse of said train, and means at said one location for detecting said distinctive signal indications in said channel.

2. An electric protection system for providing electrical signal indications representative of respective conditions of a plurality of protection items each of which has at least two conditions each representing a protection situation, comprising a source of successive trains of electrical impulses, an electrically conductive circuit, means to apply said trains of electrical impulses to said circuit, signalling means capable of being rendered responsive to the conditions of said protection items and being coupled to said circuit for acting upon said circuit by selectively substantially decreasing the impedance of said circuit, substantially increasing the impedance of said circuit and leaving substantially unchanged the impedance of said circuit thereby to convert said impulses into distinctive signal indications of the conditions of said items, conditioning means for rendering said signalling means responsive to the conditions of individual ones of said items, countng means for counting the impulses in each of said trains, means to apply said trains of electrical impulses to said counting means, said counting means being coupled to said conditioning means whereby said conditioning means render said signalling means responsive to the condition of a respectively different one of said items for each impulse of one of said trains, and means for detecting said distinctive signal indications in said circuit.

3. A signalling system for providing electrical signal indications representative of respective conditions of a plurality of items each of which has a plurality of conditions, comprising a conductive loop forming a series circuit, means to apply successive trains of electrical impulses to said loop, each of said items having a corresponding particular impulse in each train, means for counting the impulses in each train, means associated with said items for selectively altering the impedance of said loop by substantially decreasing the impedance of said loop, substantially increasing the impedance of said loop or leaving the impedance of said loop substantially unchanged in accordance with the condition of the respective items, said last mentioned means being operatively coupled to said counting means whereby said selective impedance alteration of said loop is effected in response to the condition of each of said items only in response to a count of the corresponding impulse of each of said trains, and means for detecting the impedance condition of said loop and for registering said loop conditions as signal indications representative of the respective conditions of said items.

4. A signalling system for providing at a remote location electrical signal indications representative of respective conditions of a plurality of protection items each of which has a plurality of conditions, at least some of said items being located at different places, comprising a conductive loop forming a series circuit interconnecting said remote location and said places, means at said remote location to apply successive trains of electrical impulses to said loop, each of said items having a corresponding particular impulse in each train, means at each of said places for counting the impulses in each train, means at each of said places for selectively grounding, opening or leaving closed said loop in accordance with the condition of a corresponding item at the corresponding place, said last mentioned means at each place being operatively coupled to the corresponding counting means whereby said loop is acted upon in response to the condition of each of said items only in response to a count of the corresponding impulse of each of said trains, and means at said remote location for detecting the condition of said loop and for registering said loop conditions as signal indications representative of the respective conditions of said items.

5. A signalling system for providing at a remote location electrical signal indications representative of respective conditions of a plurality of protection items each of which has a plurality of conditions, at least some of said items being located at different places, comprising a conductive loop forming a series circuit interconnecting said remote location and said places, means at said remote location to apply successive trains of electrical impulses to said loop, each of said items having a corresponding particular impulse in each train, means at each of said places for counting the impulses in each train, means at each of said places for selectively altering the impedance of said loop in accordance with the condition of a corresponding item at the corresponding place, said last mentioned means at each place being operatively coupled to the corresponding counting means whereby said selective impedance alteration of said loop is effected in response to the condition of each of said items only during the corresponding impulse of each of said trains, delay means at each of said places, said delay means being operatively coupled to the corresponding impedance altering means and being arranged to delay alteration of loop impedance by a time interval equal to a selected fraction of the corresponding impulse duration, and means at said remote location for detecting the condition of said loop during each impulse and for registering said loop conditions as signal indications representative of the respective conditions of said items.

6. A signalling system for providing at a remote location electrical signal indications representative of respective conditions of a plurality of protection items each of which has a plurality of conditions, at least some of said items being located at different places, comprising a conductive loop forming a series circuit interconnecting said remote location and said places, means at said remote location to apply successive trains of electrical impulses to said loop, each of said items having a corresponding particular impulse in each train, means at each of said places for counting the impulses in each train, and for registering successive trains, means at each of said places for selectively grounding, opening or leaving closed said loop in accordance with the condition of a corresponding item at the corresponding place, said last mentioned means at each place being operatively coupled to the corresponding counting means whereby said loop is acted upon in response to the condition of each of said items only during the corresponding impulse of each of said trains, the particular action taken in response to a particular item condition being different in selected trains, and means at said remote location for detecting the condition of said loop during each impulse and for registering said loop conditions as signal indications representative of the respective conditions of said items.

7. A signalling system for providing at a remote location electrical signal indications representative of respective conditions of a plurality of items each of which has a normal condition and an abnormal condition, at least some of said items being located at different places, comprising a conductive loop forming a series circuit interconnecting said remote location and said different places, means at said remote location to apply successive trains of electrical impulses to said loop, each of said trains including a plurality of interrogation pulses and at least one synchronizing impulse, signalling means at each of said places, each of said signalling means being coupled to said loop and being capable of being rendered responsive to the condition of at least one corresponding item to selectively ground, open and leave closed said loop, conditioning means at each of said places for rendering the corresponding signalling means responsive to the condition of at least said one corresponding item, counting means at each of said places for counting the interrogation impulses in each of said trains, and for counting means being coupled to a corresponding conditioning means whereby the latter renders the corresponding signalling means responsive to the condition of said one corresponding item at a predetermined individual interrogation impulse count to act upon said loop in accordance with the condition of said one corresponding item, the particular action taken for an abnormal item condition being different in successive trains, and means at said remote location for detecting the condition of said loop during each interrogation impulse and for registering the same as a signal indication of the condition of the corresponding items.

8. A signalling system as set forth in claim 7 in which switching means is provided at said remote location for applying said electrical impulses selectively to one end of said loop and to both ends of said loop.

9. A signalling system as set forth in claim 8 in which means is provided for detecting a circuit fault in said loop and for automatically operating said switching means to apply said electrical impulses to both ends of said loop.

10. A signalling system for providing at a remote location electrical signal indications representative of respective conditions of a plurality of protection circuits each of which has at least a normal condition and an abnormal condition, at least some of said protection circuits being located at respectively different places; comprising a conductive loop forming a series circuit interconnecting said remote location and said different places; means at said remote location for generating successive trains of electrical interrogation pulses, each of said interrogation pulses of each train corresponding to a respective one of said protection circuits; means to apply said pulses to one end of said loop; a line detecting circuit and a line keying circuit at each of said places, said line detecting circuit and said line keying circuit at each of said places having portions thereof forming a part of and connected in series in said loop, said line detecting circuits including means for detecting the presence of said pulses in said loop and producing corresponding local interrogation pulses, said line keying circuits including means for selectively altering the impedance of said loop; an electronic pulse counter at each of said places; means at each of said places for applying said local interrogation pulses to said electronic counter, each local interrogation pulse advancing said counter by one count; condition switching means coupled to each of said protection circuits for providing at the corresponding places distincitve condition signals representative of the conditions of said corresponding protection circuits; a matrix circuit at each of said places, said matrix circuits being coupled to the corresponding counters and condition switching means and serving as electronic gates to pass said condition signals only during the corresponding interrogation pulses; a keying control circuit at each of said places, each of said keying control circuits being coupled to the corresponding matrix circuit and line keying circuit and being arranged to operate the impedance altering means of said corresponding line keying circuit whereby the impedance of said loop is selectively altered in accordance with the condition of a respective protection circuit during each interrogation pulse; first and second current measuring circuits at said remote place each coupled to a respective end of said loop; said current measuring circuits sensing the presence of a current in the corresponding loop end greater than a predetermined minimum; means coupled to said current measuring circuits for producing intermediate signals representative of the presence or absence of said minimum current flows in said respective loop ends; a source of signalling potential; and a register circuit coupled to said last mentioned means, said source and said generating means, said register circuit being arranged to act as an electronic gate to pass said signalling potential for preselected combinations of said intermediate signals and electrical impulses from said generating means, said signalling potential, when passed by said register circuit, constituting an electrical signal indication of the condition of the protection circuit corresponding to the interrogation pulse in existence at the time of passing of said signal potential.

11. A signalling system for providing at a remote location electrical signal indications representative of respective conditions of a plurality of protection circuits each of which has at least a normal condition and an abnormal condition, at least some of said protection circuits being located at respectively different places; comprising a conductive loop forming a series circuit interconnecting said remote location and said different places; means at said remote location for generating successive trains of electrical impulses, each train comprising a plurality of interrogation pulses and at least one distinctive synchronizing pulse, each of said interrogating pulses corresponding to a respective one of said protection circuits; means to apply said impulses to one end of said loop; a line detecting circuit and a line keying circuit at each of said place, said line detecting circuit and said line keying circuit at each of said places each having portions thereof forming a part of and connected in series in said loop, said line detecting circuits including means for detecting the presence of impulses in said loop, said line keying circuits including means for selectively altering the impedance of said loop by grounding, opening or leaving closed said loop; a signal separating circuit at each of said places coupled to the corresponding line detecting circuits and arranged to produce a local interrogation pulse for each detected interrogation pulse in said loop and a local synchronizing pulse for each detected synchronizing pulse in said loop; a plural stage binary electronic pulse counter at each of said places; means at each of said places for applying the corresponding local interrogation pulses to said electronic counter, each local interrogation pulse advancing said counter by one count; means at each of said places to apply the corresponding local synchronizing pulses to selected stages of said counter for resetting said selected stages to zero count; condition switching means coupled to each of said protection circuits for providing at the corresponding places distinctive condition signals representative of the conditions of said corresponding protection circuits; a signal delay circuit at each of said places and arranged to provide a signal time delay of predetermined duration substantially less than the duration of one of said interrogation pulses; a matrix circuit at each of said places, said matrix circuits being coupled to the corresponding counters, condition switching means and delay circuits and serving as electronic gates to apply said condition signals to the corresponding delay circuits only during the corresponding interrogation pulses; a keying control circuit at each of said places, each of said keying control circuits being coupled to the corresponding delay circuit, electronic counter and line keying circuit and being arranged to operate the impedance altering means of said corresponding line keying circuit whereby the impedance of said loop is selectively altered in accordance with the condition of a respective protection circuit during each interrogation pulse, the impedance alteration corresponding to an abnormal condition being different for successive ones of said trains; first and second resistance elements at said remote place each connected in series with a respective end of said loop; means for separately sensing the presence of a voltage drop greater than a predetermined minimum across said resistance elements and for producing intermediate signals representative of the presence or absence of said voltage drop across said resistive elements; a source of signalling potential; and a register circuit coupled to said sensing means, said source and said generating means, said register circuit being arranged to act as an electronic gate to pass said signalling potential for preselected combinations of said intermediate signals and electrical impulses from said generating means, said signalling potential, when passed by said register circuit, constituting an electrical signal indication of the condition of the protection circuit corresponding to the interrogation pulse in existence at the time of passing of said signal potential.

12. A signalling system as set forth in claim 11 in which plural condition switching means is provided at said remote location, said switching means being coupled to both ends of said loop and to said generating means and being arranged so that in one condition of said switching means said impulses are applied to said one end of said loop and so that in another condition of said switching means said impulses are applied to both ends of said loop.

13. A signalling system as set forth in claim 12 in which said switching means is provided with a plurality of separately operable switching contacts affording different switching combinations, said switching contacts interconnecting said sensing means and said register circuit, each of said switching combinations affording an individual one of said preselected combinations of said intermediate signals and electrical impulses.

14. In an electrical protection system having a plurality of protection circuits interconnected by a conductive line, signalling apparatus for selectively altering the impedance of said conductive line in accordance with the condition of a particular protection circuit and in response to the presence in said conductive line of a particular electrical advance pulse in each of a succession of trains of electrical advance pulses, comprising a detecting circuit and a keying circuit, said detecting and keying circuits each having portions in series with each other and with said conductive line, said detecting circuit including means for detecting the presence of said advance pulses in said conductive line, said keying circuit including means for selectively altering the impedance of said conductive line; an electronic counting circuit; a signal separating circuit coupled to said line detecting circuit and arranged to produce a local counter advance pulse for each advance pulse detected by said detecting circuit; means to apply said local counter advance pulses to said counting circuit to advance the count thereof by one for each local counter advance pulse; an electronic AND gate; a local protection item having at least a normal condition and an abnormal condition; a source of signalling potential; switching means responsive to the condition of said item for selectively applying said signalling potential to said gate; means coupling said gate to said counting circuit whereby said gate will pass said signalling potential at the count corresponding to said particular advance pulse in each of said trains; and a keying control circuit coupled to said gate, said keying control circuit being coupled to said keying circuit whereby one of said impedance alterations in said line is effected in response to said passing of said signalling potential.

15. In an electrical protection system having a plurality of protection circuits interconnected by a conductive line, signalling apparatus for selectively altering the impedance of said conductive line in accordance with the condition of a particular protection circuit and in response to the presence in said conductive line of a particular electrical advance pulse in each of a succession of trains of electrical impulses, said trains each including a series of advance pulses and at least one synchronizing pulse; comprising a detecting circuit and a keying circuit, said detecting and keying circuits each having portions in series with each other and with said conductive line, said detecting circuit including means for detecting the presence of impulses in said conductive line, said keying circuit including means for selectively altering the impedance of said conductive line by grounding, opening or leaving closed said conductive line; a plural stage binary electronic counting circuit; a signal separating circuit coupled to said line detecting circuit and arranged to produce a local counter advance pulse for each advance pulse detected by said detecting circuit and a local synchronizing pulse for each synchronizing pulse detected by said detecting circuit; means to apply said local counter advance pulses to said counting circuit to advance the count thereof by one for each local counter advance pulse; means to apply said local synchronizing pulses to selected stages of said counting circuit to reset said selected stages to zero count; a diode matrix forming an electronic AND gate; a local protection item having at least a normal condition and an abnormal condition; a source of signalling potential; switching means responsive to the condition of said item for selectively applying said signalling potential to said matrix; means coupling said matrix to said counting circuit whereby said matrix will pass said signalling potential at the count corresponding to said particular electrical advance pulse in each of said trains; a delay circuit coupled to said matrix and arranged to delay said signalling potential by a predetermined time interval less than the duration of one of said advance pulses; and a keying control circuit coupled to said delay circuit and to a stage of said counting circuit corresponding to a count in each train higher than said count corresponding to said particular electrical impulse, said keying control circuit being coupled to said keying circuit whereby one of said impedance alterations in said line is effected in response to said passing of said signalling potential at one count of said higher counting stage and another of said impedance alterations in said line is effected in response to said passing of said signalling potential at the opposite count of said higher counting stage, the third of said impedance alterations in said line being effected in response to failure to pass said signalling potential at said counting circuit count corresponding to said particular electrical impulse.

16. In an electrical protection system having a plurality of protection circuits interconnected by a conductive line, signalling apparatus for selectively altering the impedance of said conductive line in accordance with the condition of a particular protection circuit and in response to the presence in said conductive line of a particular electrical advance pulse in each of a succession of trains of electrical impulses, said trains each including a series of advance pulses and at least one synchronizing pulse having a duration substantially longer than the duration of said advance pulses; comprising a detecting circuit and a keying circuit, said detecting and keying circuits each having portions in series with each other and with said conductive line, said detecting circuit including means for detecting the presence of positive current impulses, negative current impulses and voltage impulses in said conductive line, said keying circuit including means for selectively altering the impedance of said conductive line by grounding, opening or leaving closed said conductive line; a plural stage binary electronic counting circuit; one count being provided in said counting circuit for each advance pulse in each of said trains; a signal separating circuit coupled to said line detecting circuit and arranged to produce a local counter advance pulse for each advance pulse detected by said detecting circuit and a local synchronizing pulse for each synchronizing pulse detected by said detecting circuit, said detecting circuit including components responsive to the time duration of said impulses to selectively produce said local pulses; means to apply said local counter advance pulses to said counting circuit to advance the count thereof by one for each local counter advance pulse; means to apply said local synchronizing pulses to selected stages of said counting circuit to reset said selected stages to zero count; a diode matrix forming an electronic AND gate; a local protection item having at least a normal condition and an abnormal condition; a source of signalling potential; switching means responsive to the condition of said item for selectively applying said signalling potential to said matrix; means coupling said matrix to said counting circuit whereby said matrix will pass said signalling potential at the count corresponding to said particular electrical advance pulse in each of said trains; a delay circuit coupled to said matrix and arranged to delay said signalling potential by a predetermined time interval less than the duration of one of said advance pulses; and a keying control circuit coupled to said delay circuit and to a stage of said counting circuit corresponding to a count in each train higher than said count corresponding to said particular electrical impulse, said keying control circuit being coupled to said keying circuit whereby one of said impedance alterations in said line is effected in response to said passing of said signalling potential at one count of said higher counting stage and another of said impedance alterations in said line is effected in response to said passing of said signalling potential at the opposite count of said higher counting stage, the third of said impedance alterations in said line being effected in response to failure to pass said signalling potential at said counting circuit count corresponding to said particular electrical impulse.

17. In an electrical protection system in which successive trains of electrical impulses are transmitted over a conductive line, each of said trains comprising a series of interrogation pulses, the combination comprising means at an intermediate point in said line for detecting said pulses and for providing local interrogation pulses corresponding to said interrogation pulses, a multi-stage binary electronic counter, each of said counter stages having a "0" condition and a "1" condition, said counter affording an individual count for each interrogation pulse contained in one of said trains, means to apply said local interrogation pulses to the first stage of said counter whereby said counter advances one count for each local interrogation pulse, a switching contact, a local protection circuit having at least a normal condition and an abnormal condition and being arranged to open said contact in one of said conditions thereof and to close said contact in the other of said conditions thereof, a matrix circuit, said matrix circuit including a conductor, a first unidirectional element interconnecting said conductor and said contact, second and third unidirectional elements interconnecting said conductor and outputs of said counter which provide a first predetermined potential to each of said second and third elements only at a single predetermined count and which provide a second predetermined potential to each of said second and third elements at all other counts, an amplifier normally based to a first condition thereof and means interconnecting said conductor and the input circuit of said amplifier, a source of biasing potential coupled to said conductor for changing the condition of said amplifier, a source of a third predetermined potential coupled to said contact, any one of the application of said third predetermined potential to said contact and application of said second predetermined potential to said second and third elements preventing application of said biasing potential to said amplifier, a source of signalling potential, an output terminal, and means including said amplifier to apply said signalling potential to said output terminal when said amplifier is in said changed condition thereof.

18. In an electric protection system in which successive trains of electrical impulses are transmitted over a conductive line, each of said trains comprising a series of interrogation pulses and at least one synchronizing pulse, the combination comprising means at an intermediate point in said line for detecting said pulses and for providing at respective first and second terminals local interrogation pulses and local synchronizing pulses corresponding, respectively, to said interrogation and synchronizing pulses, a multi-stage binary electronic counter, each of said counter stages being a flip-flop circuit having a "0" condition and a "1" condition, said counter affording an individual count for each interrogation pulse contained in one of said trains, means to apply said local interrogation pulses to the first stage of said counter whereby said counter advances one count for each local interrogation pulse, means to apply said local synchronizing pulse to at least one stage of said counter to reset at least said one stage to zero count, a switching contact, a local protection circuit having at least a normal condition and an abnormal condition and being arranged to open said contact in one of said conditions thereof and to close said contact in the other of said conditions thereof, a matrix circuit, said matrix circuit including a conductor, a first diode interconnecting said conductor and said contact, second and third diodes interconnecting said conductor and outputs of said counter which provide a first predetermined potential to each of said second and third diodes only at a single predetermined count and which provide a second predetermined potential to each of said second and third diodes at all other counts, a fourth diode interconnecting said conductor and said first terminal, a transistor amplifier normally biased to nonconductive condition and a fifth diode interconnecting said conductor and the input circuit of said transistor amplifier, a source of biasing potential coupled to said conductor for rendering said transistor amplifier conductive, a source of a third predetermined potential coupled to said contact, any one of application of said third predetermined potential to said contact, application of said second predetermined potential to said second and third diodes and absence of said local interrogation pulse at said first terminal preventing application of said biasing potential to said transistor amplifier, a source of signalling potential, an output terminal, and means including said transistor amplifier to apply said signalling potential to said output terminal when said transistor amplifier is conductive.

19. A signalling system for reporting the respective conditions of a large number of individual items, comprising a plurality of first time division multiplex systems; each of said first systems comprising a conductive loop intercoupling a respective group of said items, a source of successive trains of interrogation impulses, said interrogation impulses occurring at a first rate and each interrogation impulse of each train corresponding to a particular item in said group, means to apply said interrogation impulses to said loop, means including said conductive loop and said interrogation impulses to sample the conditions of the individual items of said group at said first rate, an output terminal, and means selectively to apply an output potential and a reference potential to said output terminal in accordance with the instantaneous conditions of said items and at said first rate, the potential of said output terminal at any particular time corresponding to the instantaneous condition of the particular item in said group corresponding to the interrogation pulse in turn corresponding to said particular time; a second multiplex system; means to apply the potentials of said output terminals of said first system as respective signal potentials to said second multiplex system in respective time slots; and an individual registration means for each of said items, each of said individual registration means being coupled to said second multiplex system and being arranged to register the instantaneous signal potential output of said multiplex system as an indication of the instantaneous condition of one of said items.

20. A signalling system for reporting the respective conditions of a large number of individual items, comprising a plurality of first time division multiplex systems; each of said first systems comprising a conductive loop intercoupling a respective group of said items, a source of successive trains of interrogation impulses, said interrogation impulses occurring at a first rate and each interrogation impulse of each train corresponding to a particular item in said group, means to apply said interrogation impulses to said loop, means including said conductive loop and said interrogation impulses to sample the conditions of the individual items of said group at said first rate, an output terminal, and means selectively to apply an output potential and a reference potential to said output terminal in accordance with the instantaneous conditions of said items and at said first rate, the potential of said output terminal at any particular time corresponding to the instantaneous condition of the particular item in said group corresponding to the interrogation pulse in turn corresponding to said particular time; said source of a train of interrogation impulses in each of said first systems having a common time base whereby said interrogation impulses in all of said first systems occur in synchronism; a second time division multiplex system including a multiplexer, a demultiplexer, and a communication channel intercoupling said multiplexer and said demultiplexer; means to apply the potentials of said output terminals of said first systems as respective signal potentials to said multiplexer in respective time slots; and an individual registration means for each of said items, each of said individual registration means being coupled to said demultiplexer and being arranged to register the instantaneous signal potential output of said demultiplexer as an indication of the instantaneous condition of one of said items.

21. A signalling system for reporting the respective conditions of a large number of individual items, comprising a plurality of first time division multiplex systems; each of said first systems comprising a conductive loop intercoupling a respective group of said items, a source of successive trains of interrogation impulses, said interrogation impulses occurring at a first rate and each interrogation impulse of each train corresponding to a particular item in said group, means to apply said interrogation impulses to said loop, means including said conductive loop and said interrogation impulses to sample the conditions of the individual items of said group at said first rate, an output terminal, and means selectively to apply an output potential and a reference potential to said output terminal in accordance with the instantaneous conditions of said items and at said first rate, the potential of said output terminal at any particular time corresponding to the instantaneous condition of the particular item in said group corresponding to the interrogation pulse in turn corresponding to said particular time; said source of a train of interrogation impulses in each of said first systems having a common time base whereby said interrogation impulses in all of said first systems occur in synchronism; a second time division multiplex system including said common time base, a multiplexer, a demultiplexer and a communication channel intercoupling said multiplexer and said demultiplexer; a source of successive trains of individual strobe impulses, a respective strobe impulse being provided in each train of strobe impulses for each of said first systems, each of said strobe impulses in each train of strobe impulses being displaced in time, said trains of strobe impulses occurring at said first rate; means operative in response to occurrence of respective particular strobe impulses in each train of strobe impulses to apply the potentials of said output terminals of said first systems as respective signal potentials to said multiplexer in respective time slots; and an individual registration means for each of said items, each of said individual registration means being coupled to said demultiplexer and being arranged to register the instantaneous signal potential output of said demultiplexer as an indication of the instantaneous condition of one of said items.

22. A signalling system for reporting the respective conditions of a large number of individual items, comprising a plurality of first time division multiplex systems;

each of said first systems comprising a conductive loop intercoupling a respective group of said items, a source of successive trains of interrogation impulses, said interrogation impulses occurring at a first rate and each interrogation impulse of each train corresponding to a particular item in said group, means to apply said interrogation impulses to said loop, means including said conductive loop and said interrogation impulses to sample the conditions of the individual items of said group at said first rate, an output terminal, and means selectively to apply an output potential and a reference potential to said output terminal in accordance with the instantaneous conditions of said items and at said first rate, the potential of said output terminal at any particular time corresponding to the instantaneous condition of the particular item in said group corresponding to the interrogation pulse in turn corresponding to said particular time; said source of a train of interrogation impulses in each of said first systems having a common time base whereby said interrogation pulses in all of said first systems occur in synchronism; a second time division multiplex system including said common time base, a multiplexer, a demultiplexer and a communication channel intercoupling said multiplexer and said demultiplexer; a source of successive trains of individual strobe impulses, a respective strobe impulse being provided in each train of strobe impulses for each of said first systems, each of said strobe impulses in each train of strobe impulses being displaced in time, said trains of strobe impulses occurring at said first rate; means operative in response to occurrence of respective particular strobe impulses in each train of strobe impulses to apply the potentials of said output terminals of said first systems as respective signal potentials to said multiplexer in respective time slots; and an individual registration means for each of said items, each of said individual registration means being coupled to said demultiplexer and being arranged to register the instantaneous signal potential output of said demultiplexer as an indication of the instantaneous condition of one of said items; a source of local interrogation impulses corresponding in time phase to said interrogation impulses; a source of local strobe impulses corresponding in time phase to said strobe impulses; first circuit means to apply each respective local interrogation impulse to the group of registration means corresponding to the corresponding item of each of said group of items; and second circuit means to apply each respective local strobe impulse to those registration means corresponding to said items intercoupled by the conductive loop of the corresponding first system; said first and second circuit means being arranged so that each of said registration means registers said demultiplexer signal output only when both the local interrogation impulses and the local strobe impulses correspond to the corresponding item and first system, respectively.

References Cited by the Examiner

UNITED STATES PATENTS

| | | | |
|---|---|---|---|
| Re. 23,571 | 11/52 | Clutts et al. | 340—152 |
| 2,059,204 | 11/36 | Boswau | 340—163 |
| 2,584,739 | 2/52 | Rees | 340—163 |
| 2,629,088 | 2/53 | Kendall | 340—163 |
| 2,658,188 | 11/53 | Malthaner et al. | 340—168 |
| 2,794,179 | 5/57 | Sibley | 340—163 |
| 2,802,940 | 8/57 | Burton | 328—196 |
| 2,906,998 | 9/59 | Costa | 340—152 |
| 2,913,578 | 11/59 | Younker | 328—196 |
| 2,931,013 | 3/60 | Harris | 340—168 |
| 2,935,626 | 5/60 | Mac Sorley | 307—88.5 |
| 2,980,898 | 4/61 | Mason et al. | 340—213 XR |
| 2,985,771 | 5/61 | Halpern | 307—88.5 |
| 3,046,525 | 7/62 | Deming et al. | 340—163 |

NEIL C. READ, *Primary Examiner.*

IRVING L. SRAGOW, *Examiner.*

UNITED STATES PATENT OFFICE
CERTIFICATE OF CORRECTION

Patent No. 3,214,734 October 26, 1965

Harry G. Whitehead

It is hereby certified that error appears in the above numbered patent requiring correction and that the said Letters Patent should read as corrected below.

Column 1, line 69, for "dificiency" read -- deficiency --; column 2, line 23, after "since" insert -- the --; column 3, line 19, after "along" insert -- the --; line 56, strike out the comma; column 4, line 63, after "opening" insert a comma; column 5, line 9, strike out "that"; column 9, line 5, for "conuter" read -- counter --; column 14, line 50, strike out "the"; column 15, lines 45 and 46, for "represents" read -- represent --; column 16, line 25, before "delay" insert -- A --; column 19, line 17, for "conected" read -- connected --; column 24, line 71, for "it" read -- if --; column 31, line 13 for "15-16" read -- 14-16 --; column 35, line 15, for "21-1" read -- 22-1 --; line 60, for "through" read -- though --; column 37, line 41, before "lamp" insert -- item --; column 38, line 38, for "countng" read -- counting --; column 40, line 13, after "counting" insert -- successive trains, each of said counting --; line 49, after "places" insert -- each --; column 41, line 43, for "circuits" read -- circuit --; column 44, line 30, for "electrical" read -- electric --; line 56, for "based" read -- biased --; line 61, strike out "the"; column 45, line 63, for "system" read -- systems --.

Signed and sealed this 28th day of June 1966.

(SEAL)
Attest:

ERNEST W. SWIDER
Attesting Officer

EDWARD J. BRENNER
Commissioner of Patents